United States Patent
Imai et al.

(10) Patent No.: US 9,037,987 B2
(45) Date of Patent: May 19, 2015

(54) INFORMATION PROCESSING APPARATUS, METHOD AND COMPUTER PROGRAM STORAGE DEVICE HAVING USER EVALUATION VALUE TABLE FEATURES

(75) Inventors: Atsushi Imai, Tokyo (JP); Keiko Hiraoka, Tokyo (JP); Yoshimitsu Funabashi, Tokyo (JP); Mayu Irimajiri, Tokyo (JP); Seiji Muramatsu, Saitama (JP); Takamoto Tsuda, Kanagawa (JP); Takeshi Matsuzawa, Kanagawa (JP); Takeshi Tanigawa, Tokyo (JP); Tomoharu Okamoto, Kanagawa (JP); Akihiko Adachi, Tokyo (JP); Tatsuhiko Nishimura, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 1778 days.

(21) Appl. No.: 11/832,271

(22) Filed: Aug. 1, 2007

(65) Prior Publication Data
US 2008/0046831 A1 Feb. 21, 2008

(30) Foreign Application Priority Data
Aug. 16, 2006 (JP) .................................. 2006-221929

(51) Int. Cl.
*G06F 3/048* (2013.01)
*G06F 3/00* (2006.01)
(Continued)

(52) U.S. Cl.
CPC ........ *G06F 15/025* (2013.01); *G06F 17/30994* (2013.01); *G06Q 10/109* (2013.01)

(58) Field of Classification Search
USPC ......................................................... 715/765
See application file for complete search history.

(56) References Cited

U.S. PATENT DOCUMENTS 5,448,695 A * 9/1995 Douglas et al. ............... 715/809
5,864,340 A 1/1999 Bertram et al.
(Continued)

FOREIGN PATENT DOCUMENTS

JP 11-312038 11/1999
JP 2004-325937 11/2004
(Continued)

OTHER PUBLICATIONS

Enrico Rukzio, et al., "Automatic form filling on mobile devices", Pervasive and Mobile Computing, Elsevier, NL, vol. 4, No. 2, Mar. 13, 2008, pp. 161-181, XP022527974.
(Continued)

*Primary Examiner* — Stephen Alvesteffer
(74) *Attorney, Agent, or Firm* — Oblon, McClelland, Maier & Neustadt, L.L.P.

(57) ABSTRACT

An information processing apparatus includes a user evaluation value table and a display controller portion. In the user evaluation value table, user evaluation values each corresponding to the number of processes of the respective content are stored on a basis of the respective content. When performing display changing of a respective content intended for display on a display portion, the controller portion detects from the user evaluation value table a user evaluation value of a content intended to be graphically displayed on the display portion. Then, the controller portion performs change control to change a display time period for the content intended to be graphically displayed on the display portion in accordance with the detected user evaluation value.

9 Claims, 32 Drawing Sheets

(51) Int. Cl.
*G06F 15/02* (2006.01)
*G06F 17/30* (2006.01)
*G06Q 10/10* (2012.01)

(56) References Cited

U.S. PATENT DOCUMENTS

| | | | |
|---|---|---|---|
| 6,177,938 B1* | 1/2001 | Gould | 715/784 |
| 6,211,858 B1* | 4/2001 | Moon et al. | 715/771 |
| 6,268,854 B1* | 7/2001 | Borden et al. | 715/786 |
| 6,418,424 B1 | 7/2002 | Hoffberg et al. | |
| 6,567,103 B1* | 5/2003 | Chaudhry | 715/738 |
| 7,069,256 B1 | 6/2006 | Campos | |
| 2002/0054074 A1* | 5/2002 | Sugano et al. | 345/730 |
| 2002/0175953 A1* | 11/2002 | Lin | 345/811 |
| 2003/0085913 A1* | 5/2003 | Ahmad et al. | 345/730 |
| 2003/0105589 A1 | 6/2003 | Liu et al. | |
| 2003/0156140 A1* | 8/2003 | Watanabe | 345/810 |
| 2003/0202777 A1* | 10/2003 | Kogusuri | 386/95 |
| 2004/0018857 A1 | 1/2004 | Asokan et al. | |
| 2004/0044725 A1* | 3/2004 | Bell et al. | 709/203 |
| 2004/0205257 A1 | 10/2004 | Hughes et al. | |
| 2004/0210579 A1 | 10/2004 | Dettinger et al. | |
| 2004/0250205 A1* | 12/2004 | Conning | 715/517 |
| 2005/0055643 A1* | 3/2005 | Quimby | 715/763 |
| 2005/0071778 A1 | 3/2005 | Tokkonen | |
| 2005/0182503 A1* | 8/2005 | Lin et al. | 700/94 |
| 2005/0190280 A1* | 9/2005 | Haas et al. | 348/333.05 |
| 2005/0273830 A1 | 12/2005 | Silver et al. | |
| 2006/0095263 A1 | 5/2006 | Kawasaki et al. | |
| 2006/0095842 A1 | 5/2006 | Lehto | |
| 2006/0177197 A1* | 8/2006 | Nakamura et al. | 386/83 |
| 2007/0038931 A1* | 2/2007 | Allaire et al. | 715/526 |
| 2007/0143685 A1* | 6/2007 | Stillion et al. | 715/733 |
| 2008/0034284 A1* | 2/2008 | Skicewicz et al. | 715/246 |

FOREIGN PATENT DOCUMENTS

| | | |
|---|---|---|
| JP | 2005-322172 | 11/2005 |
| JP | 2006-99532 | 4/2006 |
| JP | 2006-157324 | 6/2006 |
| WO | WO 02/091160 A1 | 11/2002 |
| WO | WO 2005/043407 A1 | 5/2005 |

OTHER PUBLICATIONS

Stephan Sigg, et al., "A Study on Context Prediction and Adaptivity", Digital Information Management, 2007, ICDIM '07. $2^{ND}$ International L Conference on, IEEE, PI, Oct. 1, 2007, 6 pages, XP031211255.

Hiroyuki Komatsu, et al., "Corpus-based Predictive Text Input" Active Media Technology, 2005., (AMT 2005), Proceedings of the 2005 International Conference on Takamatsu, Kagawa, Japan, May 19-21, 2005, Piscataway, NJ, USA, IEEE, May 19, 2005, pp. 75-80, XP010833993.

Office Action issued Sep. 30, 2013 in Korean Patent Application No. 10-2007-0081874 (with English Translation).

* cited by examiner

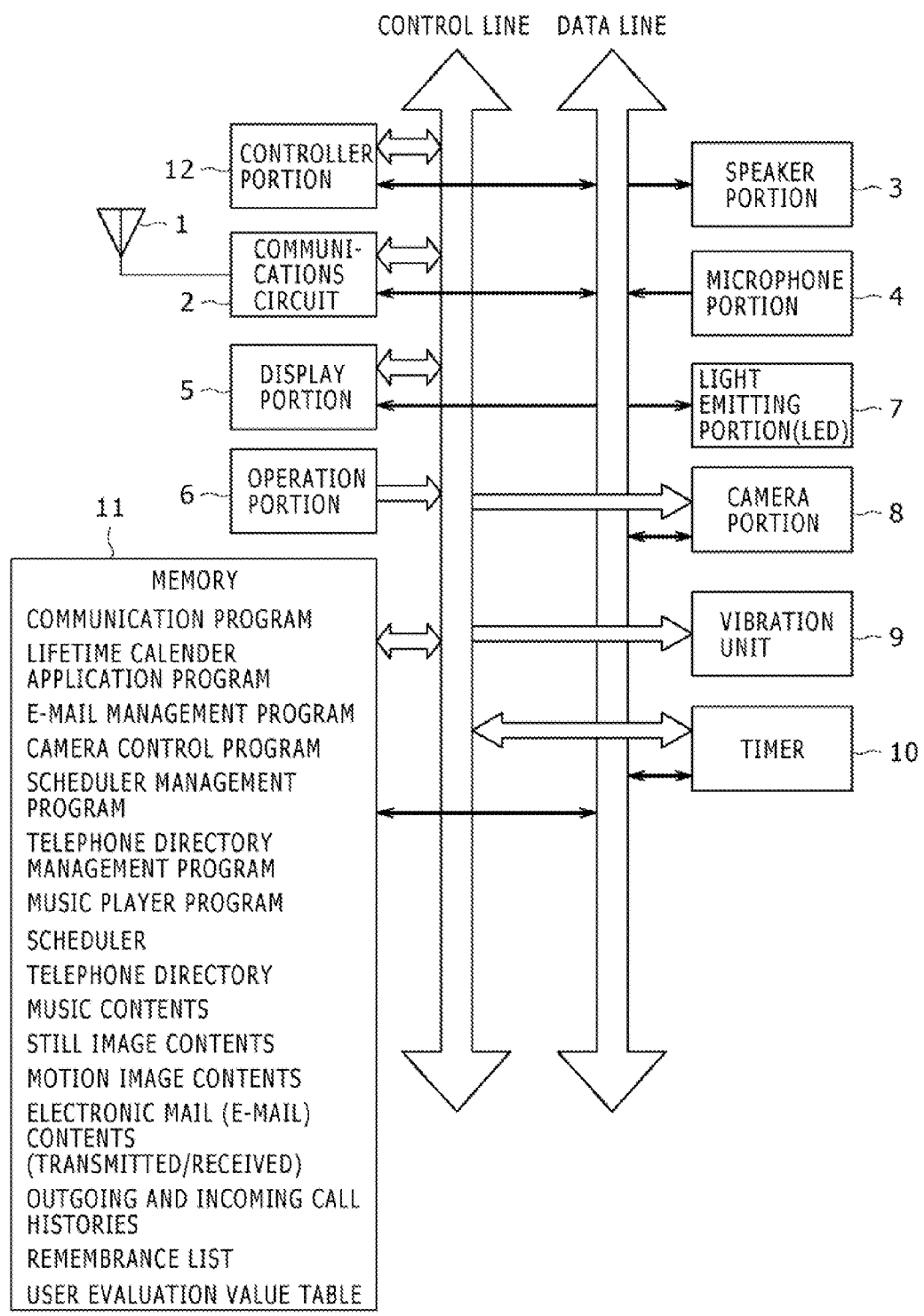

FIG. 3

| TYPES OF CONTENTS | METADATA BEING HANDLED | ASSOCIATED APPLICATION PROGRAMS |
|---|---|---|
| STILL IMAGE CONTENTS | · IMAGE TIME/STORED TIME<br>· THUMBNAIL IMAGE<br>· MANAGING TITLE<br>· FILE TYPE ICON (STILL IMAGE ICON)<br>· FILE SIZE ICON<br>· ACQUISITION SOURCE ICON | CAMERA CONTROL PROGRAM (VIEWER FUNCTION) |
| RECEIVED E-MAIL CONTENTS | · FILE TYPE ICON (RECEIVED MAIL ICON)<br>· RECEIVED TIME<br>· "From" ICON<br>· TRANSMISSION SOURCE NAME/ADDRESS<br>· ATTACHED DATA ICON<br>· SUBJECT-NAME ICON<br>· SUBJECT-NAME DATA<br>· TRANSMISSION SOURCE IMAGE | E-MAIL MANAGEMENT PROGRAM |
| TRANSMITTED E-MAIL CONTENTS | · FILE TYPE ICON (TRANSMITTED MAIL ICON)<br>· TRANSMITTED TIME<br>· "To" ICON<br>· ADDRESSEE NAME/ADDRESS<br>· ATTACHED DATA ICON<br>· SUBJECT-NAME ICON<br>· SUBJECT-NAME DATA<br>· ADDRESSEE IMAGE<br>· PLURAL-PERSONS ICON | E-MAIL MANAGEMENT PROGRAM |
| SCHEDULE CONTENTS | · START TIME<br>· FILE TYPE ICON (SCHEDULE ICON)<br>· CLASSIFICATION ICON<br>· SCHEDULE SUMMARY/CONTENTS<br>· ALARM ICON<br>· ALARM SETTING DATA<br>· HOLIDAY SETTING DATA | SCHEDULER MANAGEMENT PROGRAM |
| BIRTHDAY CONTENTS | · BIRTHDATE<br>· USER NAME<br>· FILE TYPE ICON (BIRTHDAY ICON)<br>· FRAME IMAGE (IMAGE-FRAME IMAGE)<br>· THUMBNAIL IMAGE | APPLICATION PROGRAM FOR TELEPHONE DIRECTORY OR APPLICATION PROGRAM FOR PERFORMING DISPLAY MANAGEMENT FOR PRIVATE INFORMATION OF THE EMBODIMENT MOBILE PHONE |

FIG.12

| | | | | 23:45 |
|---|---|---|---|---|

SEPTEMBER 13, 2005

| 27 | 10:05 | To | YAMASHITA | |
| | | Sub | SITE FOR BIRTHDAY PARTY | |
| 28 | 18:29 | To | OYAMADA | |
| | | Sub | NEXT MEAL MEETING | |
| 12 | 18:31 | From | FUNABASHI | |
| | | Sub | RE: NEXT MEAL MEETING | |
| | | | FUNABASHI | |
| 13 | 18:46 | | MEAL MEETING WITH YAMASHITA IN GINZA | |
| | | | ON | |
| | 13:00 | | WALK WITH DOG  1.2M | |
| 14 | | | YAMASHITA | |
| 15 | 12:05 | From | YAMASHITA | |
| | | Sub | THANK YOU FOR THE OTHER DAY | |

| FUNCTION MENU | △ SELECT ▽ | INDEX REMEMBRANCE |
|---|---|---|

FIG.27

| PROCESS COUNT VALUE | USER EVALUATION VALUE |
|---|---|
| 0~3 | 1 |
| 4~6 | 2 |
| 7~9 | 3 |
| 10~12 | 4 |
| 13 OR LARGER | 5 |

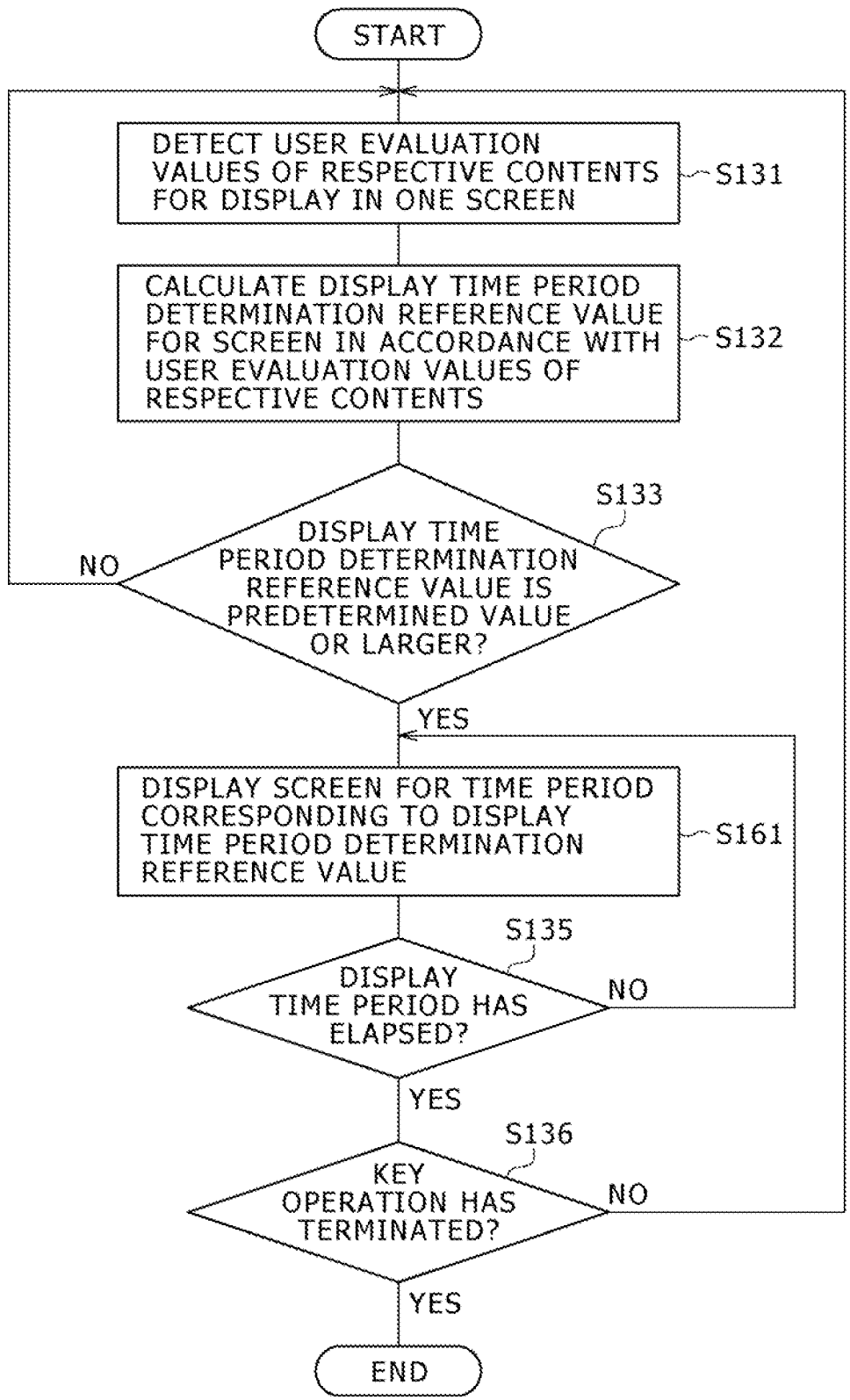

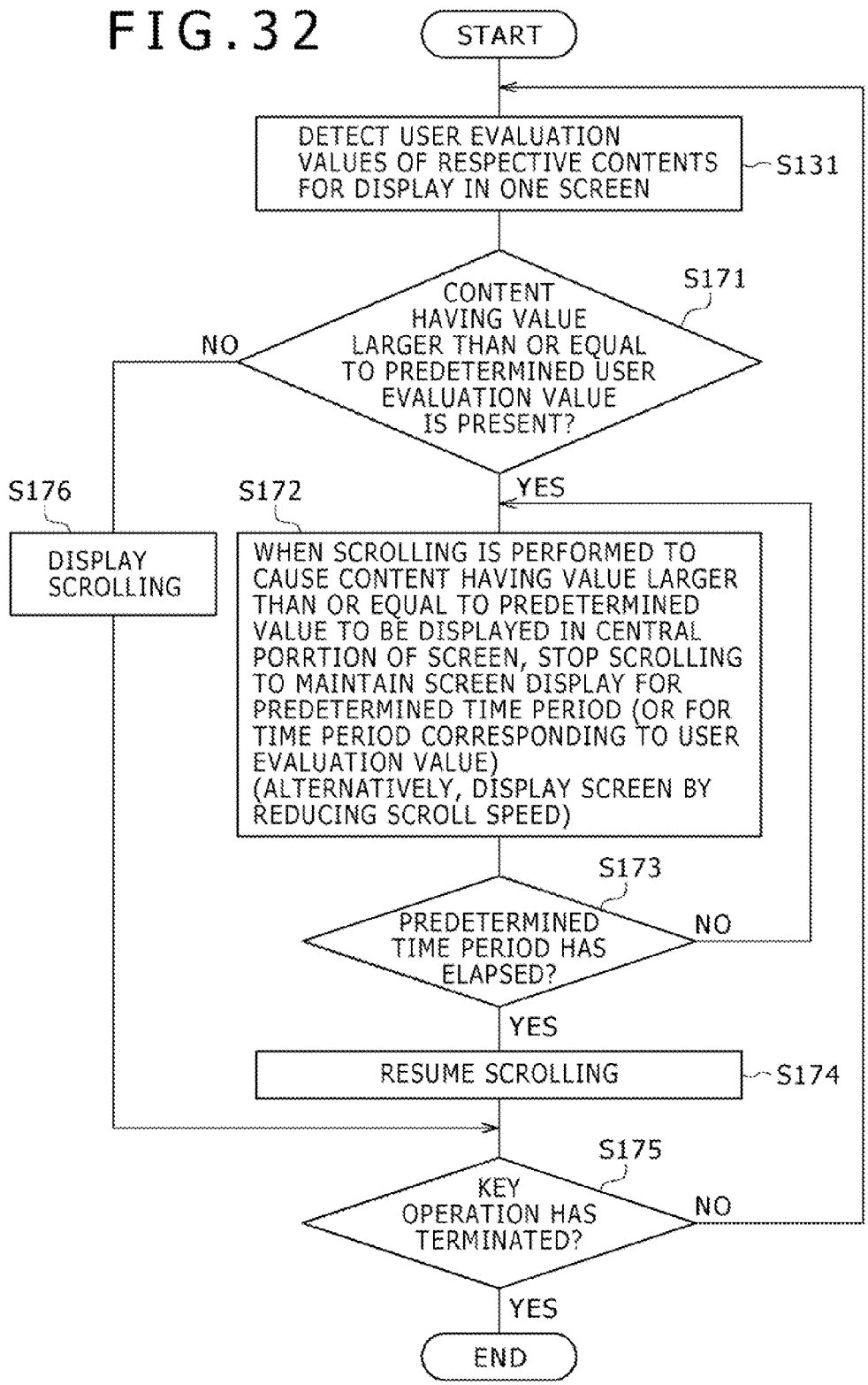

INFORMATION PROCESSING APPARATUS, METHOD AND COMPUTER PROGRAM STORAGE DEVICE HAVING USER EVALUATION VALUE TABLE FEATURES

CROSS REFERENCES TO RELATED APPLICATIONS

The present invention contains subject matter related to Japanese Patent Application JP 2006-221929 filed in the Japanese Patent Office on Aug. 16, 2006, the entire contents of which being incorporated herein by reference.

BACKGROUND OF THE INVENTION

1. Field of the Invention

The present invention relates to an information processing apparatus, an information processing method, and an information processing program that are well suited for adaptation to any one of mobile devices, such as mobile phones, PHS phones (PHS: personal handyphone system), and PDAs (PDA: personal digital assistant), and notebook personal computers.

2. Description of the Related Art

Japanese Unexamined Patent Application Publication No. 2004-325937 (Patent Publication 1) discloses an image display controller that enables the display time of a respective still image to be changed during sequential display in which a plurality of still images are being one-by-one displayed.

According to the image display controller, when a first button of a remote controller is depressed during the sequential display of the still images, a time interval of display changing for the still images for the sequentially display is reduced, thereby to perform high-speed display changing for the still images. Alternately, when a second button of the remote controller is depressed during the sequential display of the still images, the time interval of display changing for the still images for the sequentially display is increased, thereby to perform low-speed display changing for the still images. In this manner, even during the sequential display, the display time of the respective still image can be arbitrarily changed.

However, as described above, according to the image display controller disclosed in Patent Publication 1, a user has to perform the operation of depression of any one of the buttons of the remote controller. That is, in the period of time before display of a desired still image, the first button has to be depressed to perform the rapid display changing by reducing the time interval of display changing for the still images. At the timing of display of a desired still image, the second button has to be depressed to perform the low-speed display changing by increasing the time interval of display changing for the desired still image.

In this case, in the period of time before display of the desired still image, respective still images changed by the rapid display changing have to be carefully monitored. Further, a complicate operation has to be carried out in the manner that the rapid display changing is performed by carrying out the operation of depression of the second button, and then the operation is transitioned to the low-speed display changing.

SUMMARY OF THE INVENTION

It would be desirable to an information processing apparatus, an information processing method, and an information processing program that are capable of automatically retrieving and displaying a content with a high probability of being desired by a user (or "high user-selection probability," hereinbelow) without requiring complicate operation, careful attention, and the like.

According to one embodiment of the present invention, an information processing apparatus includes a user evaluation value table wherein user evaluation values each corresponding to the number of processes of the respective content are stored on a basis of the respective content; and a display controller portion that, when performing display changing of a respective content intended for display on a display portion, detects from the user evaluation value table a user evaluation value of a content intended to be graphically displayed on the display portion, and performs change control to change a display time period for the content intended to be graphically displayed on the display portion in accordance with the detected user evaluation value.

According to another embodiment of the present invention, an information processing method includes the steps of: when performing display screen changing across respective contents intended to be displayed on a display portion, detecting a user evaluation value of a content intended to be displayed on the display portion from a user evaluation value table wherein user evaluation values each corresponding to the number of processes of the respective content are stored on a basis of the respective content; and performing change control to change a display time period for the content intended to be graphically displayed on the display portion in accordance with the detected user evaluation value.

According to still another embodiment of the present invention, an information processing program includes: when performing display screen changing across respective contents intended to be displayed on a display portion, causing a computer to function as a user evaluation value detector portion that detects a user evaluation value of a content intended to be displayed on the display portion from a user evaluation value table wherein user evaluation values each corresponding to the number of processes of the respective content are stored on a basis of the respective content; and causing the computer to function as a display controller portion that performs change control to change a display time period for the content intended to be graphically displayed on the display portion in accordance with the detected user evaluation value.

According to the respective embodiment of the present invention, when performing display screen changing across respective contents intended to be graphically displayed on the display portion, change control is performed to change the display time period of the respective content in accordance with the user evaluation value of the respective content. Thereby, a content with high user-selection probability can be automatically retrieved, and the display time period of the content can be changed without complicate operation, careful attention, and the like being required.

BRIEF DESCRIPTION OF THE DRAWINGS

These and other objects, features and advantages of the present invention will be apparent from the following detailed description and the appended claims and drawings, in which:

FIG. 1 is a block diagram of a mobile phone of an embodiment of the present invention;

FIG. 3 is a diagram for explaining various contents that are handled by the lifetime calendar function provided in the mobile phone of the present embodiment;

FIG. 12 is a view showing an example of a list display screen of a day-view lifetime calendar;

FIG. 27 is a schematic diagram showing one example user evaluation value table;

FIG. 31 is an explanatory flow diagram of another page-jump changing operation performed in the mobile phone of the present embodiment; and FIG. 32 is an explanatory flow diagram of a scroll operation performed in the mobile phone of the present embodiment.

DETAILED DESCRIPTION OF THE PREFERRED EMBODIMENTS

Figure 2A:
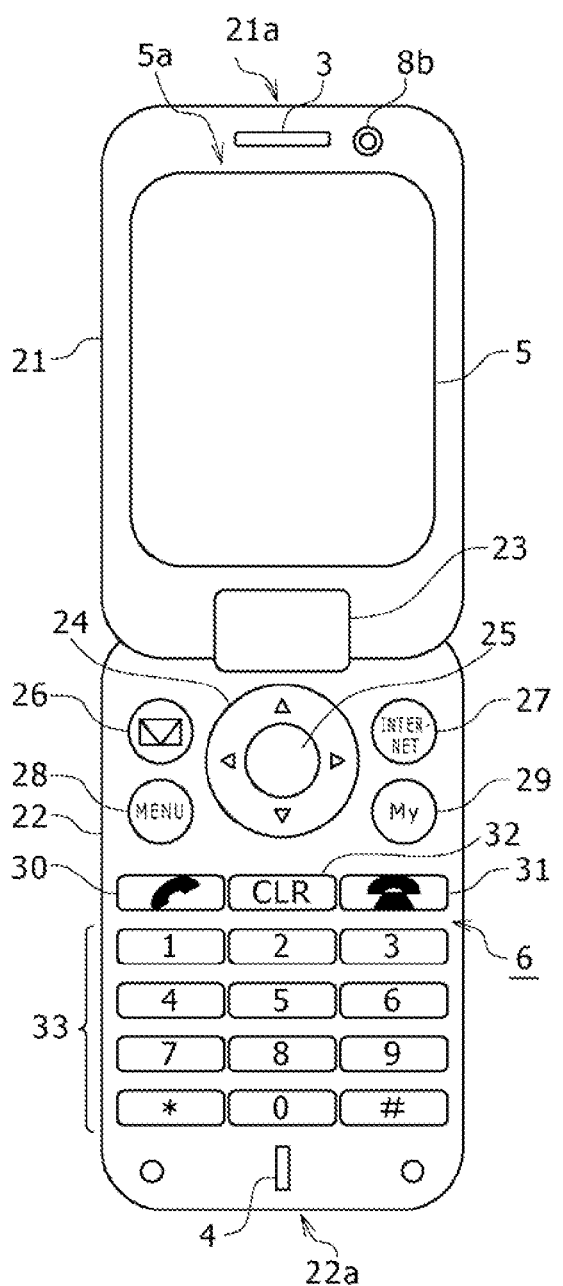
FIGS. 2A and 2B are views showing an exterior of the mobile phone of the embodiment.

The present invention is adaptable to a mobile phone.

(Electrical Configuration of Mobile Phone)

With reference to FIG. 1, a mobile phone of an embodiment of the present invention includes an antenna 1 and a communications circuit 2 for wireless communication with a base station, a speaker portion 3 for obtaining acoustic outputs such as incoming sounds and receiving audio, a microphone portion 4 for receiving or collecting transmitting audio, and a display portion 5 for displaying motion and/or still images as well as a "lifetime calendar" described further below.

The mobile phone further includes an operation portion 6, a light emitting portion 7 (LED: light emitting diode), a camera portion 8, and a vibration portion 9. The operation portion 6 is used for performing operations, such as, for example, input operation to input characters and the like, selection operation to select a desired menu. The light emitting portion 7 is used for notifying or informing a user of outgoing and incoming calls by using light. The camera portion 8 is used for capturing of still images and motion images of desired subjects. The vibration portion 9 is used for notifying or informing the user of, for example, outgoing and incoming calls by vibrating a housing of the mobile phone.

The mobile phone further includes a timer 10, a memory 11, and a controller portion 12. The timer 10 counts the current time. The memory 11 stores, for example, a communication processing programs (communication program) for performing wireless communication processing via the base station, various application programs, and various types of data (contents) to be handled by the respective application programs. The controller portion 12 provides total control of the mobile phone. (As such, the controller portion 12 provides various types of control operations, such as display control of the lifetime calendars, contents, icons, and focus moving and display control. However, such control operations hereinbelow will not be described on each occasion unless otherwise necessary).

The application programs stored in the memory 11 are an e-mail management program for controlling, for example, e-mail creation and transmission and reception; a camera control program that includes, for example, an imaging control function for controlling imaging operation of the camera unit 8, and a viewer function for motion and still images that are captured or acquired by the camera unit 8 or that are extracted across a network and an input terminal; and a scheduler management program for managing a scheduler in which user schedules are stored; a telephone directory management program for managing a telephone directory; and a music player program for playing back music contents.

The memory 11 further stores or contains a lifetime calendar application program that functions as so-called "launcher software." The application program displays the "lifetime calendar" on the display portion 5, and causes an application program corresponding to an information process, which is specified in accordance with the lifetime calendar, to be selected from the various types of application programs and to be driven.

The memory 11 further stores or contains various other data, such as, for example, a scheduler in which desired schedules of the user are stored; still images, telephone numbers, e-mail addresses, and birthdays of acquaintances and friends of the user; music contents to be played back in accordance with the music player program; still and motion image contents played back in accordance with the viewer function of the camera control program; e-mail contents; outgoing and incoming call histories of transmitted and received telephone calls and e-mail pieces; and a remembrances list or histories of operations of generating a "remembrance popup display" described further below.

As described further below, in the mobile phone of the present embodiment, the controller portion 12 operates to count the number of processes (or to obtain a process count value of processes), such as display and regeneration of a respective content, such as still image in accordance with the corresponding lifetime calendar application program. The content in this case is any one of, for example, motion image contents, e-mail contents, or music contents. Thereby, a resultant user evaluation value corresponding to the process count value is added to the respective content (in units of each content).

The memory 11 stores respective contents, such as described above, and a user evaluation value table indicative of or containing a user evaluation value of the respective contents. In the event of high-speed display changing, such as scroll display or jump display of contents, the controller portion 12 performs change control for changing a display time period for the respective content.

(Exterior Configuration of Mobile Phone)

Figure 2B:
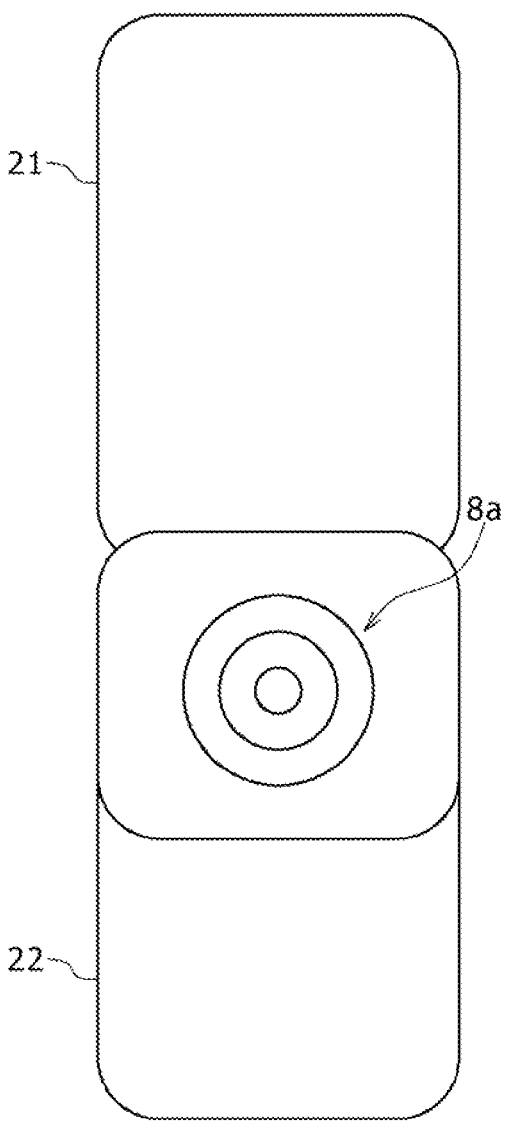

FIGS. 2A and 2B show one example of the exterior configuration of the mobile phone of the present embodiment. As shown in the drawings, the mobile phone of the present embodiment is of a so-called foldable type in which an upper housing portion 21 and a lower housing portion 22 are connected foldable via a hinge portion 23. FIG. 2A is a view of the mobile phone in an open state as viewed from an inner surface side (side of surfaces mated with one another in the close state); and FIG. 2B is a view of the mobile phone in the open state as viewed from the outer surface side.

With reference to FIG. 2A, the mobile phone has a display portion 5 in the upper housing portion 21. The mobile phone further has a communicating speaker portion 3 and a second camera portion 8b (or, "sub-camera portion," hereinbelow) between an upper end portion 21a of the housing portion 21 and an upper end portion 5a of the display portion 5. The mobile phone further has an operation portion 6 and a microphone portion 4, which is used for communication and surround audio collection, between the operation portion 6 and a lower end portion 22a of the lower housing portion 22.

The operation portion 6 includes a cross key 24 and an enter key 25. The cross key 24 is depressible in the upper-lower and left-right directions, and the cross key 25 is provided in a central portion of the cross key 24. The operation portion 6 further includes first to fourth keys 26 to 29. In a normal case, these keys are used as follows. The first soft key 26 is depressed when specifying activation of the e-mail management program. The second soft key 27 is depressed when specifying connection to a network such as the Internet. The third soft key 28 is depressed when specifying displaying of a main menu. The fourth soft key 29 is depressed when allocating and using a desired command.

The operation portion 6 further includes off-hook key 30 and on-hook key 31, a clear key 32, and 12 twelve-keys 33. In a normal case, these keys are used as follows. The off-hook key 30 is depressed for taking the mobile phone off-hook upon transmission or reception of communications. The on-hook key 31 is depressed to turn on/off the main power and to terminate communication. The clear key 32 is depressed, for example, to erase an input character(s) and to correct a specified operation. The 12 twelve-keys 33 are allocated to, for example, numerals "0" to "9," alphabets, an asterisk "*," and a sharp "#."

With reference to FIG. 2B, the mobile phone further has a first camera portion 8a (sub-camera portion) on a back surface side of the lower housing portion 22 (opposite side to a surface where the operation portion 6 is provided). More specifically, the mobile phone includes two lower face portions, a sub-camera portion 8a and the sub-camera portion 8b constituting the camera unit 8 shown in the block diagram of FIG. 1. The sub-camera portion 8a, primarily, is used to capture images of, for example, other users (other than the user of the present mobile phone) and scenery. The sub-camera portion 8b is used to capture the face of the user of the mobile phone in the event of communication while interactive transmission/reception of audio and image signals, so-called "videophone" communication, is carried out.

(Outline of Lifetime Calendar)

The mobile phone of the present embodiment has a function (lifetime calendar display function) that handles in batch various contents and that list-displays the contents in the form of the aforementioned "lifetime calendar" which displays the contents in the form of a list or calendar in time series. The contents are, but not limited to, image contents (still and motion image contents), e-mail contents, schedule contents, and telephone directory contents that, ordinarily, are handled independently of one another by corresponding dedicated application programs.

The lifetime calendar is displayed under the control of the controller portion 12 that operates in accordance with a lifetime calendar application program application stored in the memory 11. The lifetime calendar application program is a contents-launcher software linked with an application program for the respective content. More specifically, when executing, for example, editing, a dedicated application program corresponding to a content to be edited is activated.

A content of interest for display or for display on the lifetime calendar is arbitrarily specifiable in accordance with a "display setting function" and "filter setting function" described further below.

The lifetime calendar application program further has a "rating function" that randomly selects a representative content from among a plurality of contents by using a random number. For example, a case is now assumed that, for example, there are too many still image contents to be collectively displayed at one time (or, "batch-display," hereinbelow). In such a case, the controller portion 12 randomly selects a representative a still image content in accordance with the "rating function," and graphically displays it on the lifetime calendar.

Further, the representative content to be graphically displayed when contents cannot be displayed at one time on the lifetime calendar is changed at predetermined timing. In this case, a content other than contents once displayed is selected and displayed as a representative content.

In the mobile phone of the present embodiment, a "focus" on the lifetime calendar is moved corresponding to the operation of the operation portion 6, thereby to manipulate the lifetime calendar. The focus is a display pattern for displaying a frame portion or entirety of a display item such as a menu, content, or the like being selected by changing the brightness and/or display color from that of a non-selected menu or content. Description herebelow will use such an expression as "the focus is positioned on . . . " and its variations regarding operations for moving the focus.

In the present example, a selected menu, content, or the like is presented to be recognizable by the user in the manner that the selected menu, content, or the like is "focus-positioned." Alternately, however, the selected menu, content, or the like can be presented to be recognized in the fashion of so-called cursor movement.

The lifetime calendar application program further has a "remembrance popup function." When the focus is positioned on any date on the lifetime calendar for a predetermined time period or longer, the remembrance popup function overlays and displays a content corresponding to a past date (such as a one-year or one-month previous date) with respect to the focus-positioned date on a part of the lifetime calendar.

(Metadata to be Handled on Lifetime Calendar)

FIG. 3 shows types of respective contents to be handled by the lifetime calendar application program and part of metadata for the respective contents.

As seen in FIG. 3, the lifetime calendar application program handles "still image contents," "received e-mail contents," "transmitted e-mail contents," "schedule contents," "birthday contents" stored in the telephone directory, and "communication service contents."

Thus, as the types of contents to be handled by the lifetime calendar application program, FIG. 3 shows the still image contents, received e-mail contents, transmitted e-mail contents, schedule contents, and birthday contents that are stored in the telephone directory. However, not only those contents, but also contents such as motion image contents and music contents are handled by the lifetime calendar application program.

(Metadata for Still Image Contents)

For a "still image content," respective items of metadata are used for capture time/storage time data, thumbnail images, managing titles, file type icons (still image icons), file size icons, and acquisition source icons.

The capture time data represents information of time that is measured by the timer 10. When storing a still image captured or acquired by the camera unit 8 into the memory 11, the information of time is extracted and added by the controller portion 12 to a still image content.

However, among still images, a still image downloaded from a predetermined Web site is not provided with such added capture time data. In such a case, when storing a still image content into the memory 11, the controller portion 12 extracts information of time (=storage time) from the timer 10, and then adds the information of time to the still image. The presentation "capture time/storage time" in FIG. 3 refers to that in the above-described case.

The thumbnail image is an image having a size of, for example, 120 dots×160 dots formed by the controller portion 12. More specifically, when displaying a thumbnail image, the controller portion 12 forms the thumbnail image in real time in accordance with a source still image content stored in the memory 11. When displaying a thumbnail image of a motion image content on the lifetime calendar, the controller portion 12 forms a thumbnail image having the size of, for example, 120 dots×160 dots in real time from, for example, a first frame image corresponding to the motion image content, and then displays the thumbnail image on the lifetime calendar.

The managing title is data indicative of a title of a still image content. When storing a still image content captured or acquired by the camera unit 8 into the memory 11, the controller portion 12 automatically adds to the still image content an image date and capture time corresponding to current information of time extracted from the timer 10. That is, as a managing title of a still image content captured or acquired by the camera unit 8, a capture date and capture time are automatically added to the image in the first stage.

The managing title is editable after the still image content has been stored into the memory 11. For editing a desired managing title, a user displays a managing-title edit screen at a desired timing and operates the operation portion 6, thereby inputting the desired managing title on the screen. In response, the controller portion 12 overwrites the managing title input by the user with the capture date and capture time automatically added to the still image content. Thereby, the managing title of the still image content is altered to a desired managing title.

For a still image content already having an added managing title among still image contents acquired by, for example, downloading from predetermined Web sites, the controller portion 12 handles the added managing title as it is. For a still image contents without having an added managing title, however, the controller portion 12 adds the date and time of the downloading operation as a managing title. The automatically added managing title also is arbitrarily alterable by the user on the managing title edit screen.

On the lifetime calendar, various image formats are handleable, such as JPEG, GIF (inclusive of an animation GIF) (GIF: Graphic Interchange Format), SWF ("Shockwave Flash" (registered trademark), and IFM (stamp and frame) formats.

The file type icon (still image icon) is an icon indicative of the presence of a still image content in any one of the aforementioned image formats. The file size icon is an icon indicative of the file size of a still image content.

The acquisition source icon is an icon indicative of an acquisition source of the still image content. For, for example, a still image content captured or acquired by the camera unit 8, the lifetime calendar displays an icon indicative that the acquisition source is the camera unit 8. Alternately, for, for example, a still image content downloaded from a predetermined Web site, the calendar displays an icon indicative that the acquisition source is the Web site.

In the event that, for example, graphical display of a still image content on the lifetime calendar is specified, the controller portion 12 operates to display the specified still image content in accordance with the viewer function of the camera control program stored in the memory 11.

(Metadata for Received E-Mail Contents)

For a "received e-mail content," items of metadata for reception time data, file type icon (received mail icon), "From" icon, transmission source name/transmission source address (or, "transmission source name/address," hereafter), attached data icon, transmission source image, subject-name icon, and subject-name data are handled on the lifetime calendar.

The reception time data is data indicative of the time of receipt of a corresponding e-mail piece. The controller portion 12 extracts information of time from the timer 10 at the timing of receipt of an e-mail piece, adds the extracted information of time to the received e-mail piece, and stores the e-mail piece into the memory 11. The controller portion 12 graphically displays on the lifetime calendar the information of time added to the e-mail piece as reception time data.

The file type icon (received mail icon) is an icon indicative of the presence of a received e-mail content. One example is an icon that is formed of a sealed letter image with a down-pointing arrow to thereby represent the received e-mail content.

The "From" icon is an icon indicative of a display field for a transmission source name, and is represented by the word "From."

The transmission source image is an image of a respective user registered in the telephone directory. More specifically, registration fields for images of respective users are provided in the telephone directory stored in the memory 11. In a normal case, the user of the mobile phone registers a photographic image of, for example, a respective user's face captured or acquired by the camera unit 8 into the registration fields of the telephone directory. The controller portion 12 searches the telephone directory in accordance with an e-mail address accompanying a received e-mail content. Thereby, the controller portion 12 detects a photographic image (=transmission source image) of a user or a transmission source of the received e-mail content, and displays the image on the lifetime calendar. In this event, a case can takes place in which an image size of the image stored in the telephone directory is different from a display size on the lifetime calendar. In this case, the controller portion 12 performs a compacting or enlarging process of the image to an image having the size of, for example, 120 dots×160 dots, and then displays the image on the lifetime calendar.

The transmission source name/address is data indicative of a transmission source of a received e-mail piece. As the data indicative of the transmission source of the received e-mail piece, anyone of the transmission source name and address is displayed on the lifetime calendar through operation of the controller portion 12.

More specifically, according to the controller portion 12, the priority for display on the lifetime calendar is determined to be the order as: transmission source image, transmission source name, and then transmission source address. When a transmission source image, name, and address corresponding to a received e-mail piece are stored in the telephone directory, the transmission source image is graphically displayed on the lifetime calendar. Alternately, when a transmission source image corresponding to a received e-mail piece is not stored, but the transmission source name and address are stored therein, the transmission source name is displayed on the lifetime calendar. Alternately, when a transmission source image and name corresponding to a received e-mail piece are not stored in the telephone directory, but when only a transmission source address is stored in the telephone directory or is not stored therein, the transmission source address is displayed on the lifetime calendar.

The attached data icon is an icon that is displayed on the lifetime calendar through operation of the controller portion 12 in the case of a received e-mail piece accompanying attached data such as image data and/or music data. One example is an icon of a clip image displayed as the attached data icon on the lifetime calendar through operation of the controller portion 12, whereby the presence of the attached data is displayed to the user.

The subject-name icon is an icon indicative of a display field for a caption (subject name) given to a received e-mail content. The subject-name data is a caption (subject name) given to a received e-mail content. The subject-name data, which is given to the received e-mail piece, to be adjacent the subject-name icon is displayed on the lifetime calendar.

In the event that displaying or the like of a received e-mail content is specified on the lifetime calendar, the controller portion 12 activates the e-mail management program, which is stored in the memory 11, thereby to display text and the like of the specified received e-mail content.

In the event that display or the like of attached data attached to a received e-mail content is specified on the lifetime calendar, the controller portion 12 activates an application program corresponding to the attached data, thereby to graphically display the specified attached data. For example, in the case that a still image is attached as attached data, when graphical display of the attached data is specified on the lifetime calendar, the controller portion 12 graphically displays on the lifetime calendar the still image (attached data) in accordance with the viewer function of the camera control program stored in the memory 11. Similarly, for example, in the case of a music content attached as attached data, when regeneration of the attached data is specified on the lifetime calendar, the music content (attached data) is played back in accordance with the music player program stored in the memory 11.

(Metadata for Transmitted E-Mail Contents)

For a "transmitted e-mail content," items of metadata for transmission time data, file type icon (transmitted e-mail icon), "To" icon, addressee name/address, plural-persons icon, attached data icon, addressee image, subject-name icon, and subject-name data are handled on the lifetime calendar.

The transmission time data is data indicative of the time of transmission of a corresponding e-mail piece. The controller portion 12 extracts information of time from the timer 10 at the timing of transmission of an e-mail piece, adds the extracted information of time to the transmitted e-mail piece, and stores the e-mail piece into the memory 11. The controller portion 12 graphically displays the information of time added to the e-mail piece on the lifetime calendar as transmission time data.

The file type icon (transmitted e-mail icon) is an icon indicative of the presence of a transmitted e-mail content. One example is an icon that is formed of a sealed letter image with an up-pointing arrow representing transmission.

The "To" icon is an icon indicative of a display field for a user name (addressee name), and is represented by the word "To."

Similar to the transmission source image, the addressee image is an image of a respective user registered in the telephone directory. On the lifetime calendar, images of respective users registered in the telephone directory are handled as "transmission source images" and "addressee images." As described above, in the case that the image size of an image stored in the telephone directory is different from the display size on the lifetime calendar, the controller portion 12 graphically displays the image on the lifetime calendar by performing the compacting or enlarging process of the image.

The addressee name/address is data indicative of an addressee of a transmitted e-mail piece. As the data indicative of the addressee of the transmitted e-mail piece, anyone of the addressee name and address is displayed on the lifetime calendar.

More specifically, according to the controller portion 12, the priority for graphical display on the lifetime calendar is determined to be the order as: addressee image, addressee name, and then addressee address. When an addressee image, name, and address corresponding to a transmitted e-mail piece are stored in the telephone directory, the addressee image is graphically displayed on the lifetime calendar. Alternately, when an addressee image corresponding to a transmitted e-mail piece is not stored, but the addressee name and address are stored therein, the addressee name is displayed on the lifetime calendar. Alternately, when an addressee image and name corresponding to a transmitted e-mail piece are not stored in the telephone directory, but when only an addressee address is stored in the telephone directory or is not stored therein, the addressee address is displayed on the lifetime calendar.

The plural-persons icon is an icon that is displayed when a corresponding transmitted e-mail content is an e-mail piece synchronously transmitted to plural users. One example of the plural-persons icon is an icon formed from an image of three persons, thereby to enable the user to intuitively recognize that the e-mail piece has been synchronously transmitted to plural persons.

In the present example, while the plural-persons icon is designed to be displayed only for an e-mail piece having been synchronously transmitted to plural persons, such as described above, the presentation manner is not limited thereto. The functional arrangement can be such that even when a received e-mail piece having been synchronously transmitted to plural persons, the plural-persons icon is displayed, thereby to indicate that the received e-mail piece has been synchronously transmitted to the plural persons.

The attached data icon is an icon that is displayed on the lifetime calendar through operation of the controller portion 12 in the case of a transmitted e-mail piece accompanying attached data such as image data and/or music data. One example is the icon of the clip image, as described above.

The subject-name icon is an icon indicative of a display field for a caption (subject name) given to a transmitted e-mail content. The subject-name data is a caption (subject name) given to a transmitted e-mail content. The controller portion 12 graphically displays on the lifetime calendar the subject-name data, which is given to the transmitted e-mail piece, to be adjacent the subject-name icon on the lifetime calendar.

In the event that, for example, display of a transmitted e-mail content is specified on the lifetime calendar, the controller portion 12 activates the e-mail management program, which is stored in the memory 11, thereby to display text and the like of the specified transmitted e-mail content.

In the event that, for example, display of attached data attached to a transmitted e-mail content is specified on the lifetime calendar, the controller portion 12 activates an application program corresponding to the attached data, thereby to display the specified attached data. For example, in the case that a still image is attached as attached data, when display of the attached data is specified on the lifetime calendar, the controller portion 12 graphically displays the still image (attached data) in accordance with the viewer function of the camera control program stored in the memory 11. Similarly, for example, in the case of a music content attached as attached data, when regeneration of the attached data is specified on the lifetime calendar, the music content (attached data) is played back in accordance with the music player program stored in the memory 11.

(Metadata for Schedule Contents)

For a "schedule content," items of metadata for schedule start time data, file type icon (schedule icon), classification icon, data indicative of a schedule summary/content, alarm icon, data indicative of alarm ON/OFF setting, and holiday setting data are handled on the lifetime calendar.

The schedule start time data is data indicative of schedule start time data stored in the scheduler. For graphically displaying a schedule on the lifetime calendar, the controller portion 12 detects a schedule start time stored in the scheduler, and displays the detected schedule start time on the lifetime calendar.

The file type icon (schedule icon) is an icon indicative of the presence of a schedule. For one example, the schedule icon is an icon of an image of a calendar and pencil as a motif and is displayed on the lifetime calendar.

The classification icon is an icon indicative of the classification of stored schedules. When registering a schedule into the scheduler, the user selects a classification icon corresponding to a stored schedule from list-displayed classification icons. The lifetime calendar displays the classification icon selected when the schedule has been selected by the user, together with the schedule start time.

Data indicative of a schedule summary/content is data input into the field for a caption (subject name) of a schedule when the user registers the schedule. The lifetime calendar graphically displays the data input into the caption field as a summary of the schedule.

When nothing is input into the caption field for the schedule, the controller portion 12 graphically displays on the lifetime calendar a character string of, for example, 10 characters from the top of a character string input into a field for the content (content field) of the schedule. The "schedule summary/content" shown in FIG. 3 refer to the above described.

The alarm icon is an icon formed from an image of, for example, a bell, as a motif. The data indicative of the alarm ON/OFF setting is data indicative of whether the alarm setting is specified for the schedule. When the alarm setting is specified for the schedule, the lifetime calendar displays the word "ON" to be adjacent the alarm icon formed from the bell image. Otherwise, when the alarm setting is not specified for the schedule, the lifetime calendar displays the word "OFF" to be adjacent the alarm icon formed from the bell image.

The holiday setting data is data indicative of a holiday specified by the user for the scheduler. For example, when the user personally is scheduled to have a day off on a date corresponding to a general weekday, the date corresponding to the day off can be stored by the user on the scheduler as a holiday. The controller portion 12 determines from the scheduler whether a holiday setting is specified for a displayed date on the lifetime calendar. If a holiday setting is specified for the displayed date, then the controller portion 12 performs a process of altering the display mode, such as a process of altering a display color of a corresponding date field, for the displayed date, and displays the result on the lifetime calendar.

When, for example, graphical display of a schedule is specified on the lifetime calendar, the controller portion 12 activates the scheduler management program stored in the memory 11 thereby to graphically display the content or the like of the specified schedule.

Suppose that, for registration of a schedule into the scheduler, the functional arrangement allows inputting a "location" such as a "company," "school," or "house" where an event of the schedule takes place. In this case, the functional arrangement can be such that the controller portion 12 reads from the scheduler the location where the event of the schedule takes place, and graphically displays the location on the lifetime calendar.

(Metadata for Birthday Contents)

For a "birthday content," items of metadata for birthdate data, user name, file type icon (birthday icon), frame image (image-frame image), and thumbnail image are handled on the lifetime calendar.

In the mobile phone of the present embodiment, the telephone directory includes registration fields for not only user names of users, telephone numbers, and e-mail addresses, but also still images taken of the users, frame images (or, image frames), and birthdates.

Further, in the mobile phone of the present embodiment, registration fields for private information of the user or user of the mobile phone are provided separately from the telephone directory described above. The private information includes, for example, a still image, frame image (image frame), address, e-mail address, mobile phone number, and birthdate.

In accordance with the telephone directory or respective items of information stored in the private information registration fields, a birthday icon, still image, and user name are displayed in the respective corresponding display field on the lifetime calendar. The birthday icon is an icon of, for example, a cake image, frame image (image frame of, for example, a flower image(s)) (which, alternately, can be a frame image selected by the owner or user of the mobile phone from a plurality of frame images). The still image is a still image of the face or the like of a user whose birthday corresponds to the displayed date or still image of the face or the like of the user of the mobile phone. The user name is a user name of a user whose birthday corresponds to the displayed date or user name of the user of the mobile phone. These items are displayed on a display field for a date corresponding to the birthday of the user registered in the telephone directory or a display field for a date corresponding to the birthday of the user of the mobile phone stored in the private information registration fields.

When the "birthday content" is selected on the lifetime calendar, the controller portion 12 activates an application program corresponding to the telephone directory, thereby to perform display control of the private information registration fields for the user corresponding to the "birthday content." Alternatively, the controller portion 12 activates an application program for displaying the private information of the user of the mobile phone, thereby to perform display control of the private information registration fields for the user of the mobile phone which fields correspond to the "birthday contents."

(Details on Setting of Lifetime Calendar)

Figure 4A:
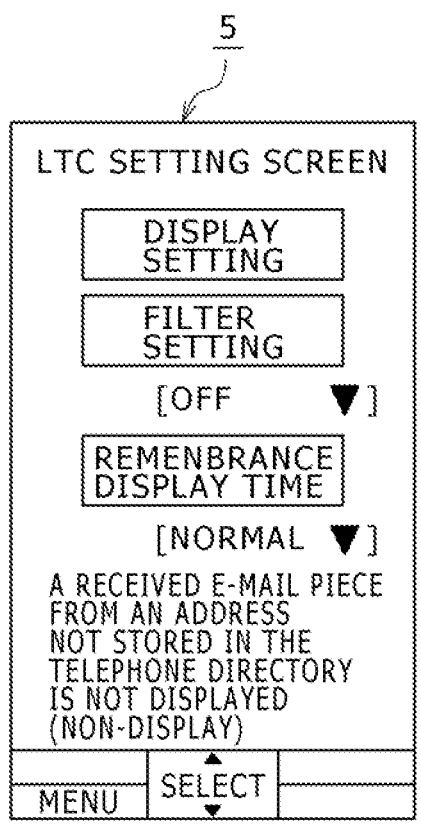
FIGS. 4A and 4B are diagrams showing various set screens of the lifetime calendar function provided in the mobile phone of the present embodiment.

Items such as the presence or absence of a display of the respective content being handled on the lifetime calendar and the time until the content is graphically displayed are specifiable on a setting screen for the lifetime calendar. For setting the items, the user operates the operation portion 6 and thereby causes an overall setting menu to be displayed on the display portion 5. Then, the user selects a setting menu for the lifetime calendar from the overall setting menu. In response to the operation, a lifetime calendar setup screen ("LTC Setup Screen") shown in FIG. 4A is displayed on the display portion 5.

The LTC Setup Screen displays setting menus entitled "Display Setting," "Filter Setting," and "Remembrance Display Time." In response to an up-down operation of the cross key 24 (shown in FIG. 2A) by a user, the controller portion 12 performs moving and displaying control of the focus to be moved and displayed among the "Display Setting," "Filter Setting," and "Remembrance Display Time" setting menus among or across the "Display Setting," "Filter Setting," and "Remembrance Display Time" setting menus.

When the focus is positioned on the respective setup menu through the moving and displaying control, an explanatory text regarding the focus-positioned setting menu is graphically displayed. More specifically, FIG. 4A shows an example in which the focus is set on the "Filter Setting" setting menu. In this case, an explanatory text, such as saying "A received mail from an address not stored in the telephone directory is held non-displayed," is graphically displayed in a marginal area of the display portion 5. Thus, explanatory texts of focus-positioned setting menu items are displayed. Thereby, the user is enabled to recognize the set contents of a currently focus-positioned setting menu and is enabled to easily select a user-desired setting menu.

Then, through an up-down operation of the cross key 24, the user moves the focus to desired one of the "Display Setting," "Filter Setting," and "Remembrance Display Time" setting menus, and then depresses the enter key 25.

(Display Setting)

Figure 4B:
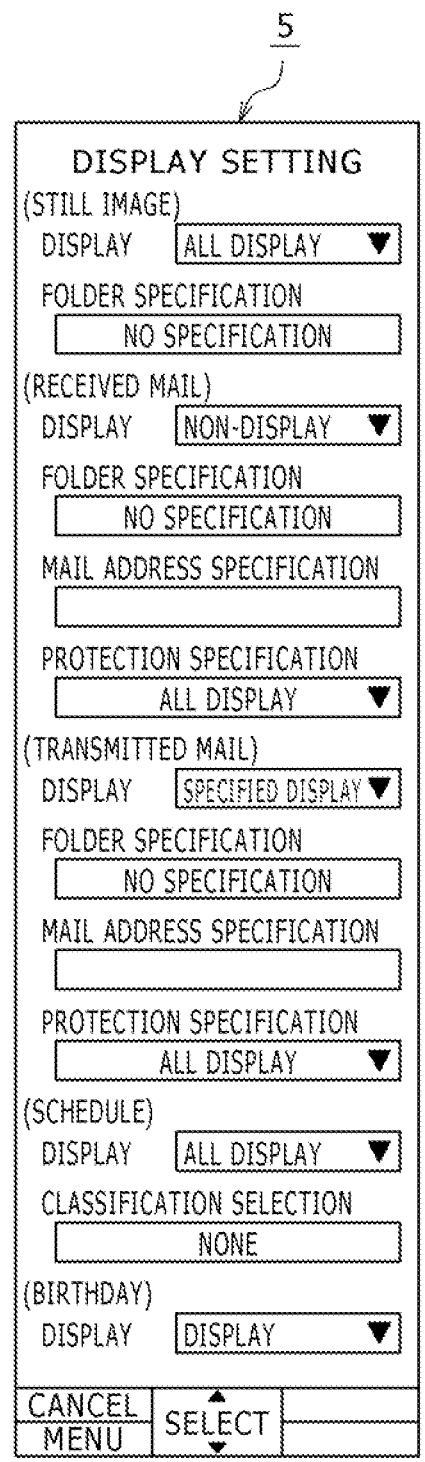

"Display Setting" will be described hereinbelow. In the state the focus is positioned on the "Display Setting" setting menu, when the enter key 25 is depressed, a display screen displaying the "Display Setting" setting menu as shown in FIG. 4B is displayed. The "Display Setting" setting menu is used to set whether to graphically display a still image content, received e-mail content, transmitted e-mail content, schedule content, and birthday content on the lifetime calendar.

More specifically, the controller portion 12 operates to display respective setting menu items corresponding to the still image content, received e-mail content, transmitted e-mail content, schedule content, and birthday content, as setting menu items of "Display Setting" setting menu.

Of those setting menu items, the "still image content" setting menu is a menu for specifying, for example, the presence or absence of the graphical display of a still image and for specifying a folder that contains still images for graphical display.

When not restricting a still image for graphical display on the lifetime calendar, the user selects "All Display" from a pull-down menu of "All Display," "Specified Display," and "Non-display." When "All Display" is selected, a still image for graphical display on the lifetime calendar is selected from all still images stored in the mobile phone, and is graphically displayed.

When not graphically displaying the still image on the lifetime calendar, the user selects "Non-display" from the pull-down menu of "All Display," "Specified Display," and "Non-display." When "Non-display" is selected, the controller portion 12 excludes the all still images stored in the mobile phone from graphical display targets for graphical display on the lifetime calendar. As such, when "Non-display" is selected, no still image (stored in the mobile phone) is graphically displayed on the lifetime calendar.

When specifying a folder containing still images for display on the lifetime calendar, the user selects "Specified Display" from the pull-down menu of "All Display," "Specified Display," and "Non-display." When "Specified Display" is selected, a selection field of "Folder Specification." is highest-tone displayed. More specifically, when either "All Display" or "Non-display" is selected from the pull-down menu, the selection field of "Folder Specification" is half-tone displayed (gray displayed), thereby displaying to the user that the selection field of "Folder Specification" is non-active. When "Specified Display" is selected, however, the selection field of "Folder Specification" is highest-tone displayed, thereby displaying to the user that the selection field of "Folder Specification" is active.

In the mobile phone of the present embodiment, the user can classify, for example, still images by, for example, capture time or title, and can store the classified still images into a plurality of still image folders formed in the memory 11. Still images in this case may be, for example, still images captured or acquired by the camera portion 8, still images downloaded across a network or the like, and still images attached to transmitted and received mail pieces. Having shifted the selection field of the "Folder Specification" to be active, the user specifies a desired one of folders. When the specification is made (or in response to the specification), the controller portion 12 graphically displays on the lifetime calendar only a still image(s) stored in the folder specified by the user.

The "received e-mail content" setting menu item will now be described hereinbelow. The "received e-mail content" setting menu item is used to set, for example, the presence or absence of a graphical display of a received e-mail piece on the lifetime calendar, a folder containing received e-mail pieces for graphical display, e-mail addresses, and types of the received e-mail contents.

When all received e-mail pieces can be graphically displayed on the lifetime calendar, the user selects "All Display" from the pull-down menu of "All Display," "Specified Display," and "Non-display." When "All Display" is selected, a received e-mail piece for graphical display on the lifetime calendar is selected from all received e-mail pieces stored in the mobile phone, and is graphically displayed thereon.

When not graphically displaying the received e-mail piece on the lifetime calendar, the user selects "Non-display" from the pull-down menu of "All Display," "Specified Display," and "Non-display." When "Non-display" is selected, the controller portion 12 excludes the all received e-mail contents stored in the mobile phone from graphical display targets for graphical display on the lifetime calendar. As such, when "Non-display" is selected, no received e-mail content is graphically displayed on the lifetime calendar.

Alternately, for graphically displaying only a specified received e-mail content on the lifetime calendar, the user selects "Specified Display" from the pull-down menu of "All Display," "Specified Display," and "Non-display." When "Specified Display" is selected, highest-tone display is performed to display respective selection fields of "Folder Specification," "Mail Address Specification," and "Protection Specification."

More specifically, in the event that either "All Display" or "Non-display" is selected from the pull-down menu, the respective selection fields of "Folder Specification," "Mail Address Specification," and "Protection Specification" are half-tone displayed (gray displayed), thereby displaying to the user that the respective selection fields are non-active. When "Specified Display" is selected, however, the respective selection fields of "Folder Specification," "Mail Address Specification," and "Protection Specification" are highest-tone displayed, thereby displaying to the user that the respective selection fields have become active.

In the mobile phone of the present embodiment, a plurality of received e-mail folders can be formed in the memory 11. Thereby, the user is enabled to classify received e-mail contents by classifying the contents by, for example, respective receive times and transmitted users of the received e-mail contents and to store the classified received e-mail contents into corresponding folders. As such, when specifying "Folder Specification" field, the user specifies a desired one of the folders containing classified received e-mail pieces. Alternatively, when received e-mail pieces stored in all the folders can be displayed, the user enters a specification for all the folders. In response to the specification, the controller portion 12 graphically displays on the lifetime calendar only a received e-mail piece(s) stored in the specified folder.

When specifying "Mail Address Specification," the user specifies an e-mail address of a user or sender of a received e-mail piece. E-mail address specification is carried out by specifying a desired user (=desired e-mail address) from the telephone directory, transmission ranking (ranking sequentially indicative of users in order of relatively larger numbers of transmission times for the users), and reception ranking (ranking sequentially indicative of users in order of relatively larger numbers of reception times from the users). The e-mail address specification can be carried out in the manner that the user directly input the address through operation of the operation portion 6. In response to the e-mail address specification, the controller portion 12 graphically displays on the lifetime calendar only the received e-mail piece having the e-mail address specified by the user.

Further, in the mobile phone of the present embodiment, "Protection Setting" for preventing inadvertent erasure or mis-erasure of a desired one of received e-mail pieces. As such, of the all received e-mail pieces stored in the mobile phone, only a received e-mail piece specified to "Protection Setting" (i.e., only a protection-set received e-mail piece) can be graphically displayed as a received e-mail content on the lifetime calendar.

More specifically, "All Display" and "Protected Mail Only" selection options are provided for a selection field of "Protection Specification." When all received e-mail pieces stored in the mobile phone can be graphically displayed, the user selects the "All Display" menu item. When the selection is made, received e-mail contents are graphically displayed on the lifetime calendar, regardless of whether the protection setting is specified for the received e-mail pieces (i.e., whether the received e-mail pieces are protection-set received e-mail pieces). Alternately, for graphically displaying only a protection-set one of the all received e-mail pieces on the lifetime calendar, the user selects the "Protected Mail Only" selection option. In response to the selection, the controller portion 12 graphically displays only the protection-set e-mail piece on the lifetime calendar.

As described above, according to the mobile phone of the present embodiment, a received e-mail content for graphical display on the lifetime calendar is specifiable with the display condition for, the folder containing the content, the presence or absence of the protection setting, and the like conditions. When a plurality of such display conditions are set by the user, the controller portion 12 graphically displays on the lifetime calendar only a received e-mail content satisfying all the display conditions.

The "transmitted e-mail content" setting menu item will now be described hereinbelow. The "transmitted e-mail content" setting menu item is used to set, for example, the presence or absence of a graphical display of a transmitted e-mail piece on the lifetime calendar, a folder containing transmitted e-mail pieces for graphical display, e-mail addresses, and types of the transmitted e-mail contents.

When not restricting a transmitted e-mail piece for graphical display on the lifetime calendar, the user selects "All Display" from the pull-down menu of "All Display," "Specified Display," and "Non-display." When "All Display" is selected, a transmitted e-mail piece for graphical display on the lifetime calendar is selected from all transmitted e-mail pieces stored in the mobile phone, and is graphically displayed thereon.

Alternately, when not graphically displaying the transmitted e-mail piece on the lifetime calendar, the user selects "Non-display" from the pull-down menu of "All Display," "Specified Display," and "Non-display." When "Non-display" is selected, the controller portion 12 excludes the all transmitted e-mail contents stored in the mobile phone from graphical display targets for graphical display on the lifetime calendar. As such, when "Non-display" is selected, no transmitted e-mail content is graphically displayed on the lifetime calendar.

Alternately, for graphically displaying only a specified transmitted e-mail content on the lifetime calendar, the user selects "Specified Display" from the pull-down menu of "All Display," "Specified Display," and "Non-display." When "Specified Display" is selected, highest-tone display is performed to display respective selection fields of "Folder Specification," "Mail Address Specification," and "Protection Specification," thereby displaying to the user that the respective selection fields have become active.

Similarly as in the previous case described above, a plurality of transmitted e-mail folders can be formed in the memory 11. Thereby, the user is enabled to classify transmitted e-mail contents by classifying the contents by, for example, respective transmission times of the transmitted e-mail contents and respective users corresponding to transmission addressees (recipients) of the transmitted e-mail pieces and to store the classified transmitted e-mail contents into corresponding folders. As such, when specifying "Folder Specification" field, the user specifies a desired one of the folders containing classified transmitted e-mail pieces. Alternatively, when transmitted e-mail pieces stored in all the folders can be graphically displayed, the user enters a specification for all the folders. In response to the specification, the controller portion 12 graphically displays on the lifetime calendar only a transmitted e-mail piece(s) stored in the specified folder.

When specifying "Mail Address Specification," the user specifies an e-mail address of a user, i.e., addressee address of a transmitted e-mail piece. E-mail address specification is carried out by specifying a desired user (=desired e-mail address) from the telephone directory, transmission ranking (ranking sequentially indicative of users in order of relatively larger numbers of transmission times for the users), and reception ranking (ranking sequentially indicative of users in order of relatively larger numbers of reception times from the users).

The e-mail address specification can be carried out in the manner that the user directly input the address through operation of the operation portion 6. In response to the e-mail address specification, the controller portion 12 graphically displays on the lifetime calendar only the transmitted e-mail piece having the e-mail address specified by the user.

Further, in the mobile phone of the present embodiment, "Protection Setting" for preventing inadvertent erasure or mis-erasure of a desired one of transmitted e-mail pieces. As such, of the all transmitted e-mail pieces stored in the mobile phone, only a transmitted e-mail piece specified to "Protection Setting" (i.e., only a protection-set transmitted e-mail piece) can be graphically displayed as a transmitted e-mail piece on the lifetime calendar.

More specifically, "All Display" and "Protected Mail Only" selection options are provided for the selection field of "Protection Specification." When the all transmitted e-mail contents stored in the mobile phone can be graphically displayed, the user selects the "All Display" menu item. When the selection is made, transmitted e-mail contents are graphically displayed on the lifetime calendar, regardless of whether the transmitted e-mail pieces are protection-set transmitted e-mail pieces.

Alternately, for graphically displaying only a protection-set one of the all transmitted e-mail pieces on the lifetime calendar, the user selects the "Protected Mail Only" selection option. In response to the selection, only the protection-set e-mail content is graphically displayed on the lifetime calendar.

As described above, according to the mobile phone of the present embodiment, a transmitted e-mail content for graphical display on the lifetime calendar is specifiable with the display condition for, the folder containing the content, the presence or absence of the protection setting, or the like conditions. When a plurality of such display conditions are set by the user, only a transmitted e-mail content satisfying all the display conditions is graphically displayed on the lifetime calendar.

The "schedule content" setting menu item will now be described hereinbelow. The "schedule content" setting menu item is used to set, for example, the presence or absence of a graphical display of a schedule on the lifetime calendar and classification of schedule(s) for graphical display.

When all schedules for graphical display on the lifetime calendar can be graphically displayed, the user selects "All Display" from the pull-down menu of "All Display," "Specified Display," and "Non-display." When "All Display" is selected, a schedule for graphical display on the lifetime calendar is selected from all schedules stored in the scheduler of the mobile phone, and is graphically displayed thereon.

Alternately, when not graphically displaying the schedule on the lifetime calendar, the user selects "Non-display" from the pull-down menu of "All Display," "Specified Display," and "Non-display." When "Non-display" is selected, the controller portion 12 excludes the all schedules stored in the scheduler of the mobile phone from graphical display targets for graphical display on the lifetime calendar. As such, when "Non-display" is selected, no schedule is graphically displayed on the lifetime calendar.

Alternately, when specifying the classification of a schedule on the lifetime calendar, the user selects "Specified Display" from the pull-down menu of "All Display," "Specified Display," and "Non-display." When "Specified Display" is selected, highest-tone display is performed to display the selection field of "Classification Selection," thereby displaying to the user that the field has become active.

In the mobile phone, in the event of schedule registration, the classification of a schedule of a company, school, meal, drive, sports, or the like event is set. As such, when using "Classification Selection," the user specifies a desired classification of a schedule. In response to the specification, the controller portion 12 graphically displays on the lifetime calendar only the user-specified classified one (schedule) of the all schedules stored in the scheduler.

The "birthday content" setting menu item will now be described hereinbelow. The "birthday content" setting menu item is used to set whether to graphically display a "birthday content" on the lifetime calendar. When permitting graphical display on the lifetime calendar, birthday contents corresponding to all users registered in the telephone directory and the birthday content registered in the registration field of private information, the user selects "All Display" from the pull-down menu of "All Display," "Specified Display," and "Non-display." When "All Display" is selected, the controller portion 12 recognizes displays the all users' birthday contents registered in the telephone directory and the birthday content registered in the registration field of private information corresponding to the information on the user of the mobile phone, as graphical display targets for graphical display on the lifetime calendar.

Alternately, when not graphically displaying the schedule on the lifetime calendar, the user selects "Non-display" from the pull-down menu of "All Display," "Specified Display," and "Non-display." When "Non-display" is selected, the controller portion 12 excludes the all birthday contents corresponding to users and the birthday content stored in the registration field of private information from graphical display targets for graphical display on the lifetime calendar. As such, when "Non-display" is selected, no birthday content is graphically displayed on the lifetime calendar.

(Filter Setting)

"Filter Setting" will now be described hereinbelow. In the state the focus is positioned on the "Filter Setting" setting menu shown in FIG. 4A, upon detection of an operation of depression of the enter key 25, the controller portion 12 causes a pull-down menu of "ON" and OFF" to be active. The "Filter Setting" setting menu is used to set whether to graphical display on the lifetime calendar a received e-mail piece (content) having an e-mail address not stored in the telephone directory.

When not graphically displaying on the lifetime calendar the received e-mail content having an e-mail address not stored in the telephone directory, the user selects "OFF" from the pull-down menu of "ON" and OFF." When "OFF" is selected, the controller portion 12 excludes the received e-mail content having an e-mail address not stored in the telephone directory from a graphical display target for graphical display on the lifetime calendar. As such, in this case, the received e-mail content having an e-mail address not stored in the telephone directory is not graphically displayed on the lifetime calendar.

Alternately, when the received e-mail content having an e-mail address not stored in the telephone directory can be displayed on the lifetime calendar, the user selects "ON" from the pull-down menu of "ON" and OFF." When "ON" is selected, the received e-mail content is graphically displayed on the lifetime calendar, regardless of the presence or absence of the e-mail address registration.

Thus, with "Filter Setting," the option is set for displaying a received e-mail content having an e-mail address not stored in the telephone directory. A similar arrangement can be made such that an option can be settable for graphically displaying a transmitted e-mail content having an e-mail address not stored in the telephone directory.

(Remembrance Display Time)

The "Remembrance Display Time" setting menu will now be described hereinbelow. Although described in more detail below, the mobile phone of the present embodiment has the remembrance popup function that provides popup display of various types of contents corresponding to, for example, a date one-year previous to a focus-positioned date, on the lifetime calendar. The "Remembrance Display Time" setting menu is a setting menu to setting whether to execute remembrance popup display, such as described above, and to set the time until execution of the remembrance popup display.

In the state the focus is positioned on the "Remembrance Display Time" setting menu shown in FIG. 4A, upon detection of an operation of depression of the enter key 25, the controller portion 12 controls the pull-down menu of "Non-display," "Fast," "Normal," and "Slow" to be active. When not executing the remembrance popup display, the user selects "Non-display" and then depresses the enter key 25. When "Non-display" is selected, the controller portion 12 operates to not execute the remembrance popup display on the lifetime calendar.

The respective one of the "Fast," "Normal," and "Slow" pull-down menu items is used to set the time until the execution of the remembrance popup display. More specifically, in the mobile phone, when the focus is positioned on any one any date on the lifetime calendar for a predetermined time or longer (or, when non-operation time is a predetermined time or longer), the remembrance popup display is performed to present the popup display of a content(s) corresponding to a past date with respect to the focus-positioned date.

The respective one of the "Fast," "Normal," and "Slow" pull-down menu items allows setting of the time until the execution of the remembrance popup display. The user selects desired one of the "Fast," "Normal," and "Slow" pull-down menu items.

When the "First" menu item is selected, the remembrance popup display is executed after, for example, "5 seconds" has elapsed since termination of user operation. Alternately, when the "Normal" menu item is selected, the remembrance popup display is executed after, for example, "7.5 seconds" has elapsed since termination of user operation. Alternately, when the "Slow" menu item is selected, the remembrance popup display is executed after, for example, "10 seconds" has elapsed since the termination of user operation. Thus, by selection of the desired one of the "Fast," "Normal," and "Slow" pull-down menu items during display of the lifetime calendar, the user is able to set the time until the execution of the remembrance popup display after the operation state has entered the non-operation state to a desired time.

(Display Operation of Lifetime Calendar)

Display operation of and for the lifetime calendar will now be described hereinbelow. To facilitate ease of understanding, description hereinbelow will be given contemplating that, except for motion image contents and music contents, still image contents, schedule contents, birthday contents, transmitted e-mail contents, and received e-mail contents are graphically displayed on the lifetime calendar.

Figure 5:
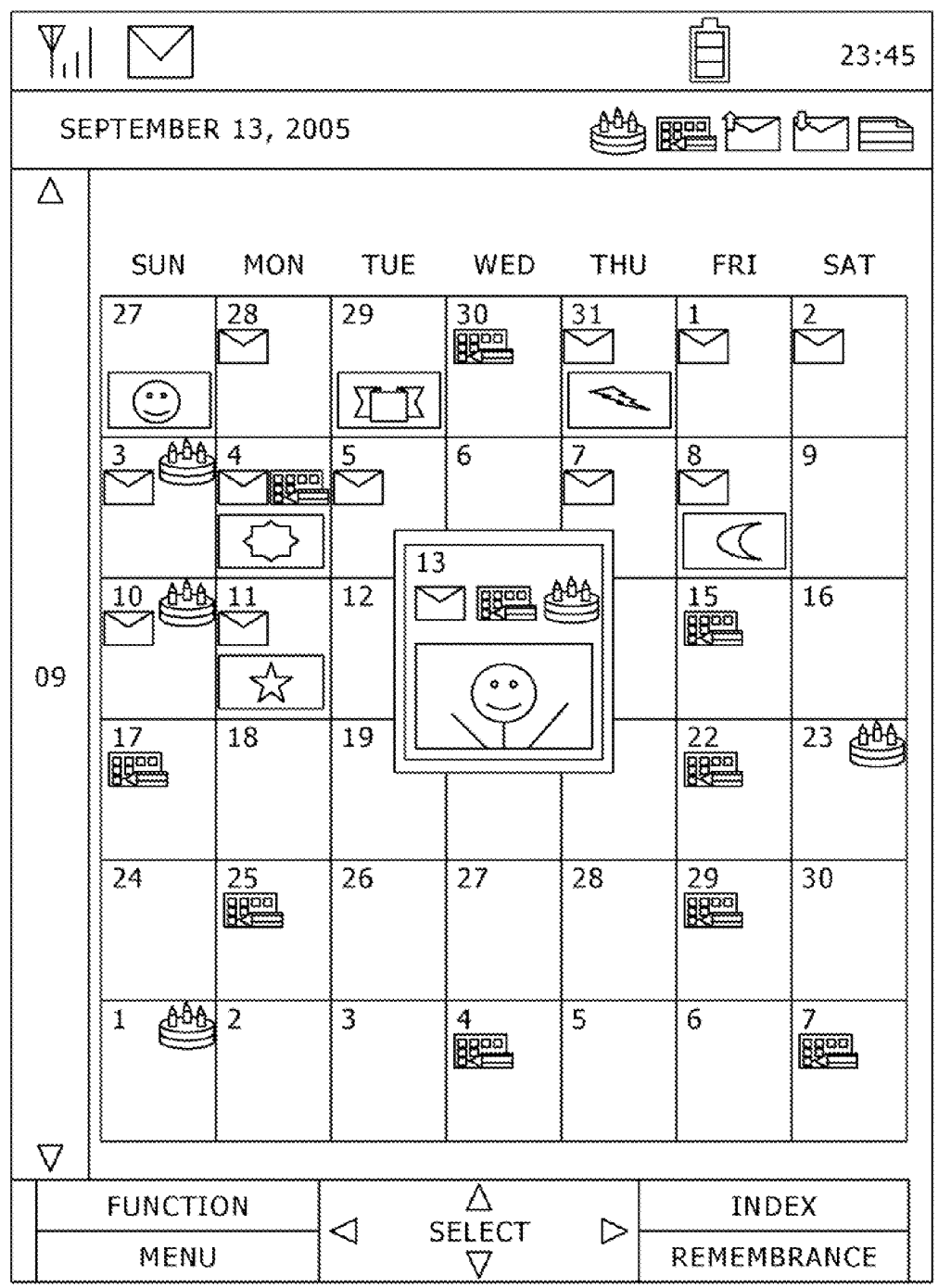
FIG. 5 is a diagram showing a display example of a calendar-view lifetime calendar in the lifetime calendar function of the mobile phone of the present embodiment.

When desiring to display the lifetime calendar, the user operates the operation portion 6 to select an item of activation of the lifetime calendar from the main menu. When the selection is made, the "calendar-view" lifetime calendar shown in FIG. 5 is displayed as a default display on the display portion 5 in accordance with the lifetime calendar application program.

(Calendar View)

Figure 6:
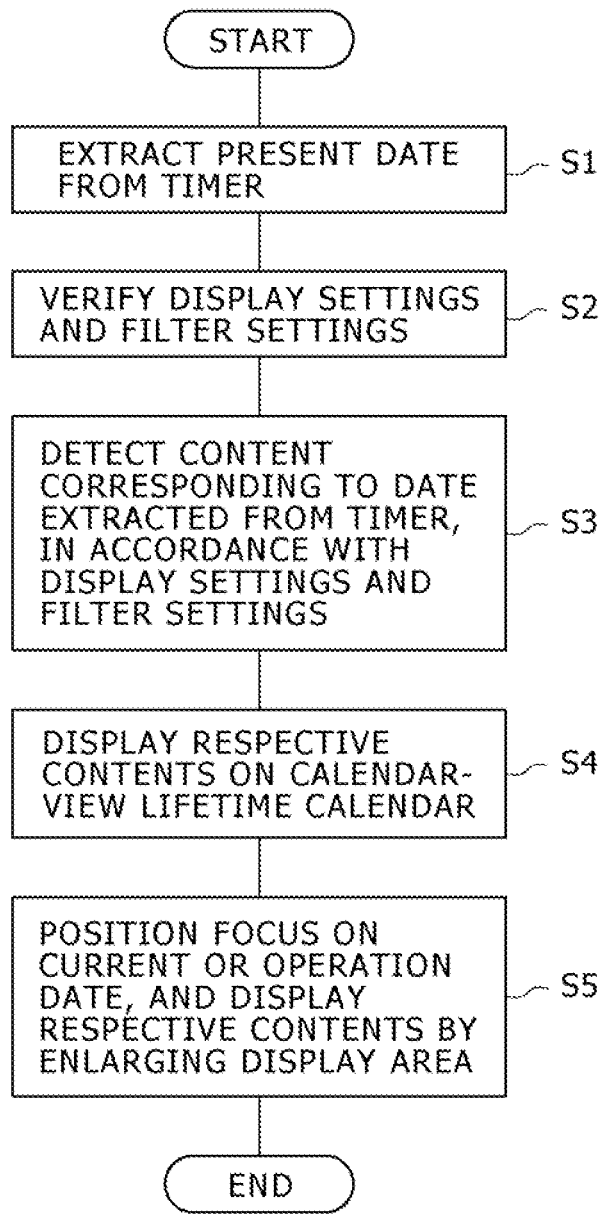
FIG. 6 is a flow diagram showing a display operation for the calendar-view lifetime calendar in the mobile phone of the present embodiment.

FIG. 6 is a flow diagram showing the flow of display control operation of the controller portion 12 to display the calendar-view lifetime calendar. In the flow diagram, the controller portion 12 detects an activation specification operation, which has been performed by the user through the operation of the operation portion 6, thereby to start the display control operation in accordance with the lifetime calendar application program stored in the memory 11.

At step S1, the controller portion 12 extracts information of time indicative of a present date measured by the timer 10, and then the process proceeds to step S2. At step S2, the controller portion 12 reads settings specified in "Display Setting" and settings specified in "Filter Setting" (respectively, "display settings" and "filter settings," herebelow) stored in the memory 11, as described by reference to FIGS. 4A and 4B. Then, the process proceeds to step S3.

At step S3, the process detects from the memory 11 a content(s) corresponding to the present date extracted from the timer 10 from among contents permitted to be graphically displayed on the lifetime calendar in accordance with the display and filter settings read from the memory 11.

More specifically, a case is now assumed in which, for example, the display and filter settings permit still image contents, schedule contents, birthday contents, transmitted e-mail contents, and received e-mail contents to be graphically displayed, and the present date extracted from the timer 10 is Sep. 13, 2005. In this case, the process detects from the memory 11 still image contents having information of time or storage information corresponding to September 2005, received e-mail contents corresponding to September 2005, transmitted e-mail contents corresponding to September 2005, schedule contents corresponding to September 2005, and birthday contents corresponding to users each having a birthmonth of September 2005.

Similarly, another case is now assumed that, for example, the display and filter settings permit only still image contents and birthday contents to be graphically displayed, and the present date extracted from the timer 10 is Oct. 1, 2006. In this case, the process detects from the memory 11 still image contents having information of time or storage information corresponding October 2006 and birthday contents corresponding to users each having a birthmonth of October 2006.

Subsequently, at step S4, the calendar-view lifetime calendar is displayed on the display portion 5, thereby graphically displaying the respective types of contents on the calendar-view lifetime calendar. Then, at step S5, a display area on a current or operation date (display area corresponding to the date of activation of the lifetime calendar) is enlarged to be larger than other display areas, and the focus is positioned on the enlarged display area. Then, the process in accordance with the flow diagram shown in FIG. 6 terminates.

FIG. 5 is a display example of the calendar-view lifetime calendar displayed as a result of the process in accordance with the flow diagram of FIG. 6. The display example of FIG. 5 is the calendar-view lifetime calendar of September 2005, in which the focus-positioned date corresponds to Wednesday, Sep. 13, 2005.

As seen from FIG. 5, relevant components are graphically displayed. Above the calendar-view lifetime calendar, there is displayed a date such as "09/13, 2005" corresponding to the display field for the focus-positioned date. Beside the date, there are displayed various icons that represent the respective types of contents permitted by the user to be graphically displayed (i.e., various icons indicative of the present set state are displayed). In addition, a month index indicative of a presently displayed display month is displayed along the left-end longitudinal (long side) direction of the display area. In the present example, since the display month is September, the month index with the display of number "09" is displayed. The controller portion 12 controls the display field for the date corresponding to the current or operation date to be displayed in a color (display color) different from the display color for other dates, thereby making it easy for the user to recognize the current or operation date.

The various icons (i.e., various icons displayed adjacent the heading date) indicative of the set states, which are shown in FIG. 5, include the following icons. An image of a cake with candles (standing thereon) is an icon indicative of a birthday content. An image of a calendar and pencil is an icon indicative of a schedule content. A sealed letter image with an up-pointing arrow is an icon indicative of a transmitted e-mail content. A sealed letter image with a down-pointing arrow is an icon indicative of an e-mail content. An image having a rectangular shape with an upper right portion inwardly folded is an icon indicative of a still image content. Of the various icons, color display is performed to display an icon indicative of or representing a content permitted by the user to be graphically displayed. On the other hand, an icon representing a content not permitted by the user to be graphically displayed is gray-displayed (or, half-tone displayed) as a gray image. The difference in display enables the user to quickly (or at one glance) recognize the type of content permitted to be graphically displayed on the lifetime calendar.

In addition, icons representing contents detected in step S3 and/or thumbnail images of still image contents are displayed in display fields for respective dates on the calendar-view lifetime calendar.

A case can take place in which a plurality of still image contents for graphical display in a display field for a same date are present. In this case, the controller portion 12 selects one of the plurality of still image contents by using a random number, and displays a thumbnail image of the selected still image content in the display field for the corresponding date. Such a thumbnail image selected and displayed is updated at a predetermined timing by using the "rating function" described further below.

Further, the controller portion 12 enlarges a display field for Wednesday, Sep. 13, 2005, which corresponds to a focus-positioned date in the present case, to be larger than display fields for other dates. Thereby, the icon representing the respective content and/or the thumbnail image of the respective still image content is displayed in the enlarged display field.

In the example shown in FIG. 5, only a letter-image icon is displayed in the display field for Friday, September 1st, thereby indicating the presence of a transmitted or received e-mail content. In addition, a letter-image icon and a birthday content icon are displayed in the display field for Sunday, September 3rd. Thereby, the lifetime calendar indicates that a transmitted or received e-mail content and schedule content are present on Sunday, September 3rd, and Sunday, and the date is a birthday of either a user or the user of the mobile phone (of the embodiment). In addition, a letter-image icon, schedule content icon, and still image content thumbnail image are displayed in the display field for Monday, September 4th. The lifetime calendar thereby indicates the presence of a transmitted or received e-mail content, schedule content, and still image content on Monday, September 4th.

The display field for Wednesday, September 13th, which corresponds to a focus-positioned date in the present example, is displayed to be larger than other display fields, and a letter-image icon, schedule content icon, birthday content icon, and still image content thumbnail image are displayed in the enlarged display field. The lifetime calendar thereby indicates that a transmitted or received e-mail content and a schedule content is present on Wednesday, September 13th, and the date is a birthday of either a user or the user of the mobile phone (of the embodiment).

Further, for graphically displaying a thumbnail image content of a still image content in the enlarged display field, the display portion 5 displays the image enlarged to be larger than thumbnail images for display on display fields for other dates. This manner of display enables the user to easily recognize the still image content corresponding to the focus-positioned date. In this case, the display portion 5 graphically displays the respective icon, excepting the thumbnail image, both in the enlarged display field and display fields for other dates in the same size.

Thus, in the event of display of the calendar-view lifetime calendar, a respective content icon and/or still image content thumbnail image is displayed in a respective date display field. Consequently, the user is able to quickly recognize the presence of the respective content corresponding to the respective date from a respective icon and/or thumbnail image displayed on the lifetime calendar.

Depending on the date, there can be a case in which no contents are present. In such a case, since neither icons nor thumbnail images for display are present, the corresponding date display field is inevitably kept blank. In the example of FIG. 5, Saturday, September 9th corresponds to such a date on which no contents are present. In such a case also, the user can quickly recognize the absence of contents on a date by seeing the display field for the date.

In addition, as described above, in the event of display of the calendar-view lifetime calendar, received and transmitted e-mail contents are present as e-mail contents. However, a case can take place in which any one of the received and transmitted e-mail contents is present. In this case, the letter-image icon is displayed to display the presence of received and/or transmitted e-mail contents to the user.

In an other expression, when the calendar-view lifetime calendar is displayed, the received and/or transmitted e-mail contents are displayed thereon, thereby displaying the presence of the content in the simplified form. As described further below, in the event of display of the day-view lifetime calendar, the icon formed of the image with the upward arrow is displayed to thereby display the presence of a transmitted e-mail content to the user. Similarly, the icon formed of the image with the down-pointing arrow is displayed to thereby display the presence of a received e-mail content to the user.

More specifically, in the event of display of the calendar-view lifetime calendar, the respective date display field is narrow. As such, the letter-image icon is displayed to collectively indicate the presence of received and/or transmitted e-mail contents to the user. However, in event of display of the day-view lifetime calendar in which the respective date display field is wide, the received and transmitted e-mail contents are displayed separately from one another.

(Operation of Moving Focus)

Operation of moving the focus will be described herebelow. The focus is movable by the user onto a desired date display field through operation of the operation portion 6. More specifically, in the example shown in FIG. 5, the controller portion 12 positions the focus on September 13th as a default. In this state, when the cross key 24 of the operation portion 6 is right-operated, the controller portion 12 performs movement and display control (or, "focus movement and display control," hereinafter) for the focus to move and appear over the dates in the order: 13th→14th→15th→16th → 17th . . . . Alternately, in the same state of the focus (i.e., the focus is positioned on September 13th), when the cross key 24 of the operation portion 6 is left-operated, the controller portion 12 performs the movement and display control for the focus to move and appear over the dates in the order: 13th→12th→11th→10th→9th . . . . Alternately, in the same state of the focus as above, when the cross key 24 of the operation portion 6 is up-operated (or, an up-key of the cross key 24 is operated), the controller portion 12 controls the focus to move and appear over the dates in the order: 13th→6th→August 30th . . . . Alternately, in the same state of the focus as above, when the cross key 24 of the operation portion 6 is down-operated (or, a down-key of the cross key 24 is operated), the controller portion 12 performs the movement and display control for the focus to move and appear over the dates in the order: 13th→20th→27th→October 4th . . . .

Thus, every time the cross key 24 is depressed, the controller portion 12 intermittently performs moving and appearing control of the focus, such as described above. Further, when the cross key 24 is kept depressed (i.e., the cross key 24 is "pressed and held down"), the controller portion 12 continually performs the movement and display control for the focus during the time the cross key 24 is "pressed and held down." Then, through the movement and display control for the focus, the controller portion 12 sequentially detects from the memory 11 contents corresponding to the dates for display on the display portion 5, and controls corresponding icons and/or thumbnail images for display on the display portion 5. Thereby, the lifetime calendars of the respective months are displayed on the display portion 5 in a scroll manner in response to moving operations of the focus.

(Changing Display Screen on Per-Month Basis or Per-Year Basis)

As described above, the focus being displayed on the calendar-view lifetime calendar is movable on the per-date basis through the user operation of the cross key 24. However, a case can take place in which contents for graphical display on the lifetime calendar are desired to greatly change or shift on a per-month or per-year basis.

In such a case, the user performs an operation of depression of the second soft key 27 shown in FIG. 2A. When having detected an operation of depression of the second soft key 27 on the calendar-view lifetime calendar being displayed on the display portion 5, the display portion 5 displays an index screen of the calendar-view lifetime calendar shown in FIG. 7.

Figure 7:
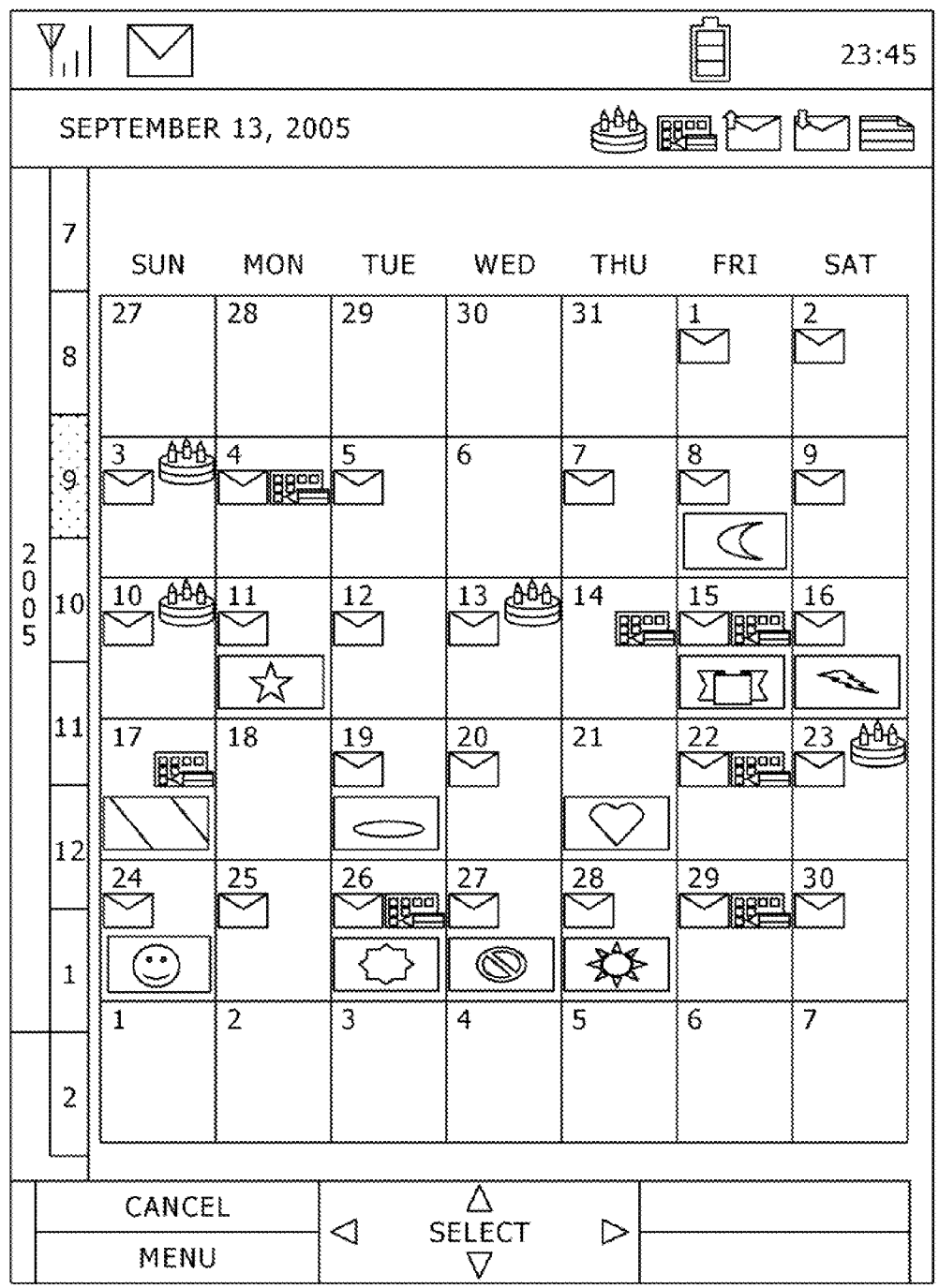
FIG. 7 is a view showing month and year indexes displayed on a calendar-view lifetime calendar.

As can be known through comparison between FIGS. 5 and 7, upon detection of the operation of depression of the second soft key 27, "month indexes" (briefly described above) of the respective months are displayed in a zone of the screen along the left-end longitudinal direction of the calendar-view lifetime calendar. Concurrently, in a zone along the left end of the zone of the month indexes (or, "month index zone," herebelow), there are displayed a "year index" indicative of a year to which the zone of the month indexes currently displayed on the display portion 5.

Further, the focus is positioned on the display field for a month on the month indexes to which a focus-positioned date belongs at the time the operator operation of the second soft key 27. FIG. 7 is a display example in the case where the focus is positioned on any one of the dates in September 2005 at the time the operator operation of the second soft key 27. In this case, the focus is positioned on the display field for September on the month index zone.

The focus is movable on the per-month basis on the month index zone, and the focus is movable on the per-year basis on the zone of year indexes (or, "year index zone," herebelow). More specifically, when moving the focus on the per-month basis on the month index zone, the user performs an up- or down-operation of the cross key 24 in the state where the focus is positioned on a display field for any of the months on the month index zone. In the state that, as shown in FIG. 7, the focus is positioned on September, when having detected the up-operation of the cross key 24, the controller portion 12 performs the movement and display control for the focus to appear on the month index zone in the order: September→August →July→June . . . . Alternately, in the same state, when having detected the down-operation of the cross key 24, the controller portion 12 performs the movement and display control for the focus to appear on the month index zone in the order: September→ October →November→December . . . .

In addition, in the course of movement and display control for the month to be focus-positioned on the month index zone, the controller portion 12 detects from the memory 11 a content corresponding to a focus-positioned month. Then, the display portion 5 displays the icon and/or thumbnail image corresponding to the content on the calendar-view lifetime calendar corresponding to the focus-positioned month (month to which the focus has been moved). Thereby, icons and/or thumbnail images for display on the calendar-view lifetime calendar are changed and displayed on the per-month basis.

In the present example described above, the controller portion 12 changes contents for graphical display on the calendar-view lifetime calendar on the per-month basis along with the focus movement on the month index zone. Alternatively, however, the arrangement of operation can be such that changing of graphical display of contents on the calendar-view lifetime calendar is not carried out during the moving operation of the focus on the per-month basis, but is carried out at a timing awaiting an operation of depression of the enter key 25. That is, the contents corresponding to the focus-positioned month are graphically displayed on the calendar-view lifetime calendar in response to the operation of depression of the enter key 25.

More specifically, according to the alternative manner described above, the user performs an operation of moving the focus to a desired month on the month index zone (during which the changing of graphical display of contents is not performed), and carries out the operation of depression of the enter key 25 upon movement of the focus to the desired month. Thereby, the controller portion 12 recognizes that the display of the contents corresponding to the currently focus-positioned month is specified by the user. Then, the controller portion 12 detects contents corresponding to the focus-positioned month from the memory 11, returns the display screen from the index screen in the calendar view shown in FIG. 7 to the normal screen shown in FIG. 5, and displays icons and/or thumbnail images corresponding to the contents on the calendar-view lifetime calendar. In this case, the controller portion 12 graphically displays the contents on the calendar-view lifetime calendar at the timing awaiting the operation of depression of the enter key 25. As such, the burden on the controller portion 12 can be reduced by the amount corresponding to changing of graphical display of contents which changing does not have to be performed in units of the moving operation for the focus.

Further, during the time the focus is positioned on any one of the months on the month index zone, the display control can be performed to change the display mode to the mode, in which, for example, the respective display field for the date (display field for corresponding icons and/or thumbnail images) is displayed in the half tone. This enables the user to easily recognize the active state of the month index.

The following describes another example case in which moving operation for the focus is performed on the per-year basis. In the state the focus is positioned on any one of the month display fields on the month index zone, the user performs a left-operation of the cross key 24. Upon detection of the left-operation in the above-described state (where the focus is positioned on any one of the month display fields on the month index zone), the controller portion 12 controls the focus to be positioned on a display field for a year on the year index zone to which the focus-positioned month belongs. Thereby, display-screen changing can be implemented on the per-year basis.

More specifically, in the state that, as shown in FIG. 7, the focus positioned on the year index, when having detected the up-operation of the cross key 24, the controller portion 12 performs the movement and display control for the focus on the year index zone in the order: 2005→2004→2003 . . . . Alternately, in the same state, when having detected the down-operation of the cross key 24, the controller portion 12 performs the movement and display control for the focus on the year index zone in the order: 2005→2006→2007 . . . .

In event that the focus movement and display control being thus performed on the per-year basis, the controller portion 12 detects from the memory 11 respective types of contents in the focus-moved year which contents corresponds to the focus-positioned month on the month index zone immediately before movement of the focus from the month index to the year index. Then, the lifetime calendar displays icons and/or thumbnail images corresponding to the contents.

More specifically, in the state the focus is positioned on, for example, September on the month index zone, when the focus is moved to the display field for the year 2005 on the year index zone, various contents corresponding to September 2005 are detected from the memory 11. Then, icons and/or thumbnail images corresponding to the detected contents are displayed on the calendar-view lifetime calendar.

Similarly, under the display control of the controller portion 12, in the state the focus is positioned on, for example, July on the month index zone, when the focus is moved to the display field for the year 2004 on the year index zone, various contents corresponding to July 2004 are detected from the memory 11. Then, icons and/or thumbnail images corresponding to the detected contents are displayed on the calendar-view lifetime calendar. When the focus, which was moved to the display field for the year 2004, has then been moved to the display field for the year 2003 on the year index zone, various contents corresponding to July 2003 are detected from the memory 11. Then, icons and/or thumbnail images corresponding to the detected contents are displayed on the calendar-view lifetime calendar. Thereby, icons and/or thumbnail images for display on the calendar-view lifetime calendar are changed and displayed on the per-year basis.

In the present example described above, the controller portion 12 changes contents for graphical display on the calendar-view lifetime calendar on the per-year basis along with the focus movement on the year index zone. Alternatively, however, the manner of operation can be such that changing of graphical display of contents on the calendar-view lifetime calendar is not carried out during the moving operation of the focus, but is carried out as described herebelow.

Under the display control of the controller portion 12, the focus is positioned on the month index zone with the timing of detection of the operation of depression of the enter key 25 in the state the focus is positioned on any one of years on the year index zone. Then, contents corresponding to the year and month focus-positioned in the event that the respective operations of depression of the enter key 25 have been detected are graphically displayed on the calendar-view lifetime calendar with the timing of detection of the operation of depression of the enter key 25 in the state the focus is positioned on any one of years on the year index zone.

In an other expression, according to the alternative manner described above, the user moves the focus to a desired year on the year index zone (during which the changing of graphical display of contents is not performed), and depresses the enter key 25. Then, the user moves the focus to a desired month on the month index zone (during which the changing of graphical display of contents is not performed), and depresses the enter key 25.

Thereby, the controller portion 12 recognizes that the graphical display of the contents corresponding to the currently focus-positioned year and month is specified by the user. Then, contents corresponding to the focus-positioned year and month are detected from the memory 11, the display screen returns from the index screen in the calendar view shown in FIG. 7 to the normal screen shown in FIG. 5. Then, icons and/or thumbnail images corresponding to the contents are displayed on the calendar-view lifetime calendar. In this case, the contents are graphically displayed on the calendar-view lifetime calendar at the timing awaiting the operation of depression of the enter key 25. As such, the burden on the controller portion 12 can be reduced by the amount corresponding to the changing of graphical display of contents which changing does not have to be performed in units of the moving operation for the focus.

Further, during the time the focus is positioned on the year and month index zones, the display control can be performed to change the display mode to the mode, in which, for example, the respective date display field (display field for corresponding icons and/or thumbnail images) is displayed in the half tone. Such a display manner enables the user to easily recognize the active state of the month index.

(Setting lifetime calendar on Standby Screen)

Setting of the lifetime calendar on a standby screen (or, so-called "wallpaper screen" or "hung-up screen," for example) will be described herebelow.

In the mobile phone of the present embodiment, the calendar-view lifetime calendar is settable on a standby screen. More specifically, upon a setting operation carried out by the user through the operation portion 6 for setting the lifetime calendar on a standby screen, the display portion 5 displays the standby screen. To display the standby screen on the display portion 5, the controller portion 12 operates as described herebelow. As described with reference to FIG. 6, of the contents corresponding to the present date extracted from the timer 10, contents corresponding to the display settings and the filter settings are detected from the memory 11. Then, the detected icons representing the respective contents and/or thumbnail images of the still images detected from the memory 11 are displayed on the calendar-view lifetime calendar corresponding to the present year and month, and the focus is positioned on the display field for the current or operation date.

Figure 8:
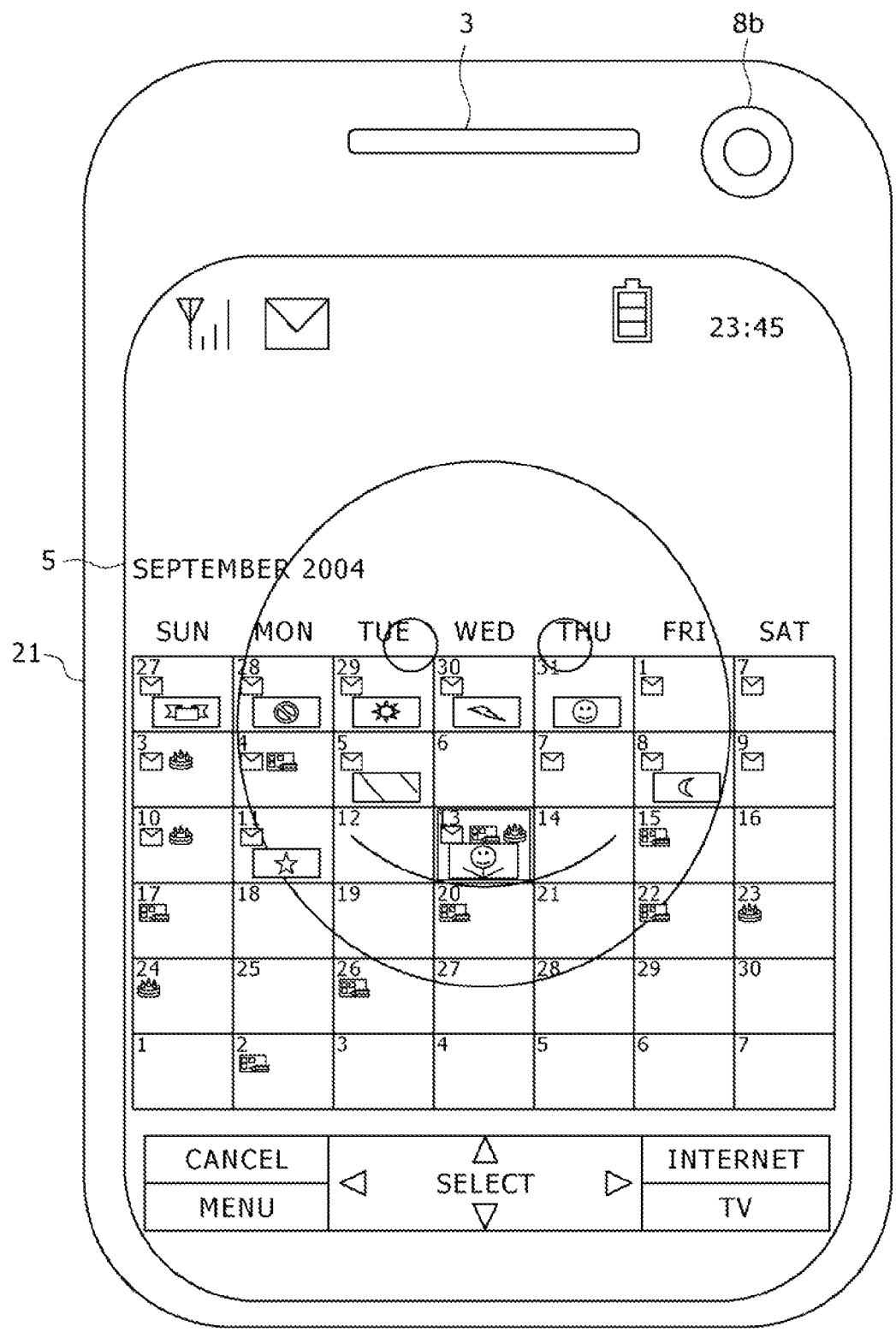
FIG. 8 is a view showing the calendar-view lifetime calendar set on a standby screen.

FIG. 8 shows a display example of a Calender-view lifetime calendar displayed on a standby screen. More specifically, FIG. 8 shows an example in which the present date extracted from the timer 10 is Sep. 13, 2004, and a calendar-view lifetime calendar for September 2004 is displayed on the display portion 5 on a standby screen correspondingly to the extracted present date. As seen from FIG. 8, the focus is positioned on the display field for the 13th corresponding to the current or operation date in the present example.

Depending on the case, a desired standby image is preliminarily set by the user. In this case, under the display control of the controller portion 12, the standby image is displayed in a half tone, and the calendar-view lifetime calendar is overlaid and displayed on the standby image. As an overall standby screen for display on the display portion 5, the standby screen is displayed to be visible through the calendar-view lifetime calendar.

(Updating of Thumbnail Images in Accordance with Rating Function)

Updating of thumbnail images will be described herebelow.

Respective thumbnail images displayed on the calendar-view lifetime calendar (inclusive of a calendar-view lifetime calendar set on a standby screen such as described above) are updated to new thumbnail images at a predetermine time interval.

More specifically, when, as described above, a plurality of still image contents for graphical display in a display field for a same date are present, one of the plurality of still images by using a random number, and a thumbnail image of the selected still image is displayed in the display field for the date. In this case, the displayed thumbnail of the still image content is updated to a thumbnail image of an other still image at a predetermined time interval in accordance with the "rating function."

(Update Operation for Updating Thumbnail Image for Display on Respective Date Display Field)

Figure 9:
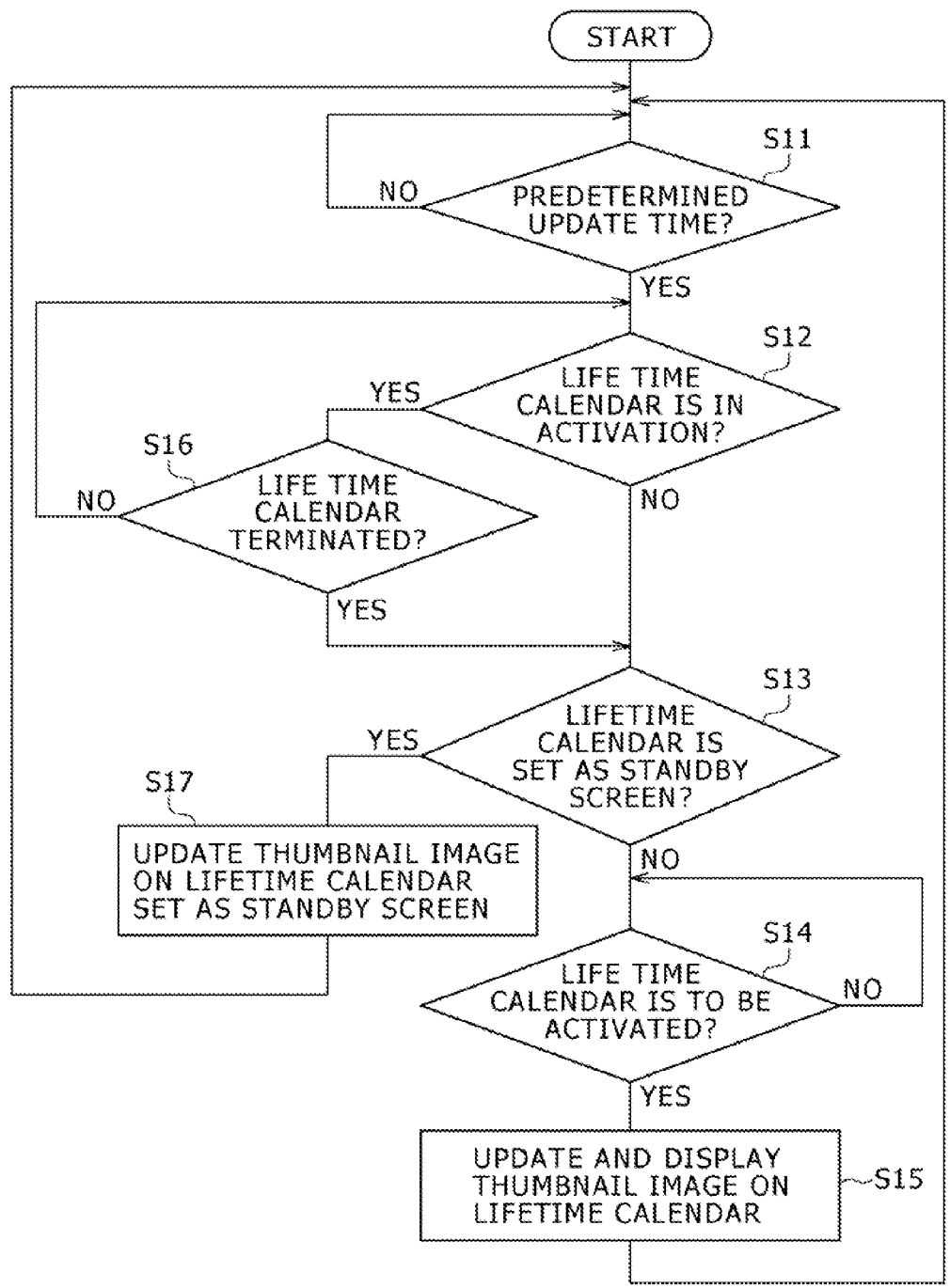
FIG. 9 is a flow diagram for explaining an update operation that updates a thumbnail image at a predetermined time interval in the event that the mobile phone of the embodiment is displaying the calendar-view lifetime calendar.

At the outset, in response to a user operation for activating the lifetime calendar application program, the controller portion 12 executes a periodical update operation (or, "periodical updating," hereinbelow). Thereby, the controller portion 12 periodically updates a thumbnail image(s) displayed on a calendar-view lifetime calendar (refer to FIG. 5) and a thumbnail image(s) displayed on a lifetime calendar set on a standby screen (refer to FIG. 8). FIG. 9 is a flow diagram showing a flow of the periodical update operation for a thumbnail image.

Under the control of the controller portion 12, the process shown in the flow diagram of FIG. 9 is all time run in accordance with the lifetime calendar application program, regardless of the presence or absence of the on-operation of the main power of the mobile phone.

As one example, in the mobile phone of the present embodiment, totally two times of the thumbnail image updating are executed on a daily basis—one at 12 o'clock midnight and the other at 12 o'clock noon. The present time counted by the timer 10 is all time monitored by the controller portion 12. As such, at step S11 the controller portion 12 detects (or determines) whether the present time has reached the predetermined update time. Thus, the process proceeds to step S12 with the timing of detection that the present time has reached 12 o'clock midnight or 12 o'clock noon (update time for the thumbnail image).

At step S12, the controller portion 12 determines whether the lifetime calendar currently is in activation. If the lifetime calendar is in activation, then the process proceeds to step S16; otherwise proceeds to step S13.

At step S16, since the lifetime calendar currently is in a during-activation state, the process proceeds to step S13 at the timing awaiting termination of display of the lifetime calendar. More specifically, in the present example, thumbnail image updating is not executed during activation of the lifetime calendar. However, the process can, of course, be set to execute the thumbnail image updating even during activation of the lifetime calendar.

Thus, the process proceeds to step S13 either after the lifetime calendar has been determined to be not in the during-activation state at step S12 or after termination of display of the lifetime calendar is detected at step S16. At step S13, the controller portion 12 determines whether the lifetime calendar is set on the standby screen (refer to FIG. 8). If the lifetime calendar is set on the standby screen, then the process proceeds to step S17; otherwise, the process proceeds to step S14.

Thus, if the lifetime calendar is set on the standby screen, then the process proceeds to step S17. At step S17, all dates on each of which a plurality of still images are present are detected from among dates on which thumbnail images are currently displayed on the lifetime calendar on the standby screen. Then, one still image is randomly selected using a random number on the basis of each detected date from among still images other than the still images currently graphically displayed. Then, thumbnail images of the still image contents are formed and displayed on the respective display fields for the corresponding dates.

Thereby, the respective thumbnail images displayed on the calendar-view lifetime calendar set on the standby screen are updated at the timing of either 12 o'clock midnight or 12 o'clock noon.

Subsequently, at step S14, to which the process has proceeded as a result of the detection of an instance of non-setting of the lifetime calendar on the standby screen, the controller portion 12 enters a standby state at the timing awaiting an operation of activation of the lifetime calendar.

At step S14, to which the process has proceeded as a result of the detection of an operation of activation of the lifetime calendar, the process proceeds to step S15. At step S15, as described with reference to FIG. 6, the calendar-view lifetime calendar is displayed on the display portion 5. Then, one still image is randomly selected using a random number on the basis of each date on which the plurality of still images are present from among the still images other than the still images graphically displayed before the operation of activation. Then, thumbnail images of the respective selected still image contents are formed and displayed on the display fields for the corresponding dates.

Thereby, when the lifetime calendar is activated across 12 o'clock midnight or 12 o'clock noon, thumbnail images different before and after the activation are displayed on the calendar-view lifetime calendar.

(Thumbnail-Image Update Operation in Focus-Stationed State)

Figure 10:
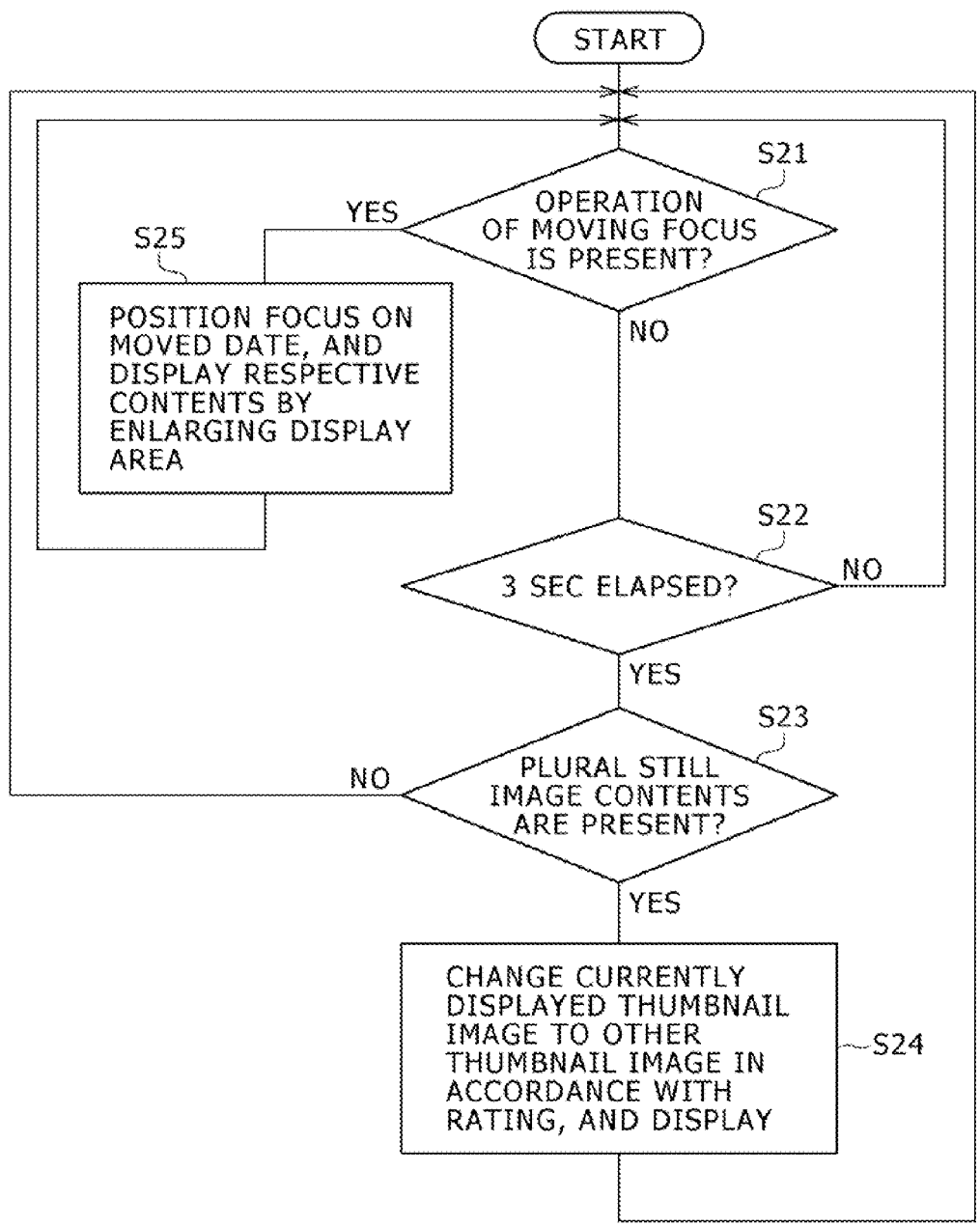
FIG. 10 is a flow diagram for explaining an update operation that updates a thumbnail image of a date, on which a focus is kept applied, at a predetermined time interval while the mobile phone of the embodiment is displaying a calendar-view lifetime calendar.

A thumbnail-image update operation in a focus-stationed state will be described herebelow. A case is assumed in which the focus is stationed on the display field for any date on the calendar-view lifetime calendar, and a plurality of still images corresponding to the focus-stationed date are present. In this case, thumbnail images for display on the focus-stationed display field for the date are updated at a predetermined time interval. FIG. 10 is a flow diagram showing the flow of the thumbnail-image update operation. The process shown in the flow diagram of FIG. 10 starts at the timing of display of the calendar-view lifetime calendar on the display portion 5 in accordance with the lifetime calendar application program stored in the memory 11.

At step S21, the controller portion 12 monitors the operation state of the operation portion 6, thereby to determine whether an operation of moving the focus is carried out. More specifically, the focus is positioned on the display field for a current or operation date (corresponding to the display field for September 13th in the example of FIG. 5) as a default. As described above, the focus is movable along the up-down and left-right directions through the operation of the cross key 24 shown in FIG. 2A. As such, at step S21, the controller portion 12 detects (determines) whether an operation of moving the focus is carried out while monitoring the operation state of the cross key 24. If no operation of moving the focus is detected, then the process proceeds to step S22; otherwise (if detected), the process proceeds to step S25.

At step S25, in response to the operation of moving the cross key 24, the controller portion 12 performs movement and display control for the focus being displayed on the display portion 5. Thereby, as described above, a date display field corresponding to a focus movement destination is displayed to be larger than other date display fields, and icons and/or thumbnail images representing corresponding contents are displayed on the enlarged date display field. Then, the process returns to step S21.

Thus, in the instance of non-detection of the operation of moving the focus, the process proceeds to step S22. At step S22, the controller portion 12 determines in accordance with the information of time acquired by the timer 10 whether, for example, three seconds has elapsed after the instance of non-detection of the operation of moving the focus. More specifically, a continuous stationary time of the focus is monitored by the controller portion 12. In this state, at step S22, if three seconds has not elapsed after the focus entered the stationary state of the focus, then the process returns to step S21 and proceeds to step S23 at the timing of the elapse of three seconds after the focus entered the stationary state.

At step S23, the controller portion 12 detects from the memory 11 still images corresponding to the focus-stationed date, thereby determining whether a plurality of still images corresponding to the focus-stationed date are present. If a plurality of still images are not present, then the process returns to step S21; or otherwise, the process proceeds to step S24.

At step S24, of the plurality of still images corresponding to the focus-stationed date, still images other than currently graphically displayed are selected by the controller portion 12 by using a random number. Then, thumbnail images of the selected still images are formed. Then, the thumbnail images being graphically displayed in the focus-stationed date are updated to the formed new thumbnail images, and are graphically displayed. Then, the process returns to step S21.

Thereby, when the focus is continuously stationed on the date on which the plurality of still images are present, thumbnail images of the still images are updated every three seconds. Consequently, just by moving the focus to be stationed on a desired date display field, the user is able to verify still images corresponding to the date through thumbnail images updated and displayed every three seconds.

Thus, in the present example, when the focus is continuously stationed on the same date display field for the time period of "three seconds," thumbnail images are updated. However, the time period is one example, and can be altered corresponding to the design or like. For example, an alternative can be such that when the focus is continuously stationed on the same date display field for the time period of "five" seconds, thumbnail images are updated; or when the focus is continuously stationed on the same date display field for the time period of "10" seconds, thumbnail images are updated. An other alternative can be such that a desired time is selectable on a setting menu.

(Day View)

The day-view lifetime calendar will be described in further detail hereinbelow. According to the calendar-view lifetime calendar described above, the user is able to recognize the presence of various contents corresponding to respective dates through corresponding icons and/or thumbnail images displayed on the respective date display fields. When further desiring to verify the "contents" of the respective content corresponding to the respective date, the user operates to display a below-described day-view lifetime calendar on the display portion 5. Captions (subject names) of, for example, contents corresponding to respective dates are graphically displayed on the day-view lifetime calendar, such that the user is able to verify an outline "contents" of a desired content.

When desiring to verify a detailed "contents" of a desired content, the user selects the desired content on the day-view lifetime calendar. Then, a dedicated application program corresponding to the content selected by the user is activated, and the process, such as display or regeneration, corresponding to the content selected by the user is executed. Thereby, the user is enabled to verify the "contents" of the desired content.

Figure 11:
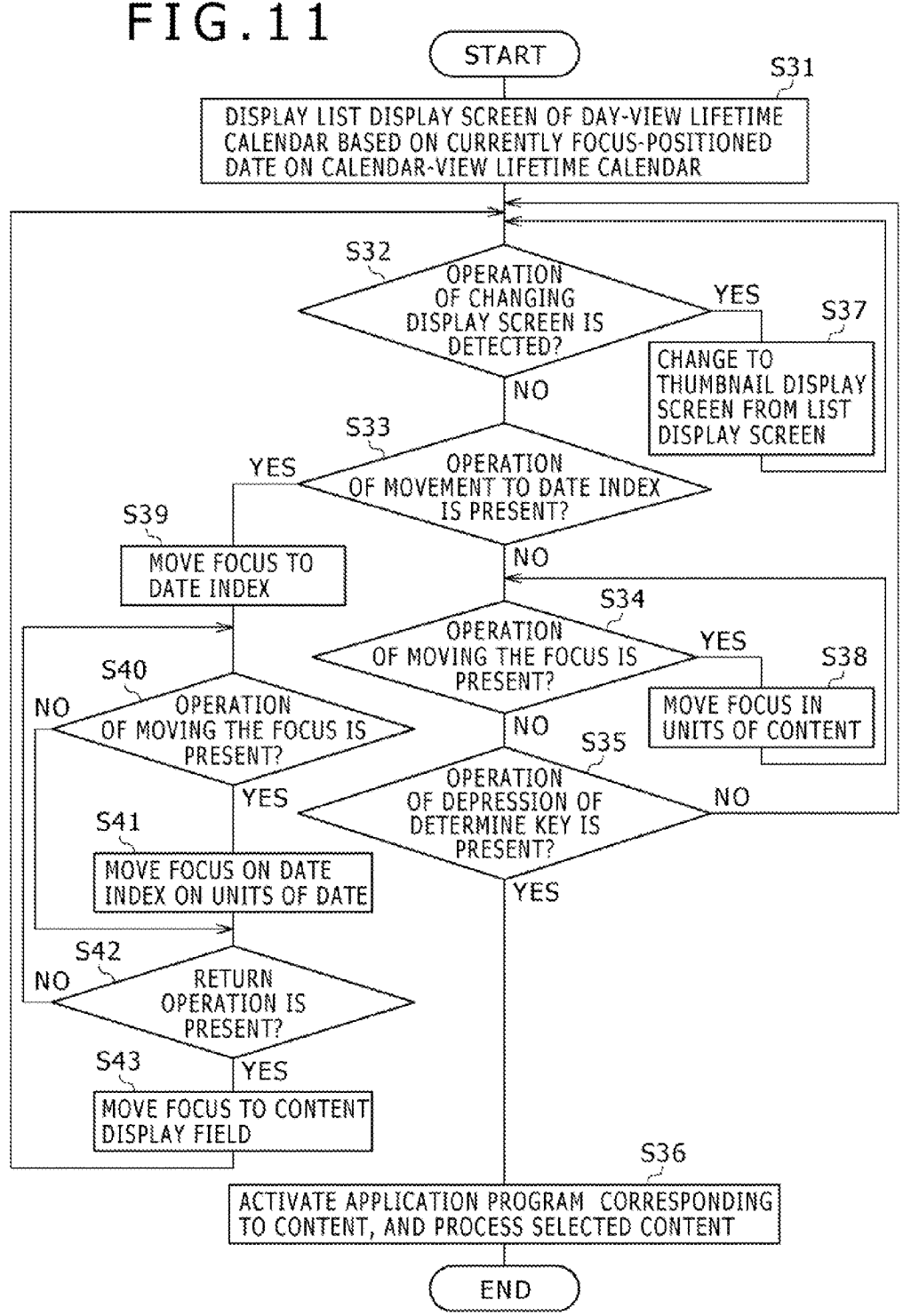
FIG. 11 is a flow diagram showing the flow of a process in the range of from displaying of a day-view the lifetime calendar in the mobile phone of the embodiment to activation of an application program corresponding to a selected content.

FIG. 11 is a flow diagram showing the flow of a process in the range of from the step of displaying the day-view lifetime calendar to the step of processing a content selected on the calendar-view lifetime calendar in accordance with a dedicated application program corresponding to the content. According to the flow diagram, an operation of depression of the enter key 25 is detected by the controller portion 12, thereby to start the flow in accordance with the application program stored in the memory 11.

To begin with, at step S31, upon detection of an operation of depression of the enter key 25, on the display portion 5 displays a day-view lifetime calendar based on a date focus-positioned on the calendar-view lifetime calendar. In the case of a respective date on which a plurality of contents are present, the controller portion 12 performs display control such that the plurality of contents are arranged from upper to lower rows of the display field for the respective date along the longitudinal direction of the display portion 5. Then, the focus is positioned on a content positioned on the highest row (i.e., content having the highest priority) among contents corresponding to the focus-positioned date. FIG. 12 shows a display example of the day-view lifetime calendar.

Figure 13:
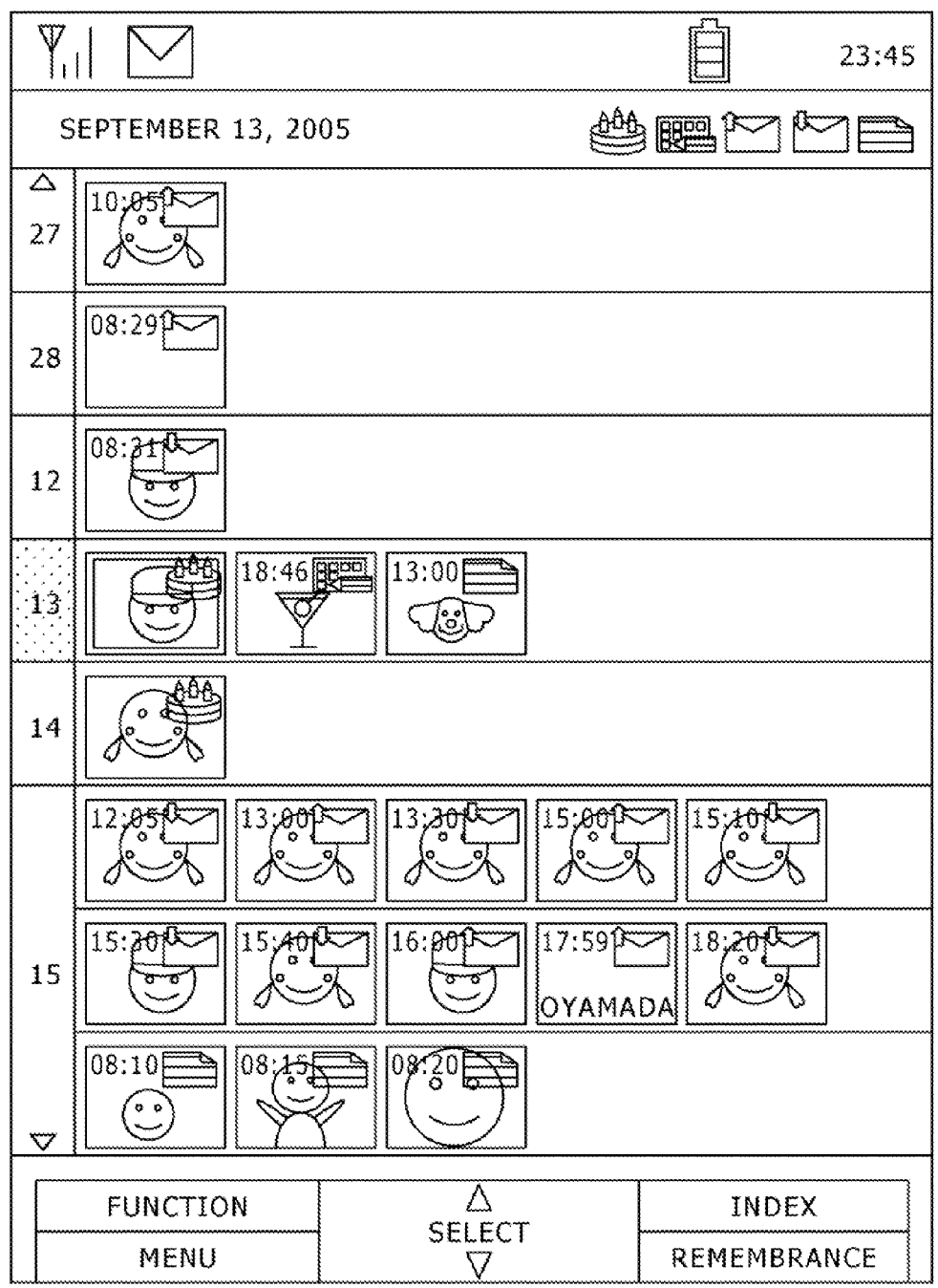
FIG. 13 is a view showing a display example of a thumbnail display screen of the day-view lifetime calendar.

Two types of display screens are provided to display the day-view lifetime calendars. One type is a "list display screen" as is shown in FIG. 12, and the other type is "thumbnail display screen" as is shown in FIG. 13. When performing display screen changing from the calendar view to day view of the lifetime calendar, the "list display screen," as shown in FIG. 12, is displayed as a default (screen).

Shown in FIG. 12 is the day-view lifetime calendar based on Sep. 13, 2005 or the date focus-positioned on the calendar-view lifetime calendar. As shown in FIG. 12, the day-view lifetime calendar displays items such as a current or operation date, such as "September 13, 2005," and icons of birthday and schedule contents which icons are indicative of the types of contents permitted to be graphically displayed through the display and filter settings.

In addition, a zone of date indexes (or, "date index zone," hereinbelow), each of which indexes has a length corresponding to the number of contents along the longitudinal direction is displayed along the left-end longitudinal direction of the display area. In the example of FIG. 12, since only one content corresponding to September 12th is present, a date index corresponding to September 12th has a length for graphically displaying one content. In comparison, since three contents corresponding to September 13th are present, a date index corresponding to September 13th has a length for graphically displaying three contents.

Further, the controller portion 12 performs display control such that dates on the date index zone are continuously adjacently arranged and displayed by suppressing a date display field(s) with no content being present. In the example of FIG. 12, no content is present between the display fields for August 28th and September 12th. In this case, the contents of August 28th and September 12th are graphically displayed to be adjacent one another. This makes it possible to prevent inconvenience of displaying blank display fields on the day-view lifetime calendar when many date display fields without content are present.

Further, as in the case of September 13th shown in FIG. 12, in the case of a date on which a plurality of contents are present, the controller portion 12 performs display control such that the respective contents are graphically list-displayed in accordance with the order of priority. By way of one example, the order of priority for graphically displaying such contents is as described herebelow.

In the case where items of time information in a plurality of contents corresponding to a same date are different from one another (i.e., in the case where the times of the respective contents of the same date are different from one another), the controller portion 12 performs display control to graphically list-display the contents in the following priority order:

1. Birthday content;
2. All-day set schedule content set on a last date; and
3. In a relatively early order among the capture time (storage time) of a still image content, start time of a schedule, reception time of a received e-mail content, and transmission time of a transmitted e-mail content.

In the case where items of information of time in a plurality of contents corresponding to a same date are identical to one another (i.e., in the case where the times of the respective contents of the same date are identical to one another), the controller portion 12 performs display control to graphically list-display the contents in the following priority order:

1. Still image content;
2. Received e-mail content;
3. Transmitted e-mail content; and
4. Schedule content.

More specifically, the controller portion 12 performs the display control as described hereinbelow. In the case where items of information of time in a plurality of same contents are identical to one another, the respective contents are graphically displayed in an arrangement order employed in an application program dedicated for regeneration of the contents. In the case where a plurality of all-day set schedule contents are present, the respective schedule contents are graphically list-displayed by being arranged in a registration order (new→old) of the respective schedules stored in the scheduler. Similarly, also in the case where a plurality of schedule contents with a same start time are present, the respective schedule contents are graphically list-displayed by being arranged in a registration order (new→old) of the respective schedules stored in the scheduler. Further, in the case where a plurality of birthday contents with a same date are present, the birthday contents are graphically list-displayed by being arranged in order of memory numbers in the telephone directory (i.e., the contents are graphically list-displayed by being arranged in a registration order in the telephone directory). However, in the case where a date in a birthday contents of a user registered in the telephone directory is identical to a date in a birthday content stored in the registration field of the private information (i.e., birthday content corresponding to the own birthday (birthday of the user of the mobile phone)), the birthday content stored in the registration fields of the private information is preferentially graphically displayed (with high priority).

Further, for graphically displaying respective contents, the controller portion 12 performs display control so that metadata are graphically displayed on the lifetime calendar, thereby to visually indicate the "contents" of respective contents, as described in detail herebelow.

For graphically displaying a "birthday content," the display portion 5 displays a user name, birthday icon (icon formed of an image of a cake with candles (standing thereon) in the present example), a thumbnail image of the user registered in the telephone directory.

For graphically displaying a "still image content," the display portion 5 graphically displays capture time/storage time (data), thumbnail image, managing title, file type icon, and acquisition source icon.

For graphically displaying a "received e-mail content," the display portion 5 displays a received mail icon, reception time, "From" icon, transmission source name/address, attached data icon, transmission source image stored in the telephone directory, subject-name icon, and subject-name data.

For graphically displaying a "transmitted e-mail content," the display portion 5 displays a received mail icon, transmission time, "To" icon, addressee name/plural-persons icon, attached data icon, addressee image stored in the telephone directory, subject-name icon, and subject-name data.

For graphically displaying a "schedule content," the display portion 5 displays a schedule icon, start time of the schedule, classification icon, data indicative of a schedule summary/content, alarm icon, and data indicative of alarm ON/OFF setting.

The case where contents are graphically displayed in the date display field for September 13th in FIG. 12 is an example in which a birthday content, schedule content, and still image content in the above-described order of priority are sequentially graphically displayed in the above-described order of priority. As seen from the example, for graphically displaying the birthday content, the display portion 5 displays a frame image which is a display frame showing the birthday icon of an image of cake with candles and flowers in a central position of the frame image. In addition, the user name "Funabashi" is displayed in a central position of the frame image. This enables the user, who has observed the day-view lifetime calendar, to recognize that September 13th is the birthday of "Funabashi."

Further, for graphically displaying a schedule content, the display portion 5 displays various items, such as a start time such as "18:46;" schedule icon of an image of a pencil placed on a calendar; classification icon of, for example, a cocktail glass indicative of classification of the schedule; data indicative of a summary/content of a schedule such as "Meal meeting in Ginza with Yamashita; an alarm icon of an image of a bell; and data indicative of ON/OFF setting of the alarm. This enables the user, who has observed the day-view lifetime calendar, to recognize that there is a meal meeting scheduled for 18:46 13th September in Ginza with Yamashita.

For graphically displaying characters, characters exceeding a predetermined number of characters to be displayed are suppressed or concatenated. For this reason, the display "Meal meeting in Ginza with Yamashita," which is the summary/content of the schedule, is incompletely displayed. However, the arrangement can be such that the character size is reduced to be all-displayed, or the characters are scroll-displayed in response to operation of the cross key 24.

Further, for graphically displaying a still image content, the various items are displayed. The items are, for example, a capture time/storage time such as "13:00;" still image indicative that the content is still image content; managing title such as "Walk with dog;" file type icon indicative of the file type and size; and acquisition source icon indicative that the still image content was captured or acquired by the camera unit 8. This enables the user, who has observed the day-view lifetime calendar, to recognize that there is the still image captured during the walk with dog.

When a plurality of users, such as Funabashi and Yamada, whose birthdays are stored as September 13th in, for example, the telephone directory and registration fields of the private information are present, the lifetime calendar list-displays icons of the respective birthday contents of Funabashi and Yamada in the date display field for September 13th. Similarly, when a plurality of still image contents captured or acquired on September 13th are present, the lifetime calendar list-displays thumbnail images of the respective still image contents sequentially in order of the capture time, for example.

By performing display screen changing from the calendar view lifetime calendar to the day-view lifetime calendar, the "contents" of a respective content, is graphically displayed, such that the user is able to verify the "contents" of a desired content.

Referring to the flow diagram of FIG. 11, if at step S31 the list display screen of the day-view lifetime calendar is displayed, then the process proceeds to step S32. At step S32, while monitoring the operation state of the operation portion 6, the controller portion 12 determines the presence or absence of a display-screen changing operation.

More specifically, as described above, as display screens for the day-view lifetime calendar, the "list display screen" shown in FIG. 12 and the "thumbnail display screen" shown in FIG. 13 are provided. As one example, changing between the respective display screens is carried out by the user through operation of depression of the first soft key 26 (shown in FIG. 2A). As such, at step S32, the controller portion 12 determines whether the first soft key 26 is depressed, thereby to determine whether the operation of changing between the display screens is carried out. If the depression operation for the first soft key 26 is detected, then the process proceeds to step S37. Otherwise, if the depression operation for the first soft key 26 has not been detected, then the process proceeds to step S33.

At step S37, to which the process has proceeded as a result of the detection of the operation of depression of the first soft key 26, the controller portion 12 performs changing and displaying control to change the day-view lifetime calendar displayed on the display portion 5 from the "list display screen" shown in FIG. 12 to the "thumbnail display screen" shown in FIG. 13.

When the day-view lifetime calendar is changed to the "thumbnail display screen," the presence of, mainly, for example, respective contents are graphically displayed through thumbnail images or icons. FIG. 13 is a view showing a display example of the "thumbnail display screen" of the day-view lifetime calendar. With reference to FIG. 13, when a received e-mail content received at 08:31 on September 12th is present, the controller portion 12 detects a user corresponding to a transmission source of the received e-mail piece from the telephone directory. Then, the day-view lifetime calendar displays a thumbnail image of the detected user, which is registered in the telephone directory, in the display field for September 12th. This enables the user who has observed the "thumbnail display screen" of the day-view lifetime calendar to recognize the presence of the received e-mail content received at 08:31 on September 12th.

Similarly, when a birthday content of a user whose birthday is September 13th is present, the controller portion 12 detects a thumbnail image of a user whose birthday is September 13th from the telephone directory. Then, the thumbnail image in the display field for September 12th is displayed. Further, a birthday icon is displayed on the thumbnail image. This enables the user who has observed the "thumbnail display screen" of the day-view lifetime calendar to recognize that September 13th is the birthday of the user shown in the thumbnail image.

Similarly, when a schedule content with a start time of 18:46 on September 13th is present, the classification icon for the schedule content is displayed in the display field for September 13th. Further, a schedule icon indicative of the start time of the schedule and indicative that the content is the schedule content is displayed on the classification icon. This enables the user who has observed the "thumbnail display screen" of the day-view lifetime calendar to recognize the presence of the schedule that has the contents shown by the classification icon and that is started from 18:46 on September 13th.

Similarly, when a still image captured or acquired at 13:00 on September 13th is present, the thumbnail image is displayed in the display field for September 13th. Further, a still image icon indicative of the start time of the schedule and indicative that the content is the still image content is displayed on the thumbnail image. This enables the user who has observed the "thumbnail display screen" of the day-view lifetime calendar to recognize the presence of the still image content captured or acquired at 13:00 on September 13th.

When a thumbnail image of a user corresponding to a birthday content is not stored in the telephone directory, a user name stored in the telephone directory is displayed instead of the thumbnail image.

When a thumbnail image of a corresponding to a transmitted/received e-mail content is not stored in, for example, the telephone directory or the registration field of private information, a user name stored in the telephone directory or the registration field of private information is displayed instead of the thumbnail image.

When a classification icon indicative of the classification of the transmitted/received e-mail content is not stored in the scheduler, only the start time of the schedule and schedule icon are displayed.

On the "list display screen" shown in FIG. 12, respective contents are graphically displayed through, for example, such that thumbnail images, icons, and characters, the outline "contents" of the respective contents are recognizable. However, on the "thumbnail display screen" shown in FIG. 13, while it is difficult to graphically display so many contents at one time, the respective contents are, basically, graphically displayed through thumbnail images and icons, such that many contents can be graphically displayed at one time.

At step S32 of the flow diagram shown in FIG. 11, if the process has proceeded to step S33 as a result of non-detection of the operation of changing between the "list display screen" and the "thumbnail display screen," then the controller portion 12 determines whether an operation of moving the focus on a date index is carried out.

More specifically, when an operation of depression of the second soft key 27 is detected in the state the focus is positioned on any content on the "list display screen" of the day-view lifetime calendar shown in FIG. 12, the process proceeds to step S39. At step S39, the focus is moved on a date on the date index corresponding to the currently focus-positioned content.

For example, in the state the focus is positioned on a birthday content of "Funabashi," when an operation of depression of the second soft key 27 is detected, the focus is positioned on the date 13th, which is the date on the date index in which the birthday content of "Funabashi" is graphically displayed. Thus, when the focus is positioned on a respective date in a respective date index, the focus is movable in units of each date.

More specifically, when moving the focus, the user moves the focus on the date index zone and carries out an up-down operation of the cross key 24. At step S40, the presence or absence of an up-down operation of the cross key 24 is detected. If the up-down operation of the cross key 24 is detected, at step S41 the focus on the date index zone is controlled to move and appear in units of the date correspondingly to the up-down operation of the cross key 24.

For example, in the example shown in FIG. 12, in the state the focus is positioned on the date 13th on the date index zone, when an up-operation of the cross key 24 is detected, the focus is controlled in units of the up-operation to move and appear on respective date display fields with contents being present in the order: 13th→12th→August 28th→August 27th . . . .

Similarly, in the example shown in FIG. 12, in the state the focus is positioned on the date 13th on the date index zone, when a down-operation of the cross key 24 is detected, the focus is controlled in units of the down-operation to move and appear on respective date display fields with contents being present in the order: 13th→14th→15th . . . .

In this manner, contents graphically displayed on the day-view lifetime calendar can be changed in units of the date.

In the mobile phone of the present embodiment, when returning the focus moved to the date index zone to a display field for a respective content, the user depresses the enter key 25. The return operation is monitored by the controller portion 12. At step S42, if an operation of depression of the enter key 25 is detected, then the process proceeds to step S43. At step S43, the focus is controlled to move and appear on the display field for the respective content from the date index zone.

At step S33, if an operation of moving the focus to the date index zone is not detected, then the process proceeds to step S34. At step S34, the presence or absence of an operation of moving the focus is determined. That is, since the focus positioned on the respective content display field is moved through the up-down operation of the cross key 24, at step S34 the presence or absence of the up-down operation of the cross key 24 is monitored by the controller portion 12. If an up-down operation of the cross key 24 is detected, then the process proceeds to step S38. At step S38, in correspondence to the up-down operation of the cross key 24, the focus is controlled to move and appear in units of each content.

For example, in the example shown in FIG. 12, in the state the focus is positioned on the birthday content of Funabashi, when an up-operation of the cross key 24 is detected, the focus is controlled in units of each content to move and appear on a content in the order: birthday content of Funabashi→received e-mail content from Funabashi→transmitted e-mail content to Oyamada . . . .

Similarly, in the example shown in FIG. 12, in the state the focus is positioned on the birthday content of Funabashi, when a down-operation of the cross key 24 is detected, the focus is controlled in units of the down-operation to move and appear on a respective content in the order: schedule content with the title "Meal meeting in Ginza with Yamashita→still image content with the title "Walk with dog"→birthday content of Yamashita.

Thus, the "outline contents" of a respective content is recognizable on the day-view lifetime calendar. When desiring to verify a "detailed contents" of a desired content, the user moves the focus in units of each date or units of each content, thereby to position the focus on the desired content and to then depress the enter key 25. At step S35 in the flow diagram of FIG. 11, the presence or absence of the operation of depression of the enter key 25 is detected. More specifically, at step S35, the controller portion 12 detect the presence or absence of the operation of depression of the enter key 25, which signifies the specification of display or regeneration of the "detailed contents" of a focus-positioned content. At step S35, if the operation of depression of the enter key 25 is detected, then the process proceeds to step S36. At step S36, a dedicated application program corresponding to a currently focus-positioned content is invoked from the memory 11 and activated, and the content is processed in accordance with the application program. Then, the entire process of the flow diagram shown in FIG. 11 terminates.

More specifically, in the state the focus is positioned on a still image content on the day-view lifetime calendar, when an operation of depression of the enter key 25 is detected, the camera control program stored in the memory 11 is activated. Then, the still image content is graphically displayed on the display portion 5 in accordance with a viewer function of the camera control program. This enables the user to verify the detailed content of the still image content selected on the day-view lifetime calendar.

Similarly, in the state the focus is positioned on a received or transmitted e-mail content on the day-view lifetime calendar, when an operation of depression of the enter key 25 is detected, the e-mail management program stored in the memory 11 is activated. Then, the "contents" (such as text) of the received or transmitted e-mail content is displayed on the display portion 5 in accordance with the e-mail management program. This enables the user to verify the detailed contents of the received or transmitted e-mail content selected on the day-view lifetime calendar.

Similarly, in the state the focus is positioned on a schedule content on the day-view lifetime calendar, when an operation of depression of the enter key 25 is detected, the scheduler management program stored in the memory 11 is activated. Then, the "contents" of the schedule content is displayed on the display portion 5 in accordance with the scheduler management program. This enables the user to verify the detailed contents of the schedule content selected on the day-view lifetime calendar.

Similarly, in the state the focus is positioned on a birthday content on the day-view lifetime calendar, when an operation of depression of the enter key 25 is detected, the registration fields for a user corresponding to the birthday content stored in the telephone directory or the registration fields of private information of the user of the mobile phone are displayed on the display portion 5. Thereby, a telephone number, e-mail address, and the like of the user corresponding to the birthday content are displayed, such that communication can easily be made with the user by phone or e-mail.

Description above has been made such that, mainly, on the "list display screen" of the day-view lifetime calendar, in the state the focus is positioned on the desired content, when the enter key 25 is depressed, the controller portion 12 activates the application program corresponding to the content. This is similar as in the case of the "thumbnail display screen" of the day-view lifetime calendar. That is, in the state where the "thumbnail display screen" shown in FIG. 13 is displayed, when an operation of depression of the enter key 25 is detected, an application program corresponding to a focus-positioned content on the "thumbnail display screen" is activated. Thereby, similarly as in the event of the "list display screen" being displayed, the user is able to verify the "contents" of the content selected by positioning the focus also in the event of the "thumbnail display screen" being displayed.

(Graphical Display of New-Schedule Creation Content in Transition to Day View)

As September 9th shown in FIG. 5, the display field with no content is displayed as blank on the calendar-view lifetime calendar. In the event that the focus is moved onto such a date with no content on the calendar-view lifetime calendar and the enter key 25 is depressed, when the day-view lifetime calendar is displayed, a "new-schedule creation content" as described herebelow is displayed.

Figure 14:
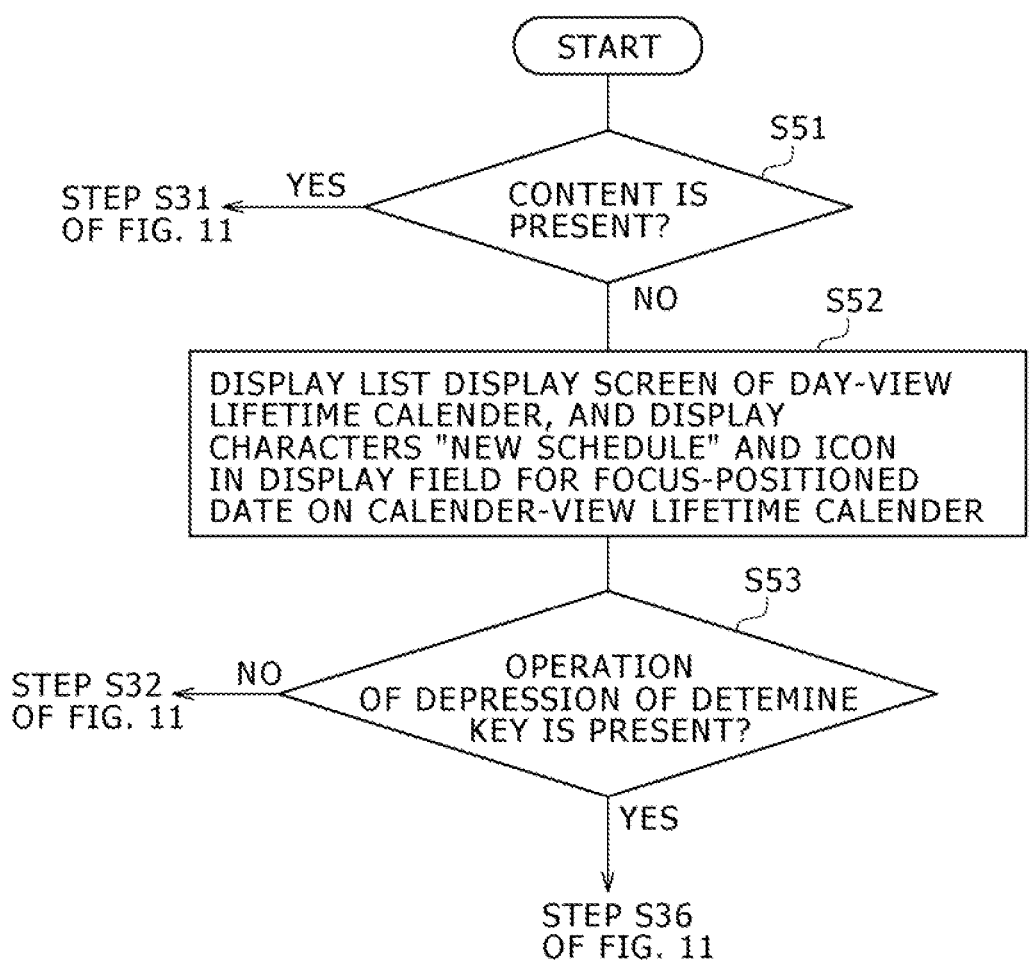
FIG. 14 is a flow diagram showing the operation of graphically displaying a new-schedule creation content on the calendar-view lifetime calendar when no content is present on a focused date on a calendar-view lifetime calendar.

FIG. 14 is a flow diagram showing the operation of graphically displaying the new-schedule creation content. In the flow diagram, the controller portion 12 detects an operation of depression of the enter key 25 in the state the focus is positioned on any date display field on the calendar-view lifetime calendar. Then, under the control of the controller portion 12, the process is started in accordance with the lifetime calendar application program.

At step S51, the controller portion 12 determines the presence or absence of a content corresponding to a selected date (focus-positioned date) on the calendar-view lifetime calendar. If a content corresponding to the focus-positioned date on the calendar-view lifetime calendar is present, then the process proceeds to step S31 of the flow diagram of FIG. 11. At step S31, the list display screen of the day-view lifetime calendar as shown in FIG. 12 is displayed on the display portion 5.

Figure 15:
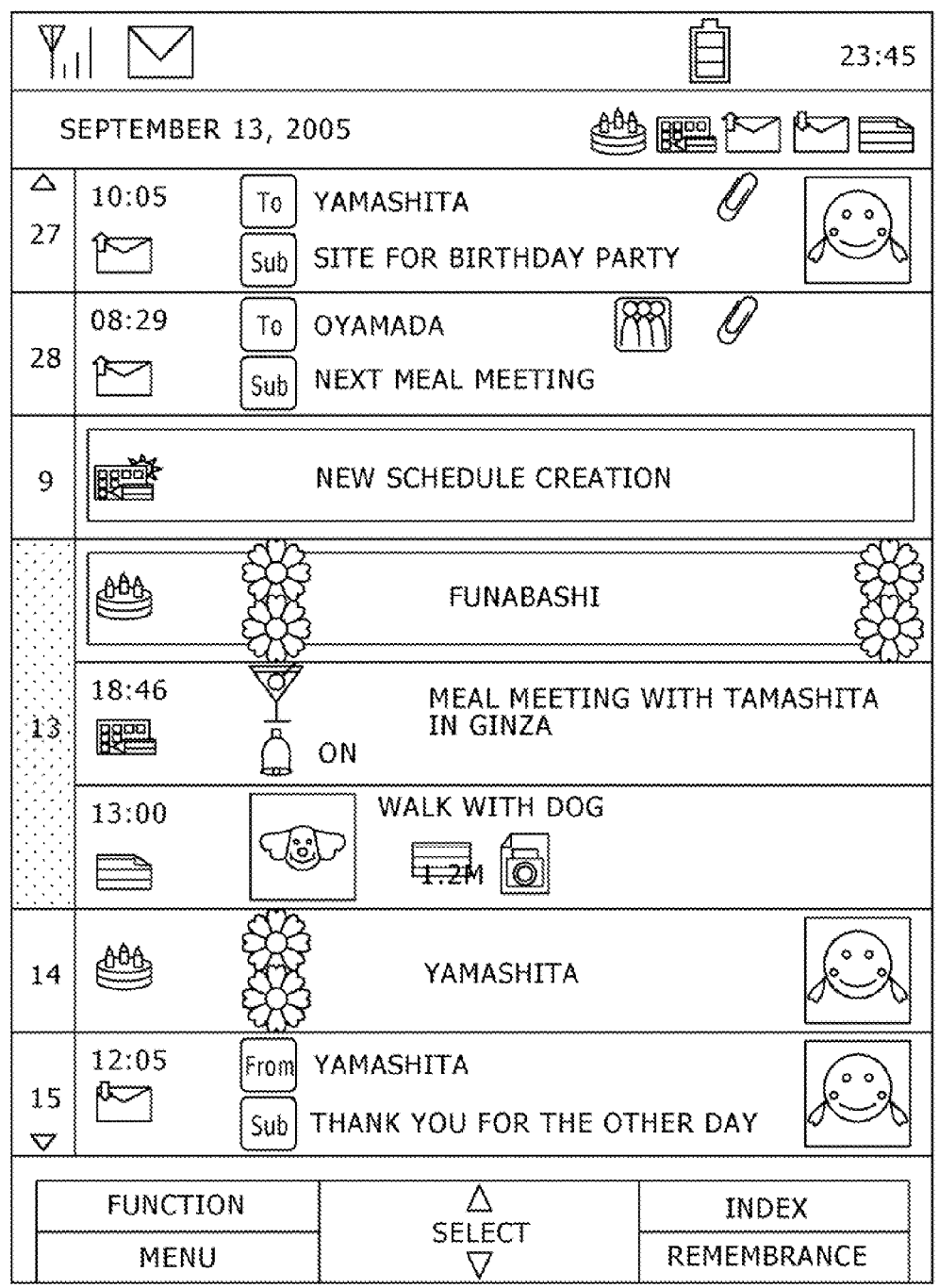
FIG. 15 is a view showing a list display screen of a day-view lifetime calendar graphically displaying the new-schedule creation content.

Alternately, if a content corresponding to the focus-positioned date on the calendar-view lifetime calendar is absent, then the process proceeds to step S52. At step S52, a list display screen of the day-view lifetime calendar as shown in FIG. 15 is displayed on the display portion 5. A new display field is provided for the focus-positioned date on the calendar-view lifetime calendar, and the characters "New schedule creation" and an icon are displayed in the new display field.

More specifically, as described above, in the event of display of the day-view lifetime calendar, a date display field(s) with no content suppressed for display. In the event that a date with no content is selected on the calendar-view lifetime calendar, however, when the day-view lifetime calendar is displayed, the new display field for the date with no content is provided on the day-view lifetime calendar, and the characters "New schedule creation" and the icon are displayed with the focus in the display field.

In the example shown in FIG. 15, Sep. 9, 2005 with no content is selected on the calendar-view lifetime calendar. In this case, a new display field for Sep. 9, 2005 is provided on the day-view lifetime calendar, and characters "New schedule creation" and the icon are displayed with the focus in the display field.

Subsequently, at step S53, the controller portion 12 determines whether an operation of depression of the enter key 25 is carried out in the state the focus is positioned on the display field showing the characters "New schedule creation" and the icon. By an operation of depression of the enter key 25 by the user in the above-described state, it is meant that the user desires to register a new schedule(s) for the date with no content. As such, the process proceeds to step S36 of the flow diagram shown in FIG. 11. At step S36, the scheduler management program is activated to thereby display a new schedule creation screen. In this manner, the user is able to register the new schedule into the scheduler. In addition, a schedule content of the new stored schedule is graphically displayed on the calendar-view or the day-view lifetime calendar when displayed.

Even after the day-view lifetime calendar is changed from the "list display screen" to the "thumbnail display screen," display of "new schedule creation" is done. More specifically, when an operation of changing the screen to the "thumbnail display screen" is carried out at step S32 of the flow diagram of FIG. 11 after the characters "New schedule creation" and the icon have been displayed on the "list display screen" of the day-view lifetime calendar, at step S37 a "thumbnail display screen," as shown in FIG. 16, only the icon corresponding to the characters "new schedule creation" is displayed in the display field for the corresponding date.

Figure 16:
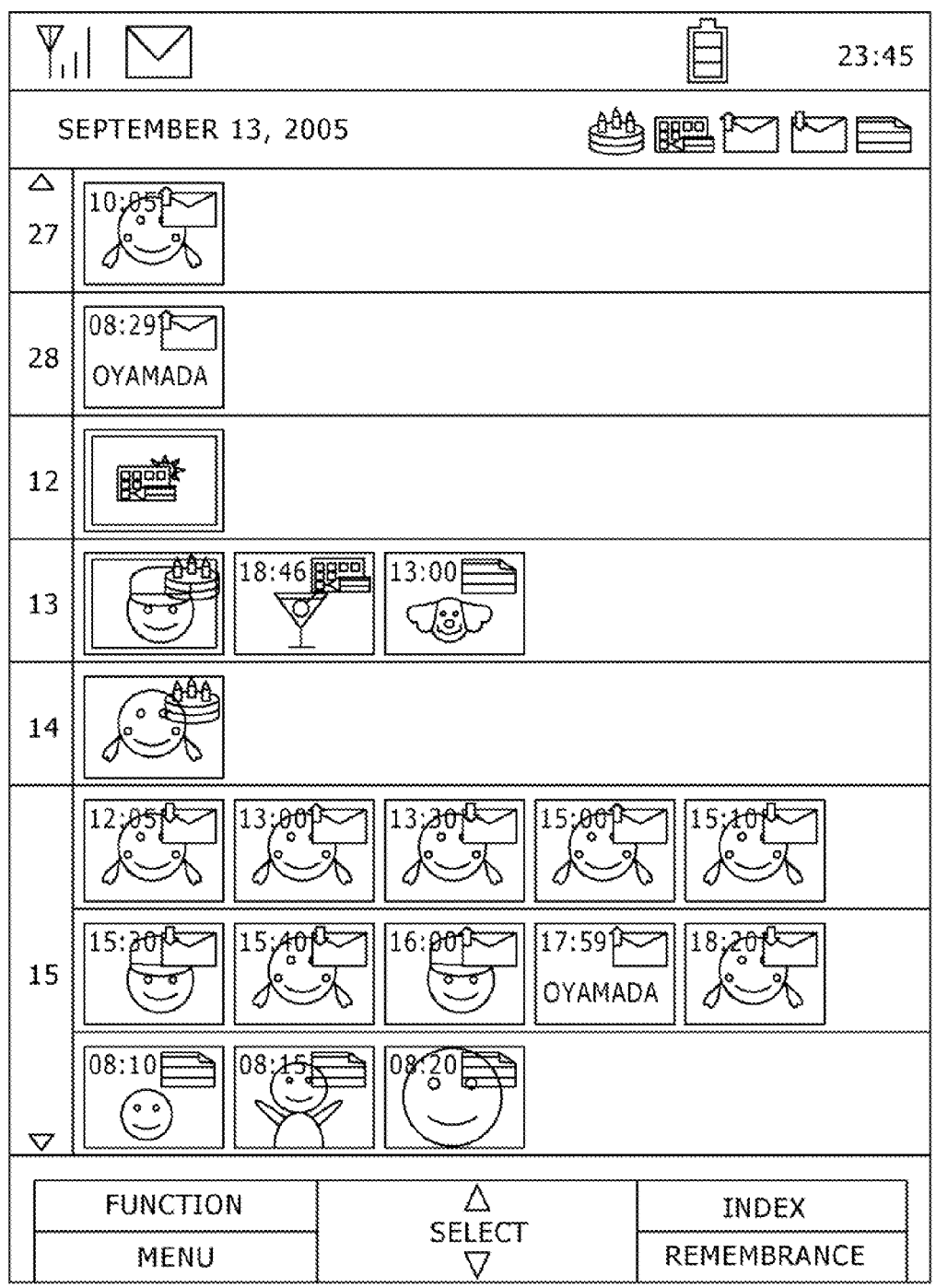
FIG. 16 is a view showing a thumbnail display screen of the day-view lifetime calendar graphically displaying the new-schedule creation content.

Thus, while the "list display screen" displays, as shown in FIG. 15, the characters "New schedule creation" and the icon, the "thumbnail display screen" displays, as shown in FIG. 16, only the icon indicative that the content is a new schedule creation content.

Similar to the above, in the case of the "thumbnail display screen" also, the controller portion 12 determines whether an operation of depression of the enter key 25 is carried out in the state the focus is positioned on the icon indicative of "new schedule creation." If the operation is detected, then the process proceeds to step S36. At step S36, the scheduler management program is activated to thereby display a new schedule creation screen. In this manner, the user is able to register a new schedule on a new schedule creation screen displayed in accordance with the scheduler management program. In addition, a schedule content of the new stored schedule is graphically displayed on the calendar-view or the day-view lifetime calendar when displayed.

(Remembrance Popup Display Operation)

Figure 17:
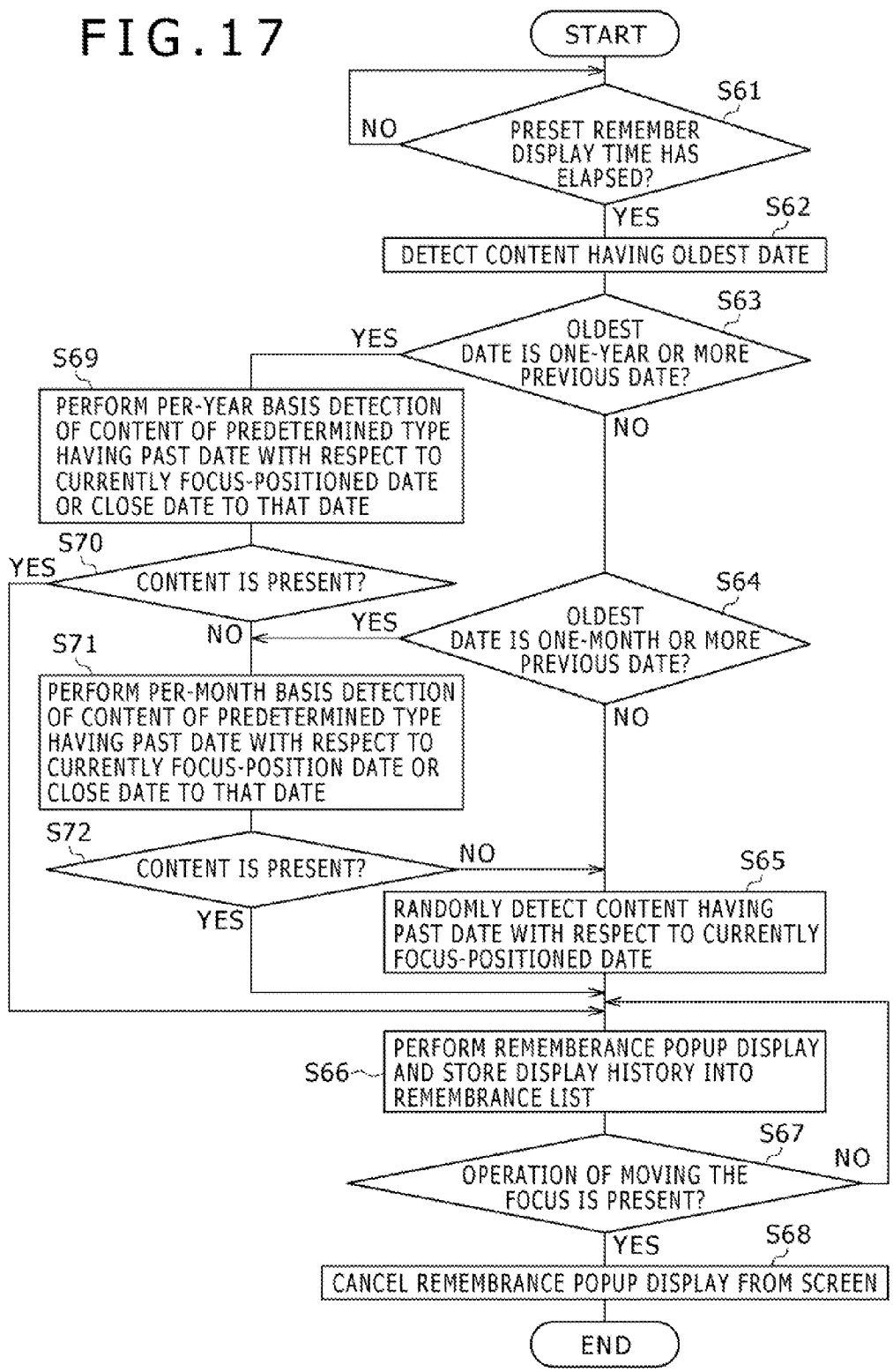
FIG. 17 is a flow diagram showing the flow of a remembrance popup display operation in the mobile phone of the embodiment.

A remembrance popup display operation will be described herebelow. When the focus has been positioned on any date on the calendar-view or day-view lifetime calendar for a predetermined time period or longer, the controller portion 12 operates to perform popup display of a content corresponding to a past date with respect to the focus-positioned date (in accordance with the remembrance popup function). FIG. 17 is a flow diagram showing the flow of the remembrance popup display operation.

The process shown in the flow diagram of FIG. 17 starts at one of two timings in accordance with the lifetime calendar application program, which is stored in the memory 11. One is the timing of detection of a stationary state of the focus positioned on any date on the calendar-view lifetime calendar described with reference to FIG. 5. The other is the timing of detection of a stationary state of the focus positioned on any date on the day-view lifetime calendar described with reference to FIGS. 12 and 13. That is, under the control of the controller portion 12, the process shown in the flow diagram of FIG. 17 is started upon or at the timing of detection of the focus continuously positioned on any date on the calendar-view or day-view lifetime calendar.

At step S61, the controller portion 12 reads a preliminarily set remembrance display from the memory 11, and counts the time period elapsed since detection of the stationary state of the focus in accordance with information of time measured by the timer 10. Then, the controller portion 12 determines whether the counted time period has exceeded the preliminarily set remembrance display time.

More specifically, as described with reference to FIG. 4A, in the mobile phone of the present embodiment, the respective one of the "Fast," "Normal," and "Slow" pull-down menu items allows setting of the time period until the execution of the remembrance popup display. For example, when the "First" menu item is selected, the remembrance popup display is performed after "5 seconds" has elapsed since the detection of the stationary state of the focus. Alternately, when the "Normal" menu item is selected, the remembrance popup display is performed after, for example, "7.5 seconds" has elapsed since the detection of the stationary state of the focus. Still alternately, when the "Slow" menu item is selected, the remembrance popup display is performed after, for example, "10 seconds" has elapsed the detection of the stationary state of the focus.

Accordingly, at step S61, the controller portion 12 performs the determination in the above example case. When the "First" menu item is selected, it is determined whether "5 seconds" has elapsed since the detection of the stationary state of the focus. Alternately, when the "Normal" menu item is selected, it is determined whether "7.5 seconds" has elapsed since the detection of the stationary state of the focus. Still alternately, when the "Slow" menu item is selected, it is determined whether "10 seconds" has elapsed the detection of the stationary state of the focus. Then, the process proceeds to step S62 at the timing of the detection that the elapsed time period after the detection of the stationary state of the focus has exceeded the preliminarily set remembrance display time.

At step S62, a content having oldest information of time (content with the oldest date) is detected from among various contents stored in the memory 11. Then, the process proceeds to step S63.

At step S63, the controller portion 12 performs a comparison between the information of time contained in the content having the oldest date and detected at step S62 and the present date extracted from the timer 10. Thereby, the controller portion 12 determines whether the oldest date in the content detected at step S62 is a date one-year or more previous to the present time. If the oldest date detected at step S62 is determined to be a date one-year or more previous to the present time, then the process proceeds to step S69. Otherwise, if the oldest date contained in the content detected at step S62 is a date within one year from the present time, then the process proceeds to step S64.

Thus, the process proceeds to step S69 after the oldest date in the content detected at step S62 has been determined at step S63 to be a date one-month or more previous to the present time. At step S69, the controller portion 12 attempts to detect from the memory 11 content of a predetermined type corresponding to either a date corresponding to a date one-month previous to a currently focus-positioned date or a date close to the one-month previous date on the calendar-view or day-view lifetime calendar. However, a case can take place in which the controller portion 12 has detected from the memory 11 no content of a predetermined type corresponding to either a date corresponding to a date one-month previous to a currently focus-positioned date or a date close to the one-month previous date. In this case, the controller portion 12 attempts to detect from the memory 11 a predetermined type corresponding to either a date corresponding to a date two-year previous to a currently focus-positioned date or a date close to the two-year previous date.

As one example, in the mobile phone of the present embodiment, contents are graphically displayed through the remembrance popup function in the following order of priority:

1. Still image content captured or acquired by the camera unit 8;
2. Protection-set received or transmitted e-mail content;
3. Schedule content;
4. Still image content downloaded via a network; and
5. Non-protection-set received or transmitted e-mail content.

In the event of executing the remembrance popup display, various contents are detected in accordance with the order of priority.

The detection operation for detecting a content at step S69 will be described in more detail hereinbelow. The controller portion 12 first attempts to detect the presence or absence of a content corresponding to one-month previous date to the currently focus-positioned date. When having detected no content corresponding to the one-month previous date, then the controller portion 12 attempts to detect the presence or absence of a content corresponding to two-year previous date to the currently focus-positioned date. Thus, the controller portion 12 attempts to detect the presence or absence of the content by sequentially going back on the "per-year basis" to a year to which the date of the oldest content belongs.

By way of one example, a case is now assumed in which, as the content having the oldest date, a content having the date Jul. 10, 2003 is detected, and the currently focus-positioned date on the calendar-view or day-view lifetime calendar is Sep. 13, 2005. In this case, the controller portion 12 first attempts to detect from the memory 11 a content corresponding to Sep. 13, 2004 corresponding to a one-month previous date.

When having not detected such a content exactly corresponding to the one-month previous date (i.e., when no such a content is present), the controller portion 12 attempts to detect from the memory 11 contents corresponding to respective dates in, for example, one week before and after Sep. 13, 2004, which corresponds to one-year previous date, (Sep. 6 to 12, 2004 and Sep. 14 to 20, 2004).

When having not detected such a content exactly corresponding to the respective one-month previous date, the controller portion 12 attempts to detect from the memory 11 contents corresponding to the two-year previous date to the currently focus-positioned date.

When having not detected such a content exactly corresponding to the two-year previous date (i.e., when no such a content is present), the controller portion 12 attempts to detect from the memory 11 contents corresponding to respective dates in, for example, one week before and after Sep. 13, 2003, which corresponds to the two-year previous date, (Sep. 6 to 12, 2003 and Sep. 14 to 20, 2003) corresponding to the two-year previous date.

Thus, the controller portion 12 attempts to detect the presence or absence of the content by sequentially going back on the "per-year basis" to the year to which the date of the oldest content belongs.

Then, at step S70, the controller portion 12 determines the presence or absence of a content detected in the "per-year basis" detection. If a content of the above-described predetermined type is detected, then the process proceeds to step S66 at the timing of the detection. Otherwise, if a content of the above-described predetermined type is not detected, then the process proceeds to step S71.

If at step S63 the controller portion 12 determines the oldest date to be not a one-month or more previous date, then at step S64 the controller portion 12 determines whether the oldest date is a one-month or more previous date. If the oldest date is determined to be a one-month or more previous date, then the process proceeds to step S71. Otherwise, if the oldest date is determined to be a date within one month, then the process proceeds to step S65.

If at step S64 the oldest date is determined to be a one-month or more previous date and if a corresponding content is not detected even when the "per-year basis" content detection has been made at steps S69 and S70, the controller portion 12 performs "per-month basis" content detection at step S71.

At step S71, the controller portion 12 first attempts to detect the presence or absence of a content corresponding to one-month previous date to the currently focus-positioned date. When having detected no content corresponding to the one-month previous date, then the controller portion 12 attempts to detect the presence or absence of a content corresponding to two-month previous date to the currently focus-positioned date. Thus, the controller portion 12 attempts to detect the presence or absence of the content by sequentially going back on the "per-month basis" to a month to which the date of the oldest content belongs.

By way of one example, a case is now assumed in which, as the content having the oldest date, a content having the date Nov. 10, 2004 is detected, and the currently focus-positioned date on calendar-view or day-view lifetime calendar is Sep. 13, 2005. In this case, the controller portion 12 first attempts to detect from the memory 11 contents corresponding to Aug. 13, 2005, which corresponds to the one-month previous date to the currently focus-positioned date and respective dates in, for example, one week before and after Aug. 13, 2005 (Aug. 6 to 12 and 14 to 20, 2004).

When having not detected such contents exactly corresponding to the respective one-month previous dates, the controller portion 12 attempts to detect from the memory 11 contents corresponding to Jul. 13, 2005, which corresponds to the two-month previous date to the currently focus-positioned date, and respective dates in, for example, one week before and after Jul. 13, 2005 (Jul. 6 to 12, and 14 to 20, 2005).

Thus, the controller portion 12 attempts to detect the presence or absence of the content by sequentially going back on the "per-month basis" to the month to which the date of the oldest content belongs. Then, at step S72, the controller portion 12 determines the presence or absence of a content detected in the "per-month basis" detection. If a content of the above-described predetermined type is detected, then the process proceeds to step S66 at the timing of the detection. Otherwise, if a content of the above-described predetermined type is not detected, then the process proceeds to step S65.

If at step S64 the oldest date is a within-one-month date is determined to be a within-one-month date and in the event that a corresponding content is not detected even when the "per-month basis" content detection has been made at steps S71 and S72, then at step S65 the controller portion 12 randomly determines a date in accordance with a random number from among dates between the currently focus-positioned date and the oldest date. Then, the process proceeds to step S66.

If at step S66 the respective content is detected in the "per-year basis" detection, "per-month basis" detection, or random detection, then at step S66 the respective content is popup-displayed on the display portion 5, and history information indicative of the graphically displayed content is stored into a remembrance list in the memory 11 shown in FIG. 1.

Figure 18:
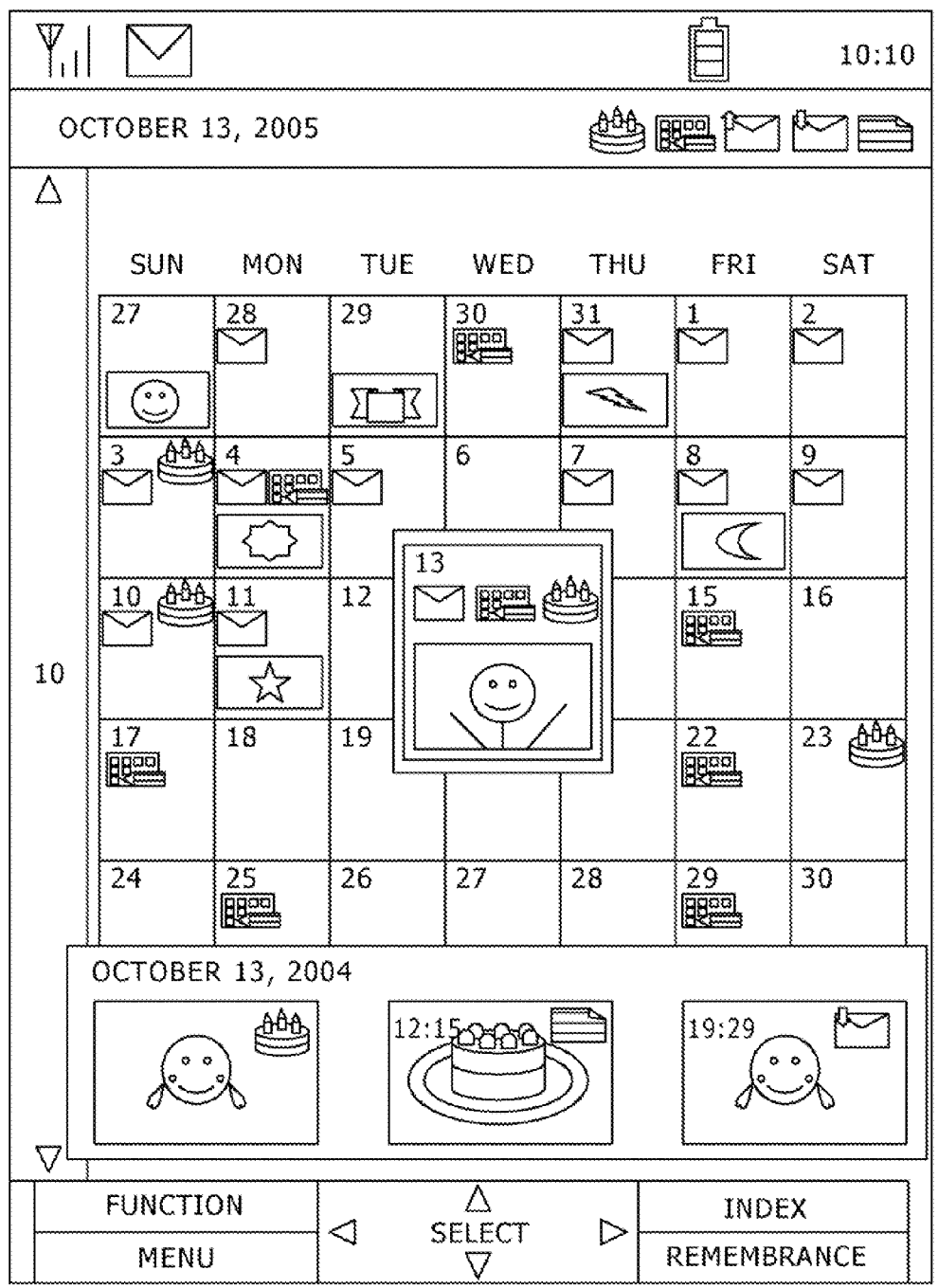
FIG. 18 is a view showing a display example of a remembrance popup display of a content presented on a calendar-view lifetime calendar.
Figure 19:
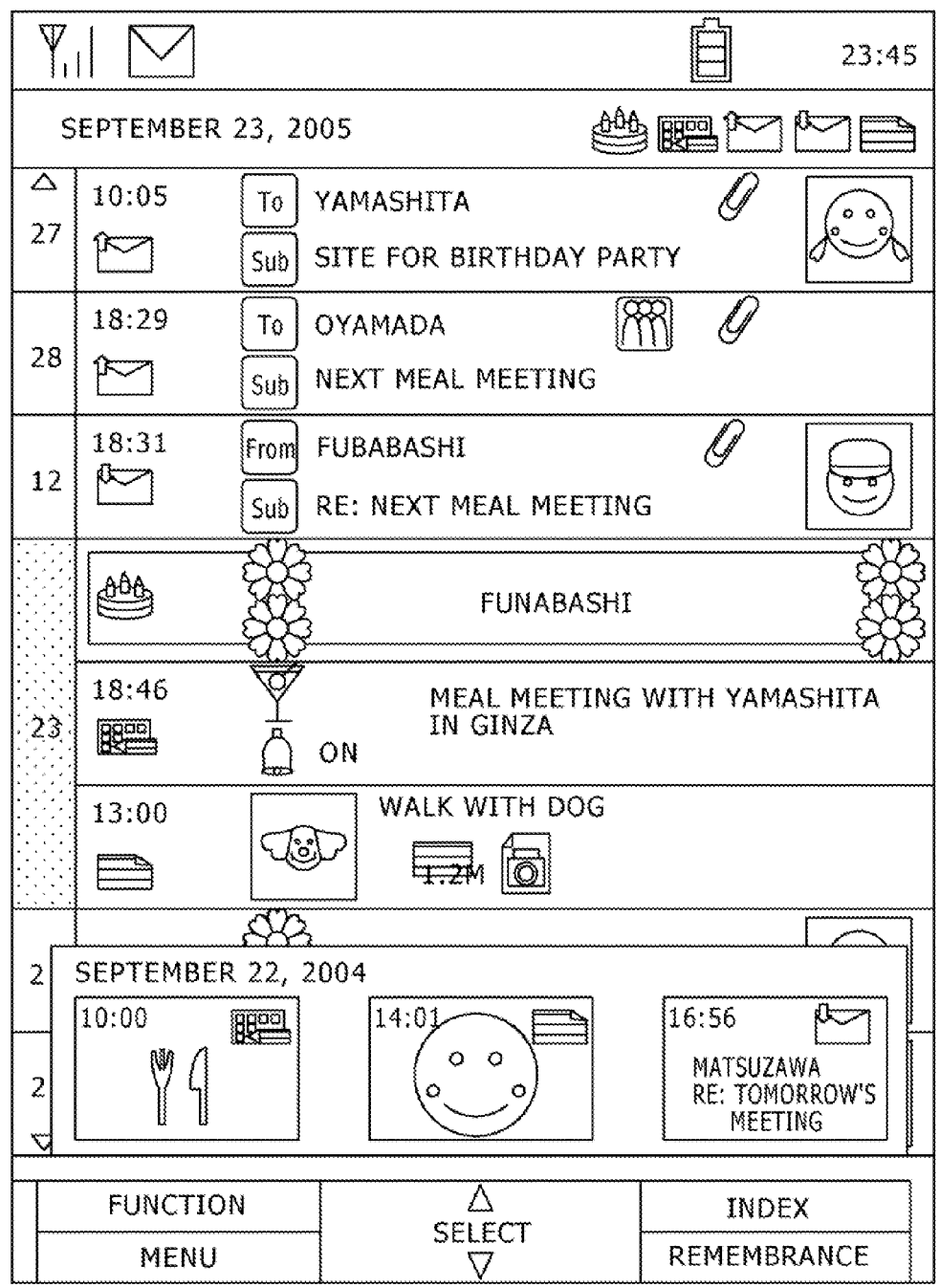
FIG. 19 is a view showing a display example of a remembrance popup display of a content graphically displayed on a list display screen of the day-view lifetime calendar.
Figure 20:
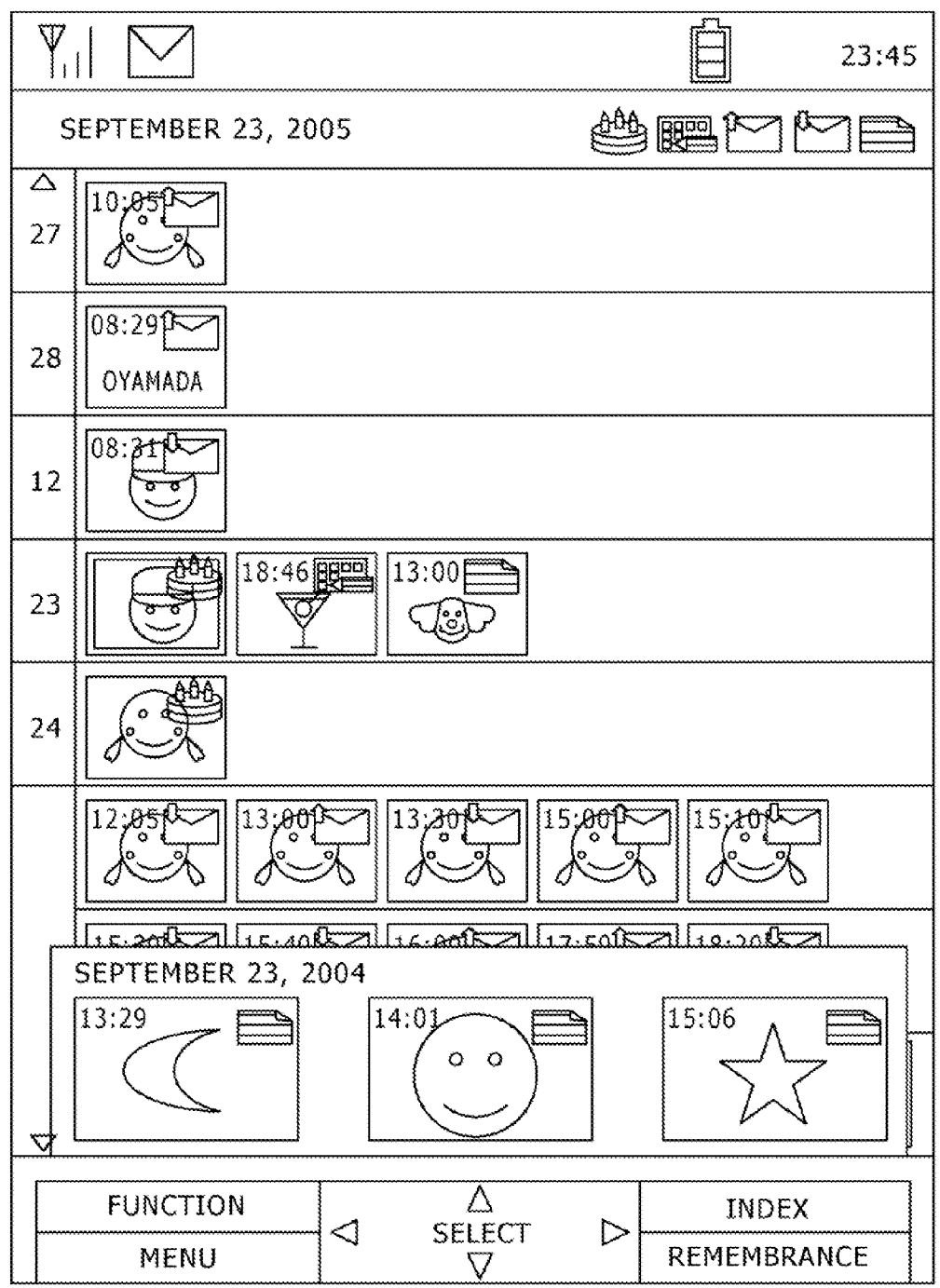
FIG. 20 is a view showing a display example of a remembrance popup display of contents presented on a thumbnail display screen of a day-view lifetime calendar.

FIGS. 18 to 20, respectively, are display examples of contents presented in the remembrance popup display. FIG. 18 is a display example of contents popup-displayed in the event of displaying the calendar-view lifetime calendar. In the display example of FIG. 18, the focus is positioned on October 13th on the calendar-view lifetime calendar of October 2005 (corresponding to a current or operation date in the present example), in which contents of Oct. 13, 2004 corresponding to a one-year previous date to Oct. 13, 2005 are detected and popup-displayed.

FIG. 19 is a display example of contents popup-displayed on a list display screen of the day-view lifetime calendar. In this example, the focus is positioned on a birthday content on a birthday content on Sep. 23, 2005, and correspondingly thereto, contents corresponding to Sep. 22, 2004 are detected and popup-displayed.

In this case, normally, contents corresponding to Sep. 23, 2004, which is the one-year previous date to Sep. 23, 2005, are to be popup-displayed. However, in the example of FIG. 19, since no content corresponding to Sep. 23, 2004 is present, the contents corresponding to September 22nd belonging to the period before and after Sep. 23, 2004 are popup-displayed.

FIG. 20 is a display example of contents popup-displayed on a thumbnail display screen of the day-view lifetime calendar. In the display example shown in FIG. 20, the focus is positioned on a thumbnail image of a still image content corresponding to Sep. 23, 2005, and correspondingly thereto, contents corresponding to Sep. 23, 2004 are detected and popup-displayed.

In such remembrance popup-display, the controller portion 12 provides control such that the popup-display is performed in an area excepting a display area for a focus-positioned content. More specifically, in the example of FIG. 18, the focus is positioned on the content corresponding to October 13th graphically displayed in substantially the center of the display portion 5. As such, the popup display is not performed in the display area of the currently focus-positioned content, but is performed in, for example, a display area near the lower end portion of the display portion 5 (or can be performed in a display area near the upper end portion of the display portion 5).

Further, in the event of providing the remembrance popup display, a plurality of contents, such as three contents, for example, are graphically list-displayed by being arranged along the short side direction of the display portion 5. In the example of FIG. 18, three or more contents are detected in accordance with the order of content priority, whereby a birthday content, still image content (thumbnail image) captured or acquired by the camera portion 8, and protection-set received e-mail content are displayed in left to right display areas (popup display areas). When two or less (one) contents are detected, the residual display area is displayed as a blank.

Further, when four or more detected contents are present, contents other than those previously graphically displayed are graphically displayed in a subsequent operation of remembrance popup display. More specifically, a case is now assumed in which, in the example of FIG. 18, six still image contents are detected as contents corresponding to Oct. 13, 2004. In this case, the controller portion 12 stores information regarding three still image contents presented in the remembrance popup display (such as identification information of the respective still image contents). Then, in the event of performing a subsequent operation of remembrance popup display to be performed corresponding to Oct. 13, 2004, the remembrance popup display is performed in accordance with the stored information to display three still image contents different from the three still image contents presented in the previous remembrance popup display. Thereby, even when performing the operations of the remembrance popup display corresponding to the same date, a different content(s) can be displayed every time the remembrance popup display is performed.

Subsequently, after the remembrance popup display such as described above, at step S67 of the flow diagram of FIG. 17, the controller portion 12 monitors the operation state of the operation portion 6 and thereby determines whether an operation of moving the currently stationary focus has been performed. The remembrance popup display is continued until detection of an operation of moving the focus, and the process proceeds to step S68 at the timing of detection of an operation of moving the focus.

At step S68, since an operation of moving the focus is detected, the current remembrance popup display is closed to disappear from the display portion 5, and then the entire process shown in the flow diagram of FIG. 17 is terminated. That is, the remembrance popup display is performed during the stationary state of the focus and is terminated at the timing of detection of the focus operation. Thereby, the remembrance popup display can be performed only during non-operation by the user, consequently making it possible to prevent the user operation from being disturbed by the remembrance popup display.

(Remembrance List Display Operation)

Figure 21:
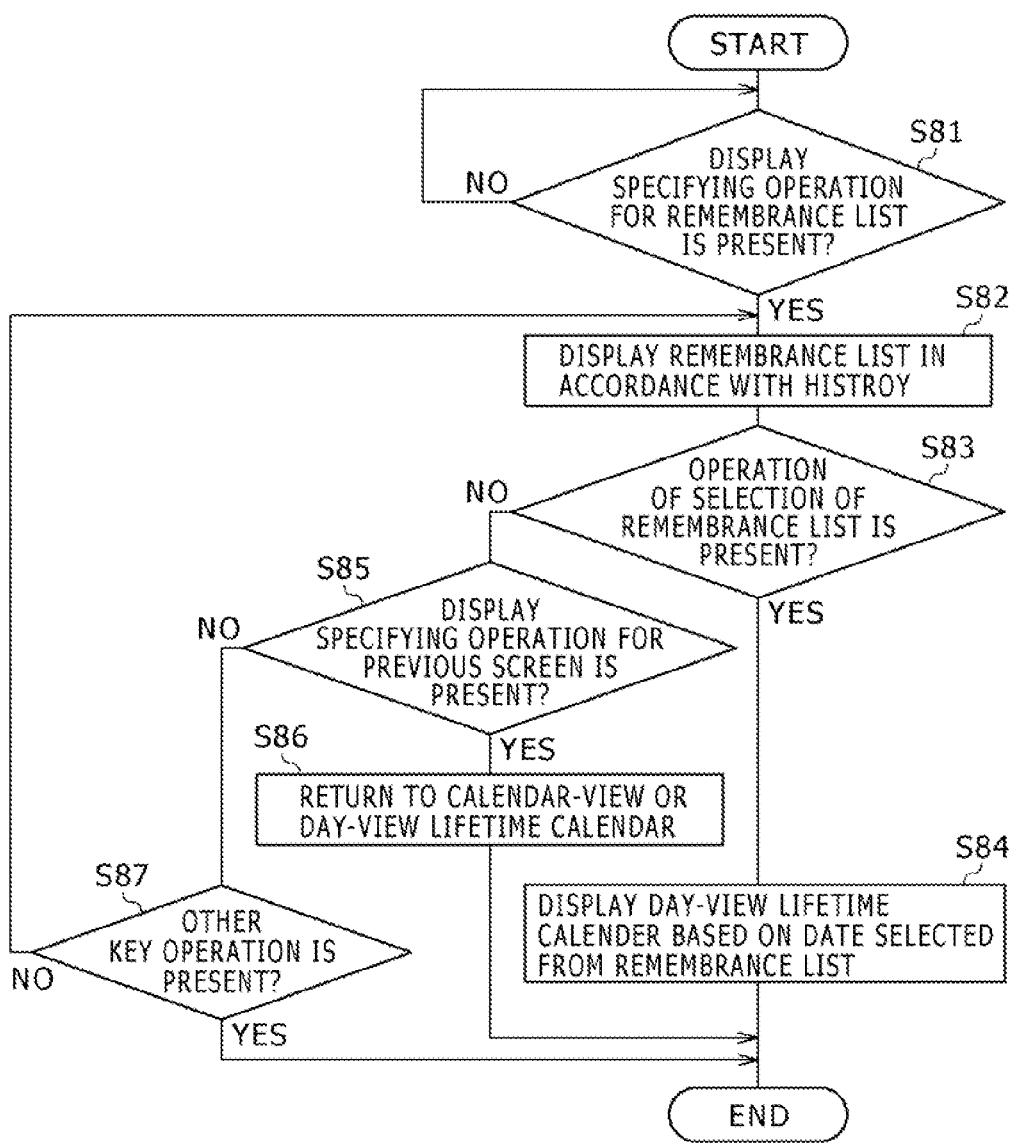
FIG. 21 is a flow diagram showing the flow of a display operation for displaying a remembrances list in the mobile phone of the embodiment.

After the remembrance popup display is performed, the information regarding the respective content graphically displayed in the remembrance popup display is stored into the remembrance list in the memory 11, as described above. The remembrance list is displayable through a predetermined operation of the user. When a date in a desired content is selected from the remembrance list, a day-view lifetime calendar corresponding to the selected date is displayed. The flow of the operation is shown in a flow diagram of FIG. 21. Under the control of the controller portion 12, the process of the flow diagram shown in FIG. 21 is started in accordance with the lifetime calendar application program upon display of a calendar-view or day-view lifetime calendar on the display portion 5.

At step S81, the controller portion 12 monitors the operation portion 6, and thereby determines whether a display specifying operation to display the remembrance list has been performed.

As one example, when desiring to display the remembrance list, the user carries out an operation of depression of the fourth soft key 29 shown in FIG. 2A in the state where a calendar-view or day-view lifetime calendar is displayed. At step S81, the controller portion 12 determines the presence or absence of an operation of depression of the fourth soft key 29, and thereby determines whether display of the remembrance list has been specified. The process proceeds to step S82 at the timing of detection of the operation of depression of the fourth soft key 29.

Figure 22:
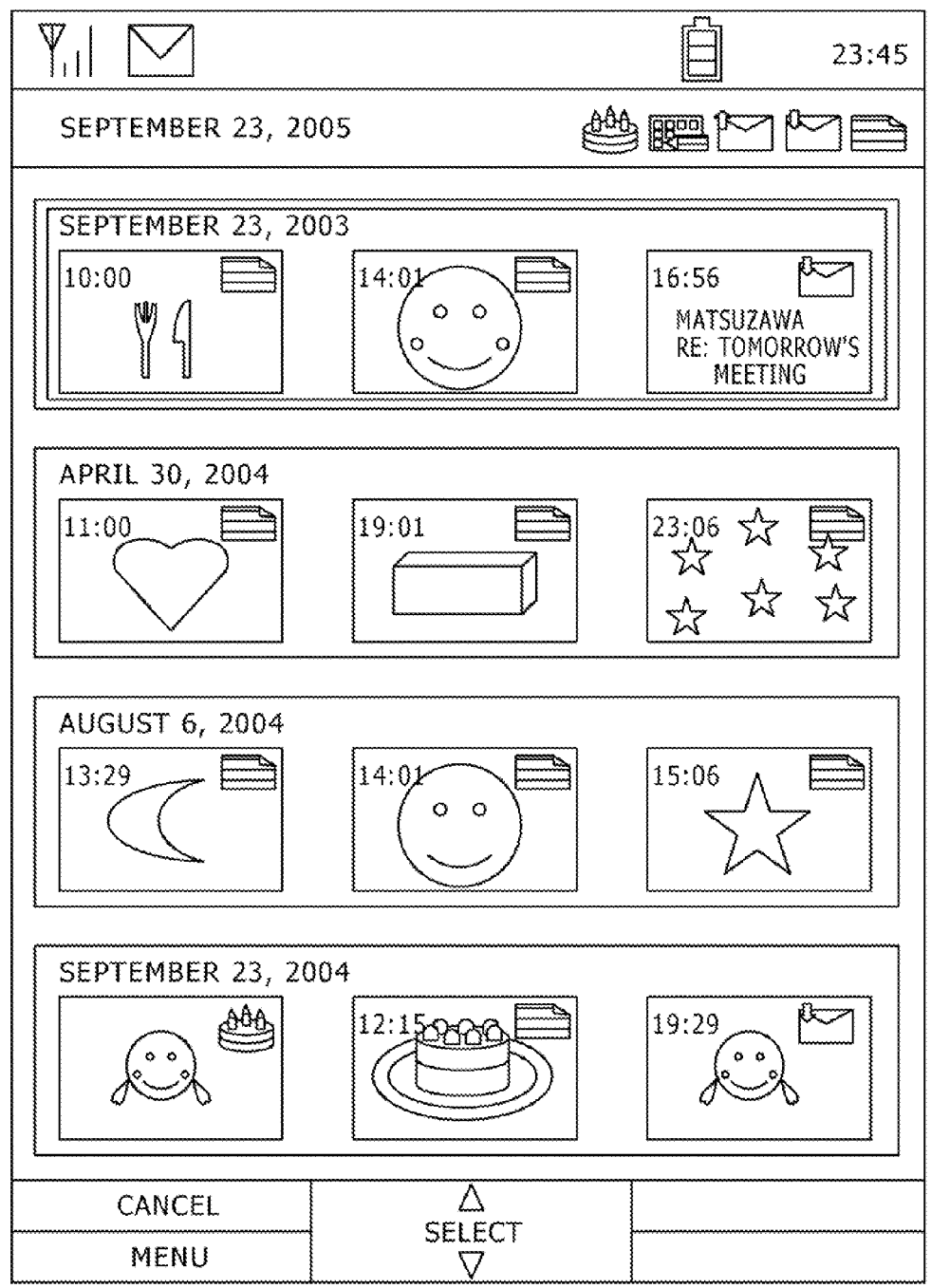
FIG. 22 is a view showing a display example of a remembrances list.

At step S82, a remembrance list stored in the memory 11 is displayed on the display portion 5. FIG. 22 shows a display example of the remembrance list. As one example, histories of four remembrance popup displays are stored in the remembrance list stored in the memory 11. In the example of FIG. 22, histories of respective remembrance popup displays of Sep. 23, 2003, Apr. 30, 2004, Aug. 6, 2004, and Sep. 23, 2004 are stored in the remembrance list in the memory 11.

Then, the focus is positioned on a latest one of the respective histories in the remembrance list, as a default. The user carries out an operation of moving the focus and carries out an operation of depression of the enter key 25 in the state the focus is kept positioned on a desired history. Thereby, the user selects the desired history. At step S83, the operation state of the enter key 25 is detected, thereby to determine whether an operation of selection of the desired history. If the operation of depression of the enter key 25 is detected, then the process proceeds to step S84. Otherwise if not detected, then the process proceeds to step S85.

Thus, since the operation of depression of the enter key 25 is detected, at step S84 detection is performed for a date of a currently focus-positioned history on the remembrance list, and a day-view lifetime calendar based on the detected date is displayed on the display portion 5. Then, the entire process of the flow diagram of FIG. 21 terminates.

More specifically, in the example of FIG. 22, in the state the focus is positioned on a history on, for example, Sep. 23, 2003, if an operation of depression of the enter key 25 is detected, then the list display screen of the day-view lifetime calendar, which is described above with reference to FIG. 12, is displayed on the display portion 5. More specifically, the day-view lifetime calendar is displayed in the form that the respective contents of September 23rd are positioned in the center of the display area of the display portion 5. Thereby, a detail of the history selected from the remembrance list can be verified on the day-view lifetime calendar.

In the present example, when the history is thus selected from the remembrance list, the "list display screen" of the day-view lifetime calendar corresponding to the date of the selected history is displayed. However, the arrangement can be such that the "thumbnail display screen" of the day-view lifetime calendar (see FIG. 13) corresponding to the date of the selected history is displayed.

At step S85, to which the process has proceeded upon non-detection of the operation of depression of the enter key 25 at step S83, the controller portion 12 determines whether an operation of returning the display screen to a previous screen displayed immediately before displaying the remembrance list is carried out. As one example, in the mobile phone of the present embodiment, upon detection of an operation of depression of the clear key 32 (shown in FIG. 2A) in the state where the remembrance list is displayed, the display screen returns to the previous screen displayed immediately before displaying the remembrance list.

As such, at step S85, the controller portion 12 determines the presence or absence of an operation of depression of the clear key 32, thereby to determine whether the operation of returning the display screen to the previous screen is carried out. If the operation of depression of the clear key 32 is detected, then the process proceeds to step S86. At step S86, the calendar-view or day-view lifetime calendar displayed immediately before displaying the remembrance list is displayed on the display portion 5. Then, the entire process shown in the flow diagram of FIG. 21 terminates.

Alternately, if at step S85 no operation of depression of the clear key 32 is detected, at step S87 the controller portion 12 monitors the presence or absence of an operation of depression of any other key than the clear key 32. If no operation of depression of the any other key is detected, then the process returns to step S82, and display of the remembrance list is continued. Otherwise, if operation of depression of the any other key is detected, then the entire process shown in the flow diagram of FIG. 21 terminates at the timing of the detection, and a process corresponding to the depressed key is executed.

More specifically, in the mobile phone of the present embodiment, in the state where the remembrance list is displayed, when the third soft key 28 is depressed, the main menu is displayed, and when the on-hook key 31 is depressed, the lifetime calendar application program terminates. At step S87, monitoring is performed to detect the presence or absence of the operation of depression of the key such as the third soft key 28 or on-hook key 31. At the timing of the detection of the operation of depression of the key such as the third soft key 28 or on-hook key 31, the process shown in the flow diagram of FIG. 21 terminates. Then, operations of control, such as display control of the main menu and termination control of the lifetime calendar application program are performed.

(Other Remembrance Popup Display Operation-1)

As described above, the above-described remembrance popup display operation presents the remembrance popup display on the basis of the "past date," such as one-year previous date or one-month previous date to the focus-positioned date. Alternately, however, the remembrance popup display operation can be performed on the basis of the "number of past contents," as described herebelow.

Figure 23:
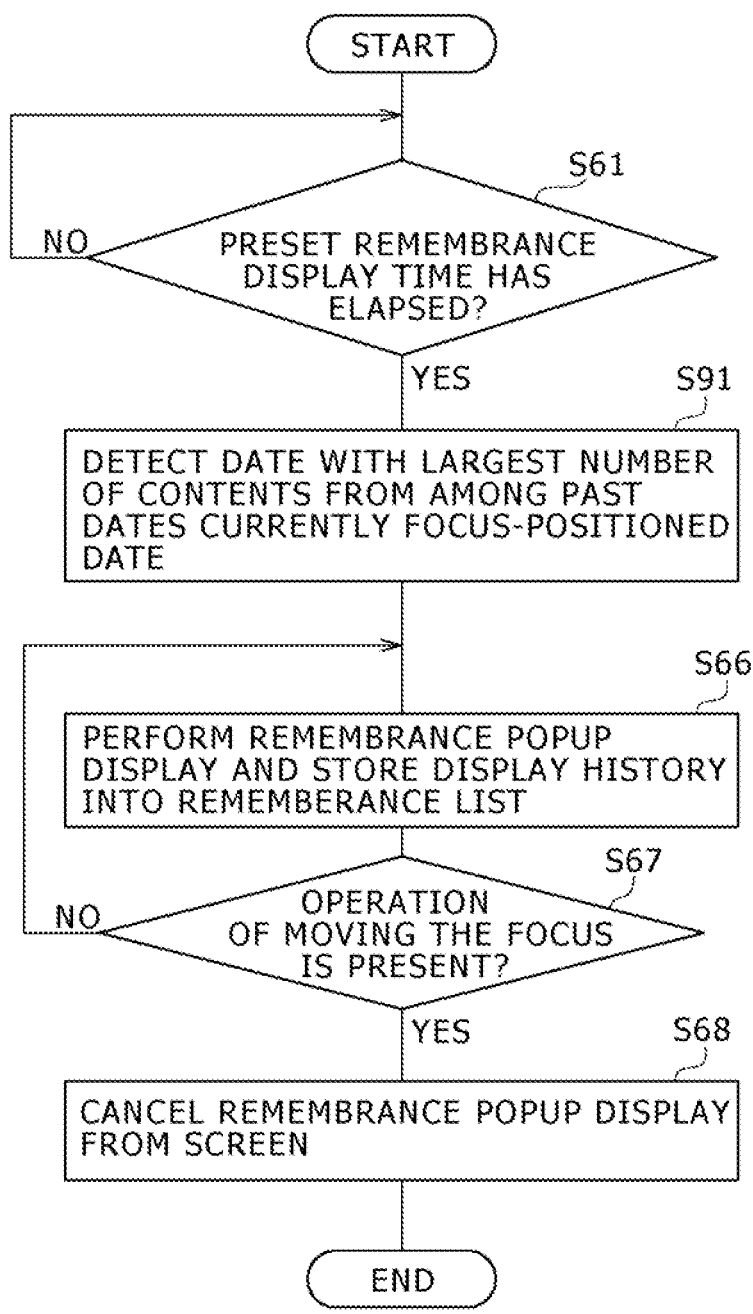
FIG. 23 is a flow diagram showing the flow of a remembrance popup display operation in accordance with the number of past contents in the mobile phone of the embodiment.

FIG. 23 is a flow diagram showing the flow of a remembrance popup display operation in accordance with the "number of past contents" in the mobile phone of the embodiment. In the flow diagram of FIG. 23, steps of operations similar to those of flow diagram of FIG. 17 are indicated with the same step numbers, and repetitive descriptions thereof will be omitted herefrom.

With reference to the flow diagram of FIG. 23, in the state where a calendar-view or day-view lifetime calendar is displayed, if a stationary state of the focus is detected, then at step S61 an elapse of a preliminarily set remembrance display time is detected. Then, the process proceeds to step S91 at the timing of the elapse of the remembrance display time.

At step S91, the controller portion 12 detects a content having a date with a largest number of contents among past dates with respect to a focus-positioned date of a content in accordance with information of time provided to the respective contents stored in the memory 11.

More specifically, on the calendar-view or day-view lifetime calendar, for example, when the focus is positioned on the Sep. 13, 2005, a content having a date previous to Sep. 13, 2005 is detected from the memory 11. Then, from among the dates on or before Sep. 13, 2005, a date with the largest number of contents is detected, and contents of the date are set as contents for remembrance popup display.

Then, as described with reference to the flow diagram of FIG. 17, at step S66 the contents of the date with the largest number of contents are popup displayed during the time until an operation of moving the focus detection is detected at step S67.

For example, a large number of still image contents occur in such an event where the user makes a trip or takes part in a wedding. Similarly, a large number of e-mail contents occur in such an event of a business arrangement or scheduling via e-mail. As such, a date with a large number of contents signifies that the date is a certain important date.

As such, on the calendar-view or day-view lifetime calendar, a date with the largest number of contents is selected from among past dates previous to a focus-positioned date, and a content corresponding to the detected date is presented as a remembrance popup display. Thereby, a content having a date determined with high probability to be some important date for the user in the past can be presented as a remembrance popup display.

(Other Remembrance Popup Display Operation-2)

Figure 24:
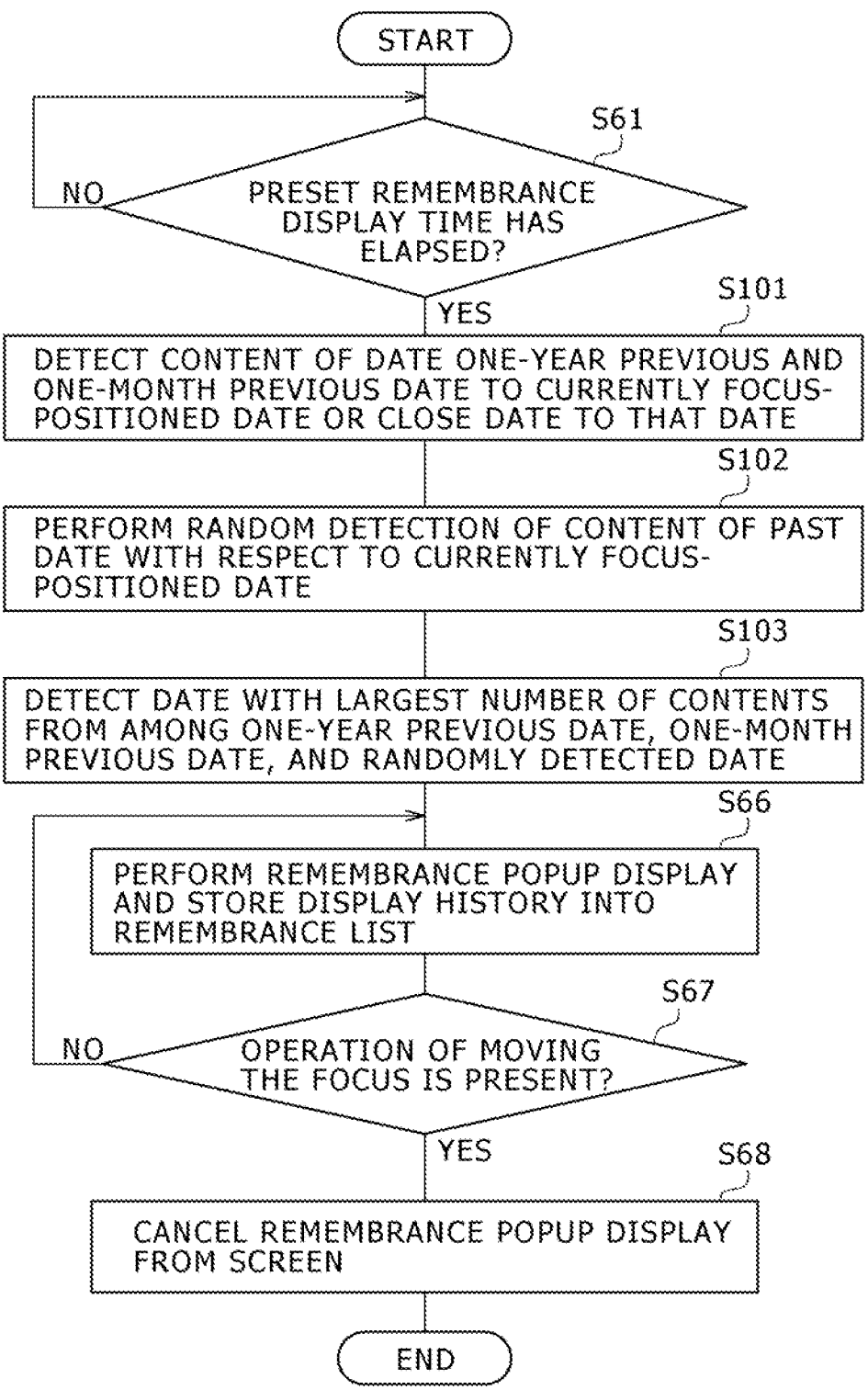
FIG. 24 is a flow diagram showing the flow of a remembrance popup display operation in accordance with a past date and the number of past contents in the mobile phone of the embodiment.

For implementation of the remembrance popup display, the remembrance popup display can be performed in accordance with the "past date" and "number of past contents" described above. FIG. 24 is a flow diagram showing the flow of a remembrance popup display operation by combining the "past date" and the "number of past contents." In the flow diagram of FIG. 24, steps of operations similar to those of the flow diagram of FIG. 17 are indicated with the same step numbers, and repetitive descriptions thereof will be omitted herefrom.

With reference to the flow diagram of FIG. 24, in the state where a calendar-view or day-view lifetime calendar is displayed, if a stationary state of the focus is detected, then at step S61 an elapse of a preliminarily set remembrance display time is detected. Then, the process proceeds to step S101 at the timing of the elapse of the remembrance display time.

At step S101, the controller portion 12 detects contents of a one-year previous date with respect to a focus-positioned date (and a date close to the one-year previous date) and contents of a one-month previous date to the focus-positioned date (and a date close to the one-month previous date).

At step S102, the controller portion 12 performs random detection of a past date with respect to the focus-positioned date on the calendar-view or day-view lifetime calendar, and detects a content corresponding to the detected date.

Then, at step S103, the controller portion 12 detects a date with the largest number of contents from among the one-year previous date with respect to the focus-positioned date (and the date close to the one-year previous date), one-month previous date to the focus-positioned date (and the date close to the one-month previous date) detected at steps S101 and S102, and the randomly detected date.

Then, as described with reference to the flow diagram of FIG. 17, at step S66 the content of the date with the largest number of contents is presented as a remembrance popup display during the time until an operation of moving the focus detection is detected at step S67.

Thereby, a content related to a focus-positioned date on a calendar-view or day-view lifetime calendar and having a date determined with high probability to be important date for the user in the past can be presented as a remembrance popup display.

(Other Remembrance Popup Display Operation-3)

Figure 25:
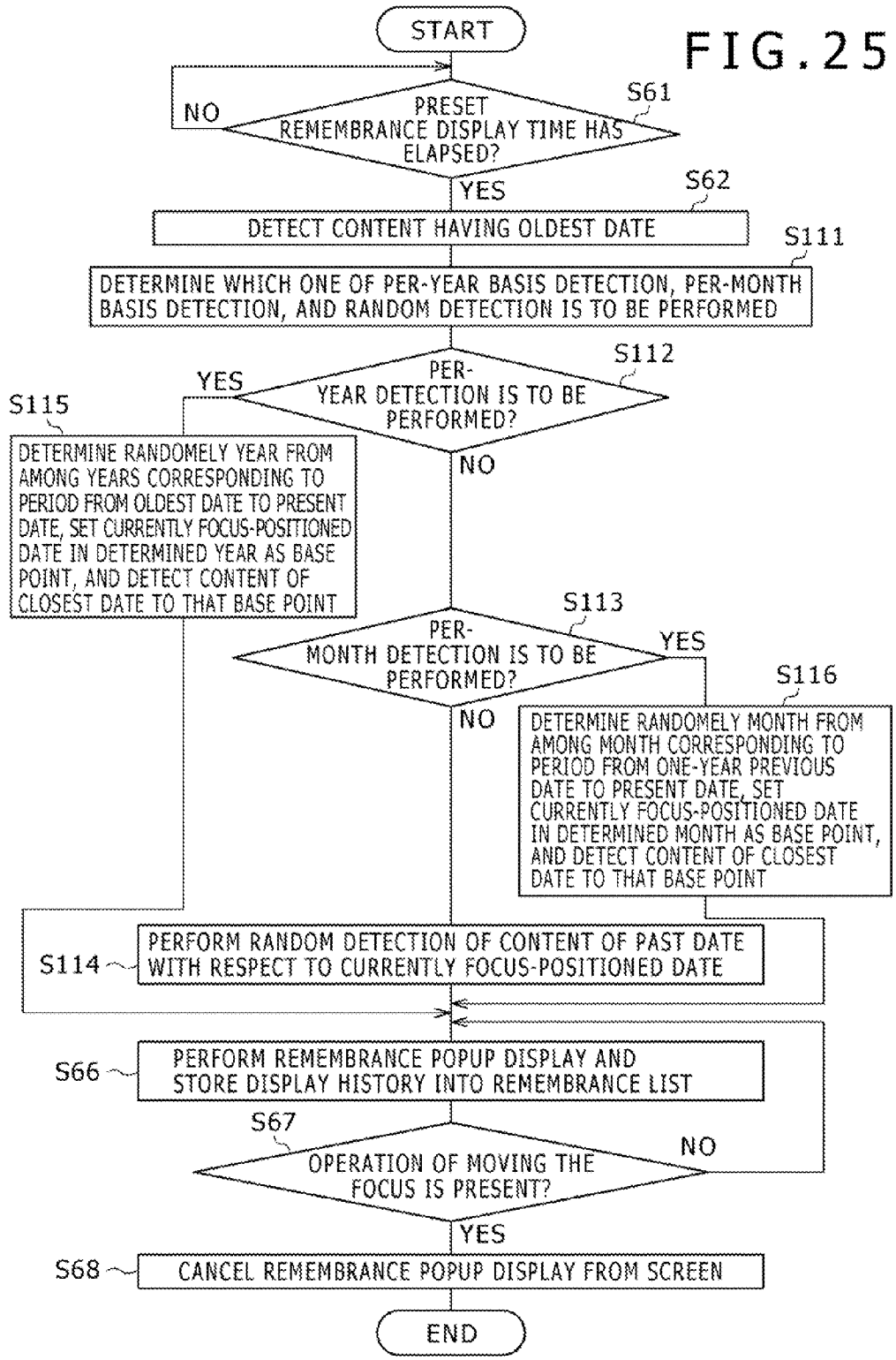
FIG. 25 is a flow diagram showing the flow of a remembrance popup display operation that performs detection of a content by detecting a "per-year detection," "per-month detection," and "random detection" at random or predetermined probability in the mobile phone of the embodiment.

The arrangement of the remembrance popup display can be such that any one of the above-described "per-year detection," "per-month detection," and "random detection" is selected at random or in accordance with the predetermined probability, and a content of the above-described predetermined type selected thereby is presented as a remembrance popup display. FIG. 25 is a flow diagram showing the flow of a remembrance popup display operation to present such a display. In the flow diagram of FIG. 25, steps of operations similar to those of the flow diagram of FIG. 17 are indicated with the same step numbers, and repetitive descriptions thereof will be omitted herefrom.

With reference to the flow diagram of FIG. 25, in the state where a calendar-view or day-view lifetime calendar is displayed, if a stationary state of the focus is detected, then at step S61 an elapse of a preliminarily set remembrance display time is detected. Then, the process proceeds to step S62 at the timing of the elapse of the remembrance display time. At step S62, a content having the oldest date is detected, and the process proceeds to S111.

At step S111, the controller portion 12 determines in accordance with the predetermined probability which one (detection) of the above-described "per-year detection," "per-month detection," and "random detection" is to be performed. As one example, in the mobile phone of the present embodiment, probabilities are preliminarily set as: probability of "per-year detection" selection=33%; probability of "per-month detection" selection=33%; and probability of "random detection" selection=33%. Thus, any one of the "per-year detection," "per-month detection," and "random detection" is determined at substantially the same probability.

Probabilities such as described above can be set with predetermined weights, as: probability of "per-year detection" determination (selection)=60%; probability of "per-month detection" determination=30%; and probability of "random detection" determination=10%. In this case, the probability of the "per-year detection" determination is highest. Alternatively, the arrangement can be such that the probabilities are optionally settable to values desired by the user.

Then, at steps S112 and S113, the controller portion 12 determines one of the "per-year detection" and the "per-month detection." is to be executed. If the "per-year detection" is determined to be executed, then the process proceeds to step S115. Otherwise, if the "per-month detection" is determined to be executed, then the process proceeds to step S116. Alternately, if any one of the "per-year detection" and the "per-month detection" is determined to be not executed, then the "random detection" is determined. Then, the process proceeds to step S114.

At step S115, to which the process has proceeded as a result of determination made to execute the "per-year detection," a year is randomly determined from among years corresponding to the date range of from the oldest date to the present date. In addition, a currently focus-positioned date on a calendar-view or day-view lifetime calendar corresponding to the detected year is recognized as a base point, and a content having a date closest to the base point is detected.

Suppose that, for the content of the date closest to the base point, contents respectively apart by the same number of dates along a past direction and a future direction with respect to the base point in the center. More specifically, suppose that, for example, there are detected both contents—one apart by three dates along the past direction from the base point and the other apart by three dates along the future direction from the base point. In this case, the controller portion 12 detects the content apart along the past direction from the base point to be the content of the date closest to the base point.

At step S116, to which the process has proceeded as a result of determination made to execute the "per-month detection," a month is randomly determined from among months corresponding to the date range of from the one-year previous date to the present date to the present date. In addition, a currently focus-positioned date on a calendar-view or day-view lifetime calendar corresponding to the detected month is recognized as a base point, and a content having a date closest to the base point is detected.

Also in the "per-month detection," in the event contents respectively apart by the same number of dates along the past direction and the future direction, the controller portion 12 detects a content apart along the past direction from the base point to be the content of the date closest to the base point.

At step S114, to which the process has proceeded as a result of the determination made to execute the "random detection," the controller portion 12 detects a content having a past date with respect to the currently focus-positioned date on the calendar-view or day-view lifetime calendar. Then, the process proceeds to step S66.

At step S66, the content detected in the "per-year detection" at step S115, the content detected in the "per-month detection" at step S116, or the content detected in the "random detection" is presented as the remembrance popup display. In addition, the history is stored into the remembrance list in the memory 11. The remembrance popup display is continued until detection of an operation of moving the focus at step S67.

Thus, any one of the "per-year detection," "per-month detection," and "random detection" is selected in accordance with the predetermined probability or at random, and a content selected thereby is presented as the remembrance popup display. Thereby, remembrance popup display having certain degrees of both regularity and randomness can be implemented.

(User Evaluation Value Table)

A user evaluation value table will be described herebelow.

In the mobile phone of the present embodiment, a rapid forward/reverse feed operation can be performed to feed contents intended for graphical display on the display portion 5. In this case, the controller portion 12 performs change control to change display time periods for the respective contents in accordance with user evaluation values stored in the user evaluation value table (briefly mentioned above) of the memory 11.

Figure 26:
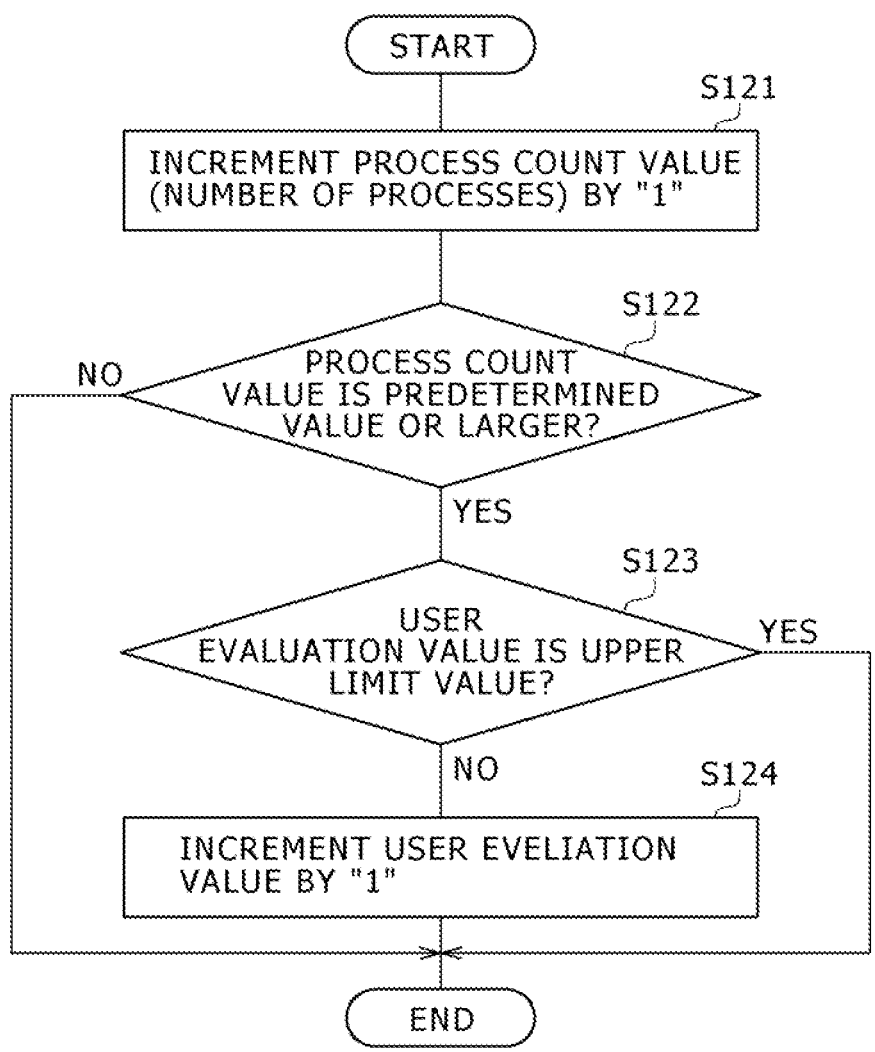
FIG. 26 is an explanatory flow diagram of a forming operation for forming a user evaluation value table in the mobile phone of the embodiment.

For performing the change control to change the display time period for the respective contents, per-content user evaluation values are stored into the user evaluation value table of the memory 11 in accordance with the corresponding lifetime calendar application program. FIG. 26 is a flow diagram of the operation of storing the respective user evaluation value.

When a process for a respective content for list-display on a lifetime calendar is selected, a process such as display of the content is performed in accordance with the application program dedicated for or corresponding to the content specified for the process. More specifically, when, for example, a still image content is specified or selected from a lifetime calendar for the process, the selected still image content is displayed on the display portion 5 in accordance with the viewer function of the camera control program. Similarly, when, for example, an e-mail content is selected from a lifetime calendar for the process, the selected e-mail content is displayed in accordance with the e-mail management program.

Thus, when the process, such as described above, has been performed, the flow diagram of FIG. 26 is started in accordance with the lifetime calendar application program.

At step S121, the process count value (number of processes) is incremented by "1." More specifically, information indicative of the number of processes (process count information) is added to a respective content stored in the memory 11. Each time a process is executed for a respective content, the process count for the processed content is incremented by "1."

After the process count value has thus been incremented, at step S122, the controller portion 12 determines whether the total process count value is larger than or equal to the predetermined value. If it is determined that total process count value is larger than or equal to the predetermined value, then the process proceeds to step S123. Otherwise (if total process count value is not larger than or equal to the predetermined value), then the entire process shown in FIG. 26 simply terminates (without executing further processing).

Subsequently, at step S123, to which the process has proceeded as a result of the determination that total process count value is larger than or equal to the predetermined value, the user evaluation value table of the memory 11 is referenced or looked up. Thereby, it is determined whether the user evaluation value of the content with the incremented process count value is an upper limit value of user evaluation values stored in the user evaluation value table. If the user evaluation value of the content stored in the user evaluation value table is already the upper limit value of the user evaluation values stored in the user evaluation value table, then the process shown in FIG. 26 simply terminates (without executing further processing).

However, if the user evaluation value of the content stored in the user evaluation value table is below the upper limit value of the user evaluation values, then the process proceeds to step S124. At step S124, the user evaluation value of the content in the user evaluation value table is incremented by "1," and then the process shown in FIG. 26 simply terminates (without executing further processing).

FIG. 27 shows the relationship between respective contents and user evaluation values thereof by way of example. In the example shown in FIG. 27, when the process count value of a content is 0 to 3, value "1" is added to the content stored in the user evaluation value table as the user evaluation value of the content stored as the user evaluation value thereof. Alternatively, when the process count value of the content is in the range of 4 to 6, value "2" is added to the content stored in the user evaluation value table as the user evaluation value of the content stored as the user evaluation value thereof. Still alternatively, when the process count value of the content is in the range of 10 to 12, value "4" is added to the content stored in the user evaluation value table as the user evaluation value of the content stored as the user evaluation value thereof. Yet alternately, when the process count value of the content is larger than or equal to 13, value "5" is added to the content stored in the user evaluation value table as the user evaluation value of the content stored as the user evaluation value thereof.

Thus, the user evaluation value of the respective content stored in the user evaluation value table is incremented by "1" corresponding to the process count value of the content. Thereby, the user evaluation value of the respective content stored in the user evaluation value table is updated correspondingly to the process count value of the content.

(Change Control Operation for Display Time Period in Accordance with User Evaluation Value)

When performing continually changing display of respective contents on the display portion 5, the controller portion 12 performs change control to change the display time periods for the respective contents in accordance with corresponding user evaluation values stored in the user evaluation value table. A change control operation for changing the display time periods for respective contents in accordance with the user evaluation values will be described herebelow with reference to an example case. In the example case, it is contemplated that the change control operation is performed for contents intended for graphical display on the "thumbnail display screen" of the day-view lifetime calendar shown in FIG. 13.

(Continuous Page Changing Operation-1)

A continuous page changing operation-1 will be described below.

In the mobile phone of the present embodiment, in the state the thumbnail display screen of the lifetime calendar is displayed, when the first soft key 26 (shown in FIG. 2), for example, is kept depressed (i.e., "pressed and held down"), the controller portion 12 performs per-page display changing across the respective thumbnail display screens along the direction of dates to the past. Alternatively, when the second soft key 27 is "pressed and held down, the controller portion 12 performs the per-page display changing across respective thumbnail display screens along the direction of dates to the future. The change control is performed to change the display time period for a thumbnail display screen intended for display in accordance with user evaluation values of respective contents forming the thumbnail display screen.

Figure 28:
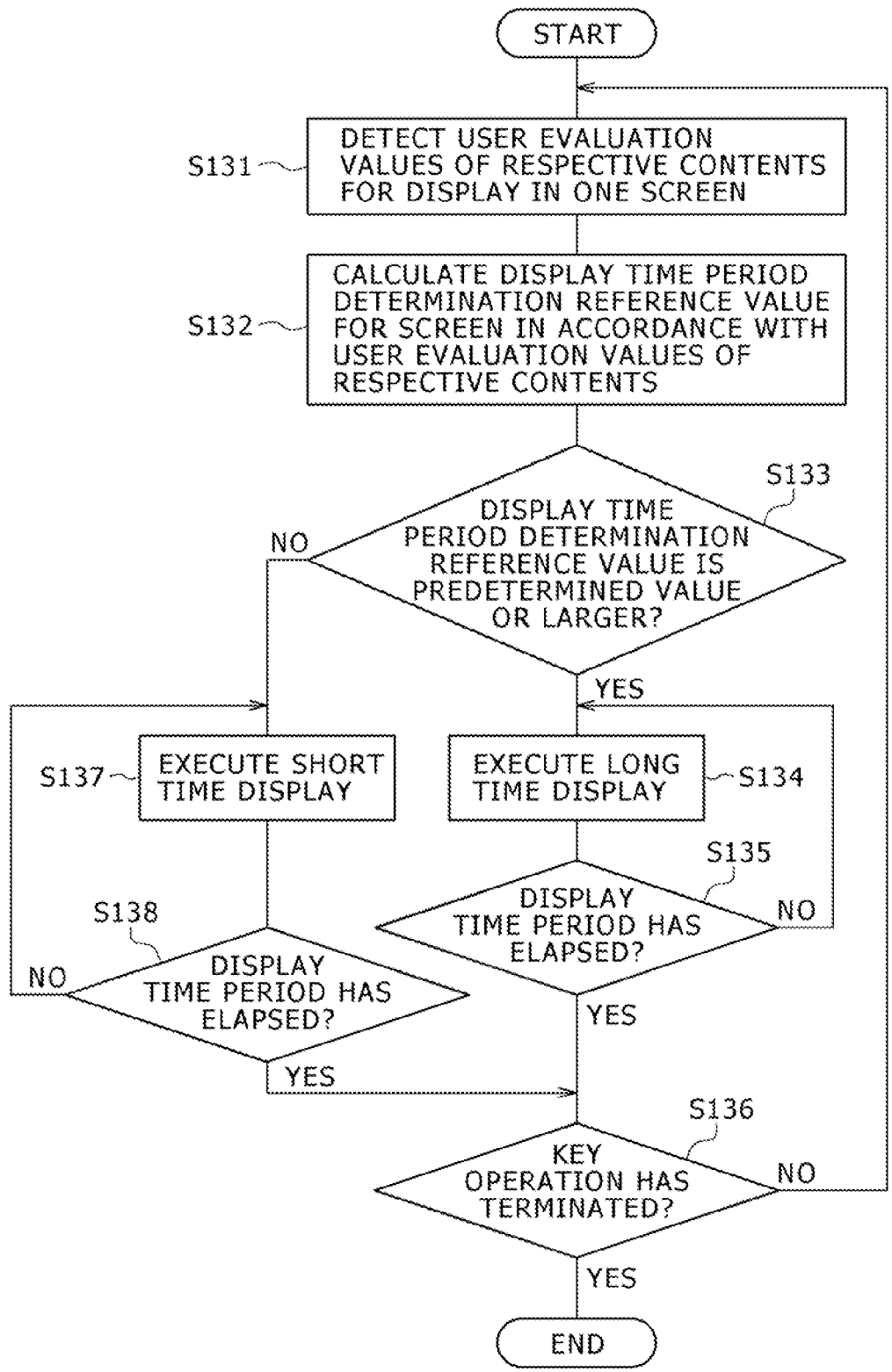
FIG. 28 is an explanatory flow diagram of a continuous page changing operation performed in the mobile phone of the embodiment.

FIG. 28 shows a flow diagram of a continuous page changing operation performed as described above. The process shown in the flow diagram of FIG. 28 is started under the control of the controller portion 12 in accordance with the lifetime calendar application program stored in the memory 11. More specifically, the process is started upon detection of a "press and hold down" operation of the first or second soft key 26 or 27 in the state the day-view lifetime calendar of the "thumbnail display screen" is displayed.

At step S131, the controller portion 12 detects user evaluation values of respective contents, which forms a respective thumbnail display screen intended for display on the display portion 5, from the user evaluation value table stored in the memory 11. Upon detection, the process proceeds to step S132.

At step S132, in accordance with the user evaluation values of the respective contents, the controller portion 12 calculates a display time period determination reference value for the thumbnail display screen formed from the respective contents.

(Calculation (Operation) of Display Time Period Determination Reference Values)

As an example, the "display time period determination reference value" mentioned above is determined or calculated by the controller portion 12 in any one of calculation methods described hereinbelow.

1. User evaluation values of the respective contents belonging to the thumbnail display screen intended for display are integrated, and the integrated value (total of the user evaluation values of the contents) is determined to be a display time period determination reference value;

2. Of the user evaluation values of the contents belonging to the thumbnail display screen intended for display, a largest user evaluation value is determined to be a display time period determination reference value; and 3. For example, three contents are selected in order from large user evaluation value from among the thumbnail display screen intended for display, and user evaluation values of the three contents are integrated, and the integrated value (total of the user evaluation values of the contents) is determined to be a display time period determination reference value.

Thus, the display time period determination reference value is determined or calculated by the controller portion 12 in accordance with any one of the calculation methods 1 to 3 described above. Then the process proceeds to step S133. At step S133, the controller portion 12 determines whether the display time period determination reference value calculated at step S132 is larger than or equal to a predetermined threshold value.

If the display time period determination reference value is larger than or equal to the predetermined threshold value, then the process proceeds to step S134. At step S134, long time display (or, "long-time display control") is performed to display the thumbnail display screen intended for display for a relatively long time period of, for example, five seconds. Otherwise, if the display time period determination reference value is less than the predetermined threshold value, then the process proceeds to step S137. At step S137, short time display (or, "short time display control") is performed to display the thumbnail display screen intended for display for a relatively short time period of, for example, one second.

After the long time display has been performed, the process proceeds to step S135. At step S135, the time elapse of five seconds (the aforementioned example time period) is monitored in accordance with the time derived from the timer 10. Then, the process proceeds to step S136 at the timing of detection of the time elapse of five seconds. Alternately, after the short time display has been performed, the process proceeds to step S138. At step S138, the time elapse of one second (the aforementioned example time period) is monitored in accordance with the time derived from the timer 10. Then, the process proceeds to step S136 at the timing of detection of the time elapse of one second.

At step S136, if termination of a user's "press and hold down" operation of the soft key 26 or 27 has been detected, then the entire process shown in FIG. 28 simply terminates (without executing further processing). Otherwise, if termination of the user's "press and hold down" operation has not been detected, then the process returns to step S131.

Thus, during the "press and hold down" operation of the soft key 26 or 27, thumbnail display screens intended for display are rapidly change-displayed on the per-page basis. During the display time period, a thumbnail display screen having a display time period determination reference value less than the threshold value is displayed only for the short time period, but is rapidly changed. On the other hand, a thumbnail display screen having a display time period determination reference value larger than or equal to the threshold value is displayed for the long time period, and then is changed.

When a thumbnail display screen has a display time period determination reference value larger than or equal to the threshold value as in the case described above, contents forming the thumbnail display screen includes a content with a user evaluation value incremented corresponding to multiple times of processes, such as display and regeneration performed by the user in the past. The thumbnail display screen with the large user evaluation value is displayed on the display portion 5 for the long time period.

Thus, when the soft key 26 or 27 is "pressed and held down" by the user, automatic long time display is performed to display a thumbnail display screen inclusive of a content with high user-selection probability for the process such as display or regeneration (=thumbnail display screen inclusive of a content with a large user evaluation value, i.e., thumbnail display screen with a content with high user-selection probability for the process such as display or regeneration). Consequently, just by the "press and hold down" operation of the soft key 26 or 27, not only can thumbnail display screens on respective pages be rapidly viewed, but also a thumbnail display screen inclusive of a content with high user-selection probability for the process such as display or regeneration can be automatically displayed for the long time period without complicate operation, careful attention, and the like being required.

(Continuous Page Changing Operation-2)

A continuous page changing operation-2 will be described below.

According to the continuous page changing operation described above, when the display time period determination reference value is larger than or equal to the threshold value, long time display of a thumbnail display screen is performed. Alternately, according to the above-described operation, when the display time period determination reference value is less than the threshold value, short time display of a thumbnail display screen is performed. That is, the long or short time thumbnail display screen display is selectively performed by determination of the display time period between the long and short time periods. However, the continuous page changing operation can be such that the thumbnail display screen display is performed for display time periods corresponding to the display time period determination reference values, as described herebelow.

Figure 29:
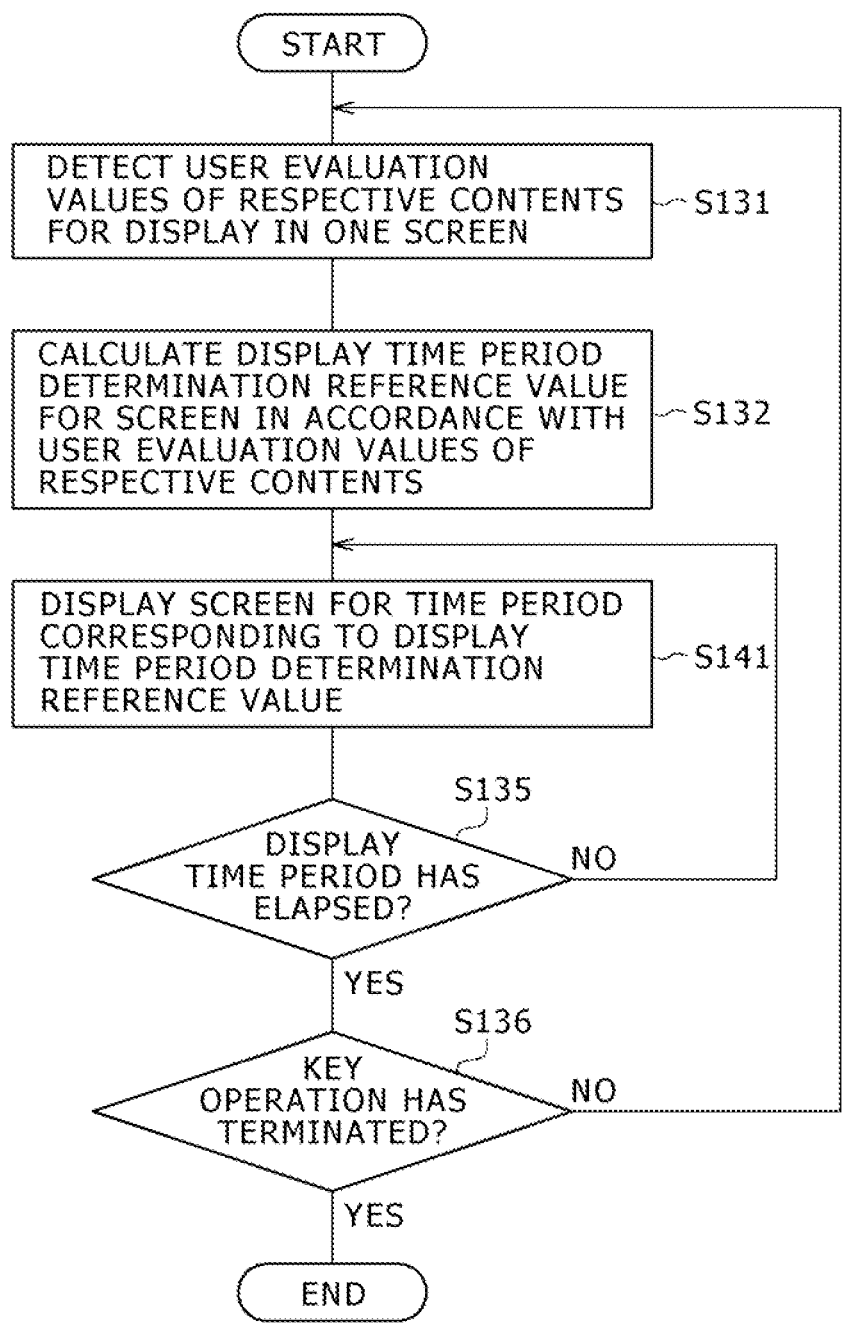
FIG. 29 is an explanatory flow diagram of another continuous page changing operation performed in the mobile phone of the embodiment.

FIG. 29 is a flow diagram of a continuous page changing operation for thumbnail display screen display for a time period corresponding to a display time period determination reference value. In description of the operation shown in the flow diagram of FIG. 29, steps of the same operations as in the flow diagram shown in FIG. 28 are referred to by using the same step numbers, and repetitive descriptions thereof will be omitted herefrom.

With reference to the flow diagram of FIG. 29, at steps S131 and S132, a display time period determination reference value for respective contents belonging to (or, to be displayed in) a thumbnail display screen intended for display is calculated in accordance with user evaluation values of the respective contents. Then, the process proceeds to step S141, at which the thumbnail display screen is displayed on the display portion 5 for a time period corresponding to the time period corresponding to the calculated display time period determination reference value. More specifically, in this case, the display time period for the thumbnail display screen is changed to any one of time periods, such as one second, two seconds, three seconds, and five seconds, corresponding to such calculated display time period determination reference value.

At step S136, in the time period before detection of termination of the "press and hold down" operation of the soft key 26 or 27, change control is continually provided for the change display time period corresponding to the display time period determination reference value. Thereby, effects similar to those in the previous example described above can be obtained.

(Page-Jump Changing Operation-1)

A page-jump changing operation-1 will be described herebelow.

According to the above-described example, respective per-page thumbnail display screens are sequentially change-displayed corresponding to per-page user evaluation values (=display time period determination reference values). However, the page-jump changing operation described herein is 'performed to display only a thumbnail display screen(s) having a predetermined display time period determination reference value.

Figure 30:
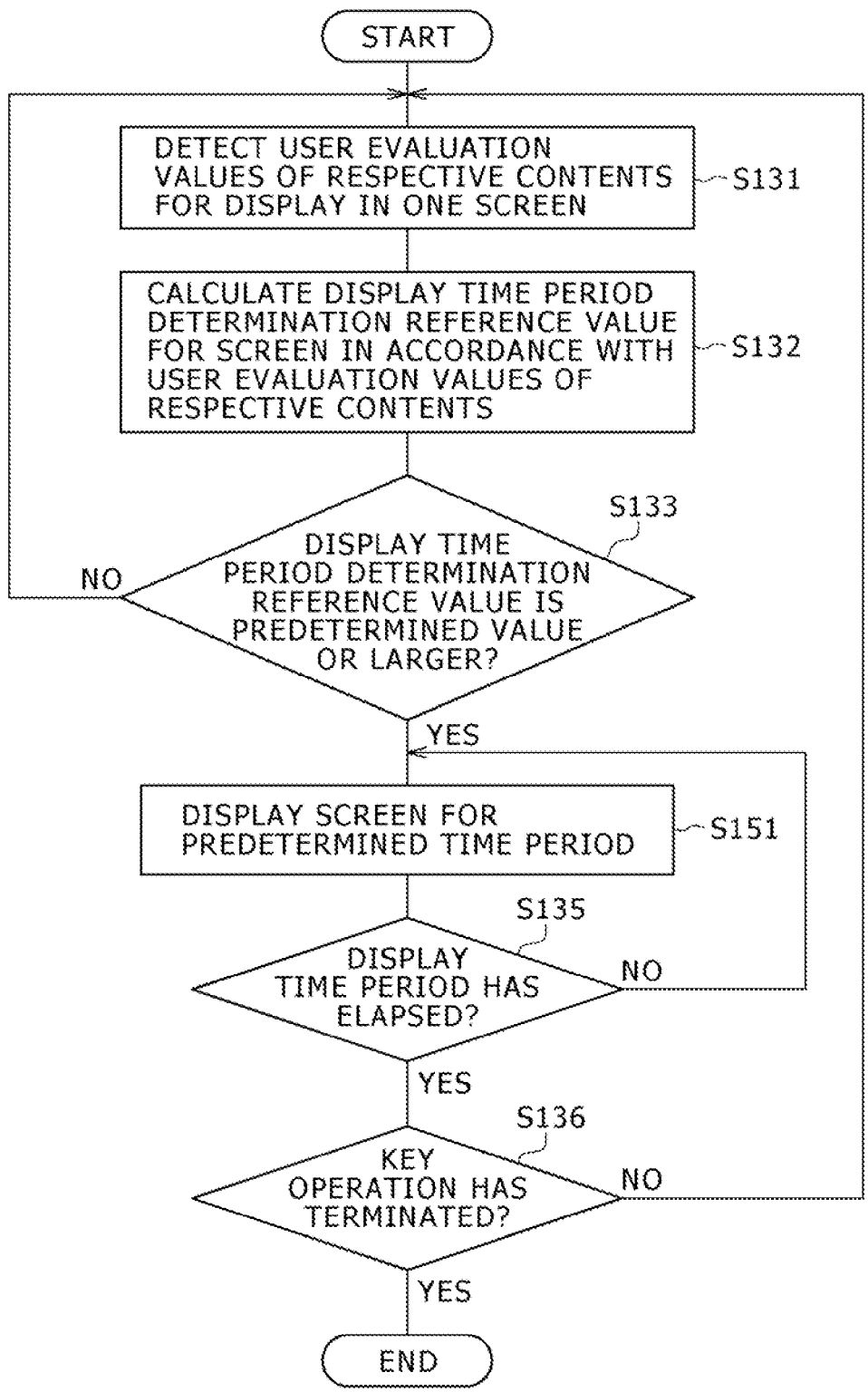
FIG. 30 is an explanatory flow diagram of a page-jump changing operation performed in the mobile phone of the present embodiment.

FIG. 30 is a flow diagram showing the flow of the page-jump changing operation. In description of the operation shown in the flow diagram of FIG. 30, steps of the same operations as in the flow diagram of FIG. 28 are referred to by using the same step numbers, and repetitive descriptions thereof will be omitted herefrom.

According to the mobile phone of the present embodiment, in the state the "thumbnail display screen" of the lifetime calendar is displayed, when the third soft key 28 (shown in FIG. 2), for example, is "pressed and held down," the controller portion 12 performs per-page display changing over the thumbnail display screen along the direction of dates to the past. Alternatively, when the fourth soft key 29 is "pressed and held down," the controller portion 12 performs the per-page display changing across the respective thumbnail display screens along the direction of dates to the future. The process shown in the flow diagram of FIG. 30 is started (by the control of the controller portion 12) upon detection of a "press and hold down" operation of the third or fourth soft key 28 or 29 in accordance with the lifetime calendar application program stored in the memory 11.

More specifically, the process starts upon detection of a user's "press and hold down" operation of the third or fourth soft key 28 or 29. Then, at steps S131 and S132, the controller portion 12 detects user evaluation values of respective contents, which forms a thumbnail display screen intended for display on the display portion 5. Then, a display time period determination reference value for the thumbnail display screen is calculated in accordance with the user evaluation values of the respective contents.

Subsequently, at step S133, the controller portion 12 determines whether the display time period determination reference value calculated at step S132 is larger than or equal to a predetermined threshold value. If the display time period determination reference value is larger than or equal to the predetermined threshold value, then the process proceeds to step S151. At step S151, a thumbnail display screen having a display time period determination reference value larger than or equal to the predetermined threshold value is displayed for a predetermined time period on the display portion 5. Alternatively, if the display time period determination reference value is less than the predetermined threshold value, then the process directly returns to step S131. In this event, the process does not display a respective display thumbnail display screen having a display time period determination reference value less than the predetermined threshold value.

Thus, only thumbnail display screens respectively having display time period determination reference values larger than or equal to the predetermined threshold value are displayed. That is, during the "press and hold down" operation of the third or fourth soft key 28 or 29, page-jump changing control is continued. Thereby, the above-described thumbnail display screen having the display time period determination reference value larger than or equal to the predetermined threshold value is displayed, and subsequently, another (new) thumbnail display screen having a display time period determination reference value larger than or equal to the predetermined threshold value is displayed.

Accordingly, only thumbnail display screens respectively including contents respectively having large user evaluation values are sequentially displayed. Consequently, not only can the same effects as in the above-described example case be obtained, but also the respective contents can be even more rapidly viewed than in the case of the continuous page changing operation described above.

(Page-Jump Changing Operation-2)

A page-jump changing operation-2 will be described herebelow.

According to the above-described example, the respective thumbnail display screens for the page-jump display are displayed for the predetermined time period. In the present example case, an operation for page-jump displaying a respective thumbnail display screen for a time period corresponding to a display time period determination reference value will be described herebelow.

FIG. 31 is a flow diagram showing the flow of the page-jump changing operation. In description of the operation shown the flow diagram of FIG. 31, steps of the same operations as in the flow diagram of FIG. 28 are referred to by using the same step numbers, and repetitive descriptions thereof will be omitted herefrom.

At steps S131 and S132, the controller portion 12 calculates a display time period determination reference value in accordance with user evaluation values of respective contents, which forms a thumbnail display screen. Then, at step S133, the calculated display time period determination reference value is compared with a predetermined threshold value. If the calculated display time period determination reference value is less the predetermined threshold value, then the process directly returns to step S131 (without displaying thumbnail display screens having the display time period determination reference value). Otherwise, if the calculated display time period determination reference value is larger than or equal to the threshold value, then the process proceeds to step S161.

At step S161, the corresponding thumbnail display screen is displayed on the display portion 5 for a time period corresponding to the display time period determination reference value larger than or equal to the threshold value. Thereby, not only can the same effects as in the above-described case be obtained, but also only thumbnail display screens respectively including contents respectively having large user evaluation values can be sequentially displayed for time periods corresponding to user evaluation values.

(Specification of Page-Jump Determination Reference Values)

Specification of page-jump determination reference values will be described herebelow.

According to the respective above-described example, only thumbnail display screens having display time period determination reference values larger than or equal to the threshold value are displayed. However, the control can be such that only thumbnail display screens having display time period determination reference values larger than or equal to a value specified by the user are displayed.

As one example, in the present case, the user specifies a display time period determination reference value for a thumbnail display screen of interest for display in the event of page-jump changing operation. The specified value is stored into the memory 11 (under the control of the controller portion 12).

Upon detection of a user's "press and hold down" operation of the soft key 28 or 29 performed to specify the page-jump changing operation, the flow of the process as described above is executed. That is, display time period determination reference values for respective thumbnail display screens are calculated. Then, comparison is made between the respective display time period determination reference values and the display time period determination reference value specified by the user and stored in the memory 11. As a consequence, only when a value is present in the calculated display time period determination reference values, a thumbnail display screen corresponding to the value is displayed on the display portion 5.

Thus, in the event of page-jump changing, only a thumbnail display screen having a display time period determination reference value larger than or equal to a display time period determination reference value specified by the user can be displayed on the display portion 5. This further improves usability of the mobile phone.

(Scroll-Display Operation)

A scroll-display operation will be described herebelow.

As described above, according to the respective example described above, the change-display control of thumbnail display screens is performed on the page basis. In the present example case, however, scroll display control of respective contents forming thumbnail display screens is performed, of which operation will be described below.

FIG. 32 is an explanatory flow diagram showing the flow of the scroll display control (operation). In description of the operation shown the flow diagram of FIG. 32, steps of the same operations as in the flow diagram of FIG. 28 are referred to by using the same step numbers, and repetitive descriptions thereof will be omitted herefrom.

According to the mobile phone of the present embodiment, in the state the "thumbnail display screen" of the lifetime calendar is displayed, when the up-key of the cross key 24 (shown in FIG. 2), for example, is "pressed and held down," the controller portion 12 performs scroll display control. Thereby, respective contents on the thumbnail display screen are scrolled and displayed ("scroll-displayed," hereinbelow) along the direction of dates to the past. The process shown in the flow diagram of FIG. 30 is started upon detection of a "press and hold down" operation of the up- or down-key of the cross key 24 in accordance with the lifetime calendar application program stored in the memory 11.

Upon detection of a "press and hold down" operation of the up- or down-key of the cross key 24, at step 131 the controller portion 12 sequentially detects user evaluation values of the respective contents intended for graphically display on the display portion 5 by the scroll operation. Then, the process proceeds to step S171.

At step S171, the controller portion 12 determines whether a content having a user evaluation value larger than or equal to a predetermined user evaluation value is present in the contents intended to be graphically displayed on the display portion 5 by the scroll operation. If it is determined that a content having a user evaluation value larger than or equal to a predetermined user evaluation value is absent (in the contents intended to be graphically displayed on the display portion 5 by the scroll operation), then the process proceeds to step S176. At step S176, normal scroll display control is performed. Otherwise, if it is determined that a content having a user evaluation value larger than or equal to a predetermined user evaluation value is present, then the process proceeds to step S172.

At step S172, when scrolling is performed and the content having a user evaluation value larger than or equal to the predetermined user evaluation value, which content has been detected at step S171, is thereby displayed in substantially the center of the display screen of the display portion 5, scrolling is stopped for a predetermined time period. Thereby, the content having the user evaluation value larger than or equal to the predetermined user evaluation value content is displayed in the stopped or stationary state in substantially the center of the display screen of the display portion 5.

When scrolling has been performed so that the user evaluation value larger than or equal to the predetermined user evaluation value is displayed in substantially the center of the display screen of the display portion 5, either scrolling may be stopped for a time period corresponding to the user evaluation value of the content or the scroll speed may be reduced.

Subsequently, at step S173, the time period elapsed since the stoppage of scrolling is monitored in accordance with the time derived from the timer 10. At the timing when a predetermined time period has elapsed since the stoppage of scrolling, the process proceeds to step S174. At step S174, scrolling stopped is resumed. The control for causing the content, which has the user evaluation value larger than or equal to the predetermined user evaluation value, to stop in substantially the center of the display screen of the display portion 5 is continually executed. The control is continued until termination of the "press and hold down" operation of the up- or down-key of the cross key 24 is detected at step S175. Thereby, during the "press and hold down" operation of the up- or down-key of the cross key 24, a content having a user evaluation value less than the predetermined user evaluation value is normally scroll-displayed. On the other hand, a content having a user evaluation value larger than or equal to the predetermined user evaluation value is scroll-displayed in substantially the center of the display screen of the display portion 5 in the state scrolling is stopped for the predetermined time period.

According to the description of the respective example, when the rapid forward/reverse feed operation of respective contents on the thumbnail display screen of the lifetime calendar is performed, the rapid forward/reverse feed control is performed in accordance with user evaluation values of the respective contents forming the respective thumbnail display screen. However, also when performing rapid forward/reverse feed control of, for example, the list display screen of the lifetime calendar shown in FIG. 12 or the "calendar-view" lifetime calendar shown in FIG. 5, the rapid forward/reverse feed control may be performed either on per-page basis or the content basis in accordance with user evaluation values of the respective contents. Even in this case, the same effects as in the above-described case can be obtained.

Further, the rapid forward/reverse feed control in accordance with user evaluation values of respective contents may be performed in any one of cases 1 to 4 listed herebelow.

1. Case where the rapid forward/reverse feed operation of still image contents is performed in accordance with the viewer function of the camera control program;

2. Case where the rapid forwarding/reverse feeding across a list of transmitted/received mail pieces intended to be graphically displayed in accordance with the e-mail management program;

3. Case where the rapid forwarding/reverse feeding across a list of music contents intended to be graphically displayed is performed in accordance with the music player program; and 4. Case where the rapid forwarding/reverse feeding across a list of schedule contents intended to be graphically displayed is performed in accordance with the scheduler management program. The same effects as in the above-described case can be obtained in any one of the cases listed above.

(Effects/Advantages of the Embodiment)

Clearly from description given above, according to the mobile phone of the present embodiment, contents belonging to the same time range are detected in accordance with the information of time contained in the respective content different in type. Items of content-related graphical information (such as icons, thumbnail images, etc.) of the contents belonging to the same time range are graphically displayed along the time series. In an other expression, items of the content-related information, such as icons and/or thumbnail images, of contents having time information belonging to the time range of respective dates are graphically displayed on the lifetime calendar segmented in units of the time range defined as the date.

Thereby, different types of contents can be displayed collectively in units of the respective date on the lifetime calendar. Consequently, the user is able to collectively verify the respective different types of contents belonging to a long time range, such as one month or one year, and is able to easily and quickly retrieve a desired content from among a plurality of different types of contents.

Since different types of contents can thus be graphically displayed collectively in units of the respective date, the user is able to make an opportunity of taking a next action from past events. This can be done in such a manner that remembering a friend from, for example, thumbnail images of still image contents and/or e-mail contents of transmitted/received e-mail pieces, the user again transmits an e-mail piece to the friend.

Such contents are graphically displayed on the lifetime calendar by being automatically distributed in units of the information of time contained in the respective content. As such, it is sufficient for the user to perform normal terminal (device) operations, such as transmit and receive operations and imaging operations using the camera unit 8 to obtain the display. That is, the respective contents can be graphically displayed on the lifetime calendar without forcing the user to have, for example, special operations and consciousness.

Since the different types of contents are graphically displayed collectively in units of the respective date on the lifetime calendar, the lifetime calendar can be used as, for example, a past operation history or a diary.

In the event that, for example, transmitted e-mail contents and birthday contents are to be graphically displayed on the day-view lifetime calendar, in the case where still images of users corresponding to the telephone directory and the private information registration fields, thumbnail images of the still images are displayed on the day-view lifetime calendar. Consequently, users corresponding to transmission sources and addressees and users corresponding to the birthdays can easily be recognized.

The content-related graphical information for display on the lifetime calendar are preliminarily set by specifying settings such as the display and filter settings. Consequently, only desired content-related graphical information can be displayed on the lifetime calendar. Consequently, only user-desired contents can be graphically displayed on the lifetime calendar, therefore enabling a desired content to be retrieved even more easily and quickly.

The "list display screen" of the day-view lifetime calendar graphically displays contents by using character information, icons, and thumbnail images corresponding to the contents, such that the user is enabled to easily recognize the "contents" of the contents. Further, the "thumbnail display screen" of the day-view lifetime calendar graphically displays contents by primarily using, for example, icons and thumbnail images corresponding to the contents, such that the user is enabled to recognize many contents at one time.

The day-view lifetime calendar graphically displays contents by suppressing a display date field(s) with no content. In an other expression, the contents are displayed so that date display fields are adjacent one another. Thereby, an even more increased number of contents can be graphically displayed on the day-view lifetime calendar.

In the case where there are a plurality of still image contents for graphical display in one of the respective display areas for dates on the calendar-view lifetime calendar, one still image content is selected from the plurality of still images and is graphically displayed in the display area. Then, a still image content other than the still image content corresponding to the currently graphically displayed thumbnail image is selected from the plurality of still images contents at a predetermined time interval, such as the interval of three, six, or twelve hours. Thereby, the thumbnail image for display on the display area for the date with the plurality of still image contents for graphical display can be updated at the predetermined time interval on the calendar-view lifetime calendar. Consequently, when, for example, the user observes the calendar-view lifetime calendar at the predetermined time interval, the user is able to view a new thumbnail image every time the user observes the calendar-view lifetime calendar.

In the case where the focus is kept positioned for predetermined time period or longer, such as three seconds or longer, on a display area for a date with a plurality of still image contents for graphical display in the respective display areas for dates on the calendar-view lifetime calendar, the thumbnail images of the still image contents for graphical display on the display area of the date are updated to thumbnail images of new still image contents. Then, the updated thumbnail images are displayed while the focus is being positioned. Thereby, thumbnail images of still image contents corresponding to a focus-positioned date are sequentially updated and displayed, such that the user is able to recognize all the still image contents corresponding to the date only by positioning the focus on the display area for the desired date.

By moving the focus to the year index, month index, or date index, changing of graphical display of contents to be graphically displayed can be performed on the per-year, per-month, or per-day basis. Consequently, a desired content can be easily and quickly detected from a large amount of contents accumulated on the per-year, per-month, or per-day basis.

In the event of changing from the calendar-view lifetime calendar to the day-view lifetime calendar, when a display area for a date with no content is specified on the calendar-view lifetime calendar, a new schedule creation content for specifying the new schedule registration is graphically displayed in the display area for the specified date. Consequently, the user is able to easily perform the new schedule registration by specifying the date with no content.

(Effects/Advantages of Remembrance Popup Display Function)

According to the mobile phone of the present embodiment, when a stationary state of the focus for a predetermined time period or longer is detected on a calendar-view or day-view lifetime calendar, the controller portion 12 detects contents corresponding to past dates with respect to the currently focus-stationed date in order of priority of a per-year basis, per-month basis, and random basis, and graphically displays the contents to be overlaid on the calendar-view or day-view lifetime calendar.

When providing a calendar type display, such as the calendar-view or day-view calendar display, the consciousness of the user is prone to be directed to dates after the present date (future dates). However, the consciousness of the user can be directed as well to past dates in the manner that past contents, such as one-year or one-month previous contents, are graphically displayed in accordance with the remembrance popup display function. Consequently, past remembrances (contents) forgotten over time can be re-recognized, and overlooked contents of past dates can be newly recognized.

Further, since the remembrance popup display is performed when the stationary state of the focus is detected, the remembrance popup display can be performed without disturbing the user operation. Further, since the remembrance popup display is automatically (passively) performed when the stationary state of the focus is detected, the necessity of special user operations for the remembrance popup display can be avoided.

Further, when contents exceeding the number to be graphically displayed at one time are present, a different content is graphically displayed every time the remembrance popup display is performed. Consequently, the probability of, for example, content re-recognition and new-content recognition can be further increased.

The order of priority for performing the remembrance popup display is as follows:

1. Still image content captured or acquired by the camera unit 8;
2. Protection-set received or transmitted e-mail content;
3. Schedule content;
4. Still image content downloaded via a network; and
5. Non-protection-set received or transmitted e-mail content.

Consequently, a content having high probability of remembrance recollection by the user can be preferentially presented as the remembrance popup display, consequently making it possible to implement information display with high utility value.

Further, content-related graphical information displayed as the remembrance popup displays are stored as histories into the remembrance list. When desiring to recognize details of a content graphically displayed in the remembrance list, the user selects a date corresponding to the content desired for recognition from the remembrance list. Thereby, a day-view lifetime calendar corresponding to the date of the content presented as the remembrance popup display is displayed. Consequently, the user is able to recognize the details of the content presented as the remembrance popup display on the day-view lifetime calendar.

(Effects/Advantages of Display Time Period Change Control in Accordance with User Evaluation Value)

According to the mobile phone of the present embodiment, user evaluation values of respective contents are preliminarily stored into the user evaluation value table. The user evaluation values are used when performing an operation, such as "continuous page changing operation," "page-jump changing operation," or "scroll operation." In the event of the operation, change control is performed to change the display-screen or content display time period in accordance with the user evaluation value of the respective content or the user evaluation value functioning as the determination reference for user-specified display time period (or the user evaluation value functioning as the determination reference for presence or absence of the corresponding display).

Thereby, a content with high user-selection probability can be automatically detected or retrieved without complicate operation, careful attention, and the like being required, and the display time period for the content can be increased (to be long-time displayed. Further, a display screen including only contents with small user evaluation values or contents with small user evaluation values can be either short-time displayed or omitted (jump-passed) for display, so that a large number of contents stored in the mobile phone can be rapidly viewed.

MODIFIED EXAMPLES

According to the embodiment described above, the present invention is adapted to the mobile phone. However, effects similar to the above described can be attained by adapting the present invention to any one of other devices, such as PHS phones (PHS: Personal Handyphone System), PDA apparatuses (PDA: Personal Digital Assistant), notebook/desktop personal computers, and mobile game machines inasmuch as the devices handle a plurality of different types of contents.

The present invention is not limited to the embodiment described above just by way of one example of the invention, but of course, even embodiments other than the above-described embodiment may be made with various modifications without departing technical spirit and scope of the present invention.

What is claimed is:

1. An information processing apparatus, comprising:
    circuitry configured to
        create and store a user evaluation value table that includes user evaluation values, each user evaluation value corresponding to a number of executed processes invoked for a respective content and a user-selection probability of the executed processes;
        detect from the user evaluation value table a user evaluation value that corresponds to a content to be graphically displayed on a display;
        control a display to display a calendar; and
        control the display to display a simplified form of the content within the calendar for a duration of a continuous display time period based on the corresponding detected user evaluation value.

2. The information processing apparatus according to claim 1, wherein the circuitry is further configured to
    control the display to display the simplified form of the content for the duration of the continuous display time period based on the corresponding detected user evaluation value and a plurality of content displayed within the calendar;
    calculate a total of user evaluation values corresponding to each of the of the respective content of the plurality of content displayed within the calendar; and
    change the duration of the continuous display time period for the display in accordance with the calculation.

3. The information processing apparatus according to claim 1, wherein the circuitry is further configured to
    control the display to display the simplified form of the content for the duration of the continuous display time period based on the corresponding detected user evaluation value and a plurality of content displayed within the calendar;
    calculate a total of user evaluation values corresponding to each of a predetermined number of content selected from the plurality of content displayed within the calendar; and
    change the duration of the continuous display time period for the display in accordance with the calculation.

4. The information processing apparatus according to claim 1, wherein the circuitry is further configured to
    control the display to display the simplified form of the content for the duration of the continuous display time period based on the corresponding detected user evaluation value and a plurality of content displayed within the calendar;
    determine a content that corresponds to a largest user evaluation value from among the respective content of the plurality of content displayed within the calendar; and
    change the duration of the continuous display time period for the display in accordance with the user evaluation value of the detected content.

5. The information processing apparatus according to claim 1, wherein the circuitry is further configured to
control the display to display the simplified form of the content for the duration of the continuous display time period based on the corresponding detected user evaluation value and a plurality of content displayed within the calendar;
calculate a total of user evaluation values corresponding to each of the of the respective content of the plurality of content displayed within the calendar; and
change the duration of the continuous display time period for the display so that the display is not displayed when the calculated total of the user evaluation values corresponding to each of the respective content of the plurality of content displayed within the calendar on the display is less than a predetermined value, and the display is displayed for either a predetermined duration of a continuous time period or a duration of a continuous time period corresponding to the calculated user evaluation value when the calculated total of the user evaluation values corresponding to the display is larger than or equal to the predetermined value.

6. The information processing apparatus according to claim 1, wherein the circuitry is further configured to
store a specified user evaluation value;
control the display to display the simplified form of the content for the duration of the continuous display time period based on the corresponding detected user evaluation value and a plurality of content displayed within the calendar;
calculate a total of user evaluation values corresponding to each of the of the respective content of the plurality of content displayed within the calendar; and
change the duration of the continuous display time period for the display so that the display is not displayed when the calculated total of the user evaluation values corresponding to each of the respective content of the plurality of content displayed within the calendar on the display is less than the specified user evaluation, and the display is displayed for either a predetermined duration of a continuous time period or a duration of a continuous time period corresponding to the calculated user evaluation value when the calculated total of the user evaluation values corresponding to the display is larger than or equal to the predetermined value.

7. The information processing apparatus according to claim 1, wherein the circuitry is further configured to
display a plurality of content at one time on the display;
perform sequential scrolling of the respective displayed content;
detect the user evaluation value of the respective content from the user evaluation value table during the sequential scrolling of the respective displayed content;
stop the sequential scrolling for a time period when a content having a user evaluation value larger than or equal to a predetermined user evaluation value is scroll-displayed; and
reduce a scroll speed of the sequential scrolling when the content having the user evaluation value larger than or equal to the predetermined user evaluation value is not scroll-displayed.

8. An information processing method performed by an information processing apparatus, the method comprising:
creating and storing, by circuitry of the information processing apparatus, a user evaluation value table that includes user evaluation values, each user evaluation value corresponding to a number of executed processes invoked for a respective content and a user-selection probability of the executed processes;
detecting from the user evaluation value table a user evaluation value that corresponds to a content to be graphically displayed on a display;
controlling a display to display a calendar; and
controlling the display to display a simplified form of the content within the calendar for a duration of a continuous display time period based on the corresponding detected user evaluation value.

9. A non-transitory computer program storage device having an information processing program stored thereon that when executed by a computer performs steps comprising:
creating and storing a user evaluation value table that includes user evaluation values, each user evaluation value corresponding to a number of executed processes invoked for a respective content and a user-selection probability of the executed processes;
detecting from the user evaluation value table a user evaluation value that corresponds to a content to be graphically displayed on a display;
controlling a display to display a calendar; and
controlling the display to display a simplified form of the content within the calendar for a duration of a continuous display time period based on the corresponding detected user evaluation value.

* * * * *